(12) United States Patent
Storr

(10) Patent No.: US 10,484,386 B2
(45) Date of Patent: Nov. 19, 2019

(54) SYSTEM, METHOD, COMPUTER PROGRAM AND DATA SIGNAL FOR THE PROVISION OF A PROFILE OF IDENTIFICATION

(71) Applicant: DIGITAL (ID) ENTITY LIMITED, Pok Fu Lam (CN)

(72) Inventor: James Robert Storr, New South Wales (AU)

(73) Assignee: DIGITAL (ID) ENTITY LIMITED, Pok Fu Lam, Hong Kong (CN)

( * ) Notice: Subject to any disclaimer, the term of this patent is extended or adjusted under 35 U.S.C. 154(b) by 0 days.

(21) Appl. No.: 14/784,208

(22) PCT Filed: Apr. 14, 2014

(86) PCT No.: PCT/AU2014/000430
§ 371 (c)(1),
(2) Date: Oct. 13, 2015

(87) PCT Pub. No.: WO2014/165940
PCT Pub. Date: Oct. 16, 2014

(65) Prior Publication Data
US 2016/0050213 A1 Feb. 18, 2016

(30) Foreign Application Priority Data
Apr. 13, 2013 (AU) ................. 2013204989

(51) Int. Cl.
*H04L 29/06* (2006.01)
*G06F 16/335* (2019.01)
*H04L 9/32* (2006.01)
*G06F 21/32* (2013.01)
*G06F 21/45* (2013.01)

(52) U.S. Cl.
CPC .......... *H04L 63/102* (2013.01); *G06F 16/337* (2019.01); *G06F 21/32* (2013.01); *G06F 21/45* (2013.01); *H04L 9/32* (2013.01); *H04L 63/0861* (2013.01)

(58) Field of Classification Search
CPC ........ H04L 63/0861; H04L 9/32; G06F 21/32
See application file for complete search history.

(56) References Cited

U.S. PATENT DOCUMENTS

| | | | |
|---|---|---|---|
| 8,627,438 B1 | 1/2014 | Bhimanaik | |
| 10,198,955 B1* | 2/2019 | Boyd | G08G 5/0069 |
| 10,248,120 B1* | 4/2019 | Siegel | G05D 1/0088 |
| 2003/0050732 A1* | 3/2003 | Rivalto | G06Q 10/08 700/237 |
| 2003/0140233 A1 | 7/2003 | Samar | |
| 2004/0049404 A1* | 3/2004 | Murphy | G06Q 10/08 705/330 |

(Continued)

OTHER PUBLICATIONS

Kim et al., "A Non-Cooperative User Authentication System in Robot Environments", pp. 804-811 (Year: 2007).*

*Primary Examiner* — Thaddeus J Plecha
(74) *Attorney, Agent, or Firm* — Skinner and Assocs; Joel Skinner

(57) ABSTRACT

In one aspect, the invention provides a method for the provision of a profile, comprising the steps of, receiving information relevant to an individual, formatting the information into a format suitable for use in an identification situation, and storing the information in the format.

1 Claim, 50 Drawing Sheets

(56) References Cited

U.S. PATENT DOCUMENTS

| | | | |
|---|---|---|---|
| 2005/0005172 A1* | 1/2005 | Haala | G06Q 20/341 |
| | | | 726/19 |
| 2007/0112461 A1* | 5/2007 | Zini | G05B 19/41895 |
| | | | 700/245 |
| 2007/0129849 A1 | 6/2007 | Zini et al. | |
| 2007/0245157 A1* | 10/2007 | Giobbi | G06F 21/31 |
| | | | 713/186 |
| 2008/0209227 A1* | 8/2008 | Venkatesan | H04L 9/3231 |
| | | | 713/186 |
| 2008/0294287 A1* | 11/2008 | Kawano | B25J 9/1664 |
| | | | 700/252 |
| 2009/0319353 A1* | 12/2009 | Palmeri | G06Q 20/20 |
| | | | 705/14.17 |
| 2010/0312763 A1* | 12/2010 | Peirce | G06K 9/00892 |
| | | | 707/723 |
| 2012/0179620 A1* | 7/2012 | Fliderman | G06Q 10/0832 |
| | | | 705/332 |
| 2012/0199653 A1 | 8/2012 | Wenzel | |
| 2012/0246077 A1* | 9/2012 | Skaaksrud | G06Q 30/0615 |
| | | | 705/50 |
| 2013/0158708 A1* | 6/2013 | Emmertz | G05B 19/0426 |
| | | | 700/248 |
| 2014/0254896 A1* | 9/2014 | Zhou | B25J 9/0006 |
| | | | 382/124 |

* cited by examiner

| | Primary Document | Second Document | n Document |
|---|---|---|---|
| Document Type | | | |
| Document Issued by | | | |
| Document Number | | | |
| Date of Issue | | | |
| Place of Issue | | | |
| Expiry Date | | | |
| Photo or Signature on ID | | | |
| Date of Birth | | | |
| Points | | | | |

Applicant Name — Date of Birth (DOB)

Last Name

First Name

Middle Name

Residential Address (PO Box not accepted)
Unit/Street Number — Street Name — Suburb/Town/City State — Postcode/Zip — Email addresses

Telephone Numbers
Mobile 1 — Mobile 2

Home — Work

Identification details and ID documents

Total Points

Profile Account unique ID number (generated)

Figure 13

*Contribution number 2* deA062.00,deB065.00,deC064.50,deD050.30,nwA030.00,nwB025.60,j11A025.50,j11B030.00...cmn
deA062.50,deB065.20,deC064.90,deD050.30,nwA030.10,nwB025.60,j11A025.40,j11B030.80...cmn AVERAGE
deA062.25,deB065.10,deC064.70,deD050.30,nwA030.05,nwB025.60,j11A025.45,j11B030.40...cmn → CN2

Figure 31

*Contribution number 3* deA062.00,deB065.00,deC064.50,deD050.30,nwA030.00,nwB025.60,j11A025.50,j11B030.00...cmn
deA062.50,deB065.20,deC064.90,deD050.30,nwA030.10,nwB025.60,j11A025.40,j11B030.80...cmn
deA062.30,deBeee.ee,deCeee.ee,deDeee.ee,nwA030.00,nwB025.50,j11A025.40,j11B030.40...cmn AVERAGE
deA062.27,deB065.10,deC064.70,deD050.30,nwA030.03,nwB025.57,j11A025.43,j11B030.40...cmn → CN3

Figure 32

Typical screenshot (Profile Account App specifications page)

UNIQUE ID No.:　　　　　　0000006543218

FIRST NAME:　　　　　　　XXXXXXXXXX　　QUALIFICATIONS (Postnominals)
MIDDLE NAME(S):　　　　　XXXXXXXXXX　　XXXX (XXX), XXX (XXXX)
LAST NAME:　　　　　　　XXXXXXXXXX RESIDENTIAL ADDRESS:　　　　XXXXXXXXXXXXXXXXXXXXXXXX
RESIDENTIAL PHONE NUMBER:　XXXXXXXXXXXXXXXXXX
MOBILE PHONE NUMBER:　　　XXXXXXXXXXXXXXXXXX
EMAIL ADDRESS #1:　　　　　XXXXXXXXXXXXXXXXXXXXXXXX
EMAIL ADDRESS #2:　　　　　XXXXXXXXXXXXXXXXXXXXXXXX WORK ORGANISATION:　　　　XXXXXXXXXXXXXXXXXXXXXXXX
WORK ADDRESS:　　　　　　　XXXXXXXXXXXXXXXXXXXXXXXX
WORK PHONE NUMBER:　　　　XXXXXXXXXXXXXXXXXXXXXXXX
WORK EMAIL ADDRESS:　　　　XXXXXXXXXXXXXXXXXXXXXXXX

*DATA SET CATEGORY RANKINGS*
▭ BIOMETRIC & BEHAVIOURAL
　　▭　CARDIOVASCULAR (INC. HEART/PULSE CHARACTERISTICS)
　　▭　SWEAT
　　▭　BREATHING (PULMONARY)
　　▭　IRIS
　　▭　RETINA
　　▭　FINGER PRINT(S)
　　▭　FACIAL
　　▭　VOCAL
　　▭　EMOTIONAL
　　▭　VOCABULARY
　　▭　ETC
▭ DIGITAL 'FINGERPRINT'
　　▭　INTERNET USE
　　▭　THIS 'SMART' PHONE'S USE
　　▭　CURRENTLY WORN 'SMART' FABRIC (SHIRT)
　　▭　CURRENTLY WORN 'SMART' FASHION (SHOES)
　　▭　ETC
▭ SOCIAL REPUTATION CONFIRMATION
▭ CONTRIBUTION OF BANK'S CAPTURE DEVICES ('tags')
　　ETC.

A (ONE OR MORE-DIMENSIONAL) PHOTO, GIF OR VIDEO OF ACCOUNT HOLDER MAY BE SHOWN OR PLAYED HERE

IDENTITY ACCURACY 77.0%

ABOVE 75.0% IS *BANK'S* THRESHOLD

Figure 58A

FIGURE S001 shows example components of a semi- or fully-automated/autonomous robot, vehicle and/or machine (RVM) system, in accordance with embodiments of the invention

SYSTEM, METHOD, COMPUTER PROGRAM AND DATA SIGNAL FOR THE PROVISION OF A PROFILE OF IDENTIFICATION

TECHNICAL FIELD

The present invention relates to a system, method, computer program and data signal for the provision of a profile of identification data. Embodiments of the invention find specific, but not exclusive, use in the identification of individuals, through the use of, for example, biometric data. A more specific embodiment finds use in the identification of individuals for the purpose of granting access to electronic systems, such as databases, computing systems and/or control computer controlled devices via the provision of an eLicence or Profile Account.

Reference is made in the specification to a co-pending PCT application no, PCT/AU2013/001303 entitled "A System, Method, Computer Program and Data Signal for the Registration, Monitoring and Control of Machines and Devices", filed in the name of C2 Systems Limited, a Hong Kong entity. PCT/AU2013/001303 is incorporated herein by reference.

BACKGROUND ART

The following discussion of the background art is intended to facilitate an understanding of the present invention only. The discussion is not an acknowledgement or admission that any of the material referred to is or was part of the common general knowledge as at the priority date of the application.

There is an increasing need to correctly and accurately identify individuals, for a variety of financial, personal, and legal reasons. That is, the ubiquitous use of computing systems in all aspects of life necessitates the need to develop systems and methods that provide the ability to accurately identify individuals, particularly when such individuals wish to interact with computing systems or use computing systems.

Simultaneously, the growing amount of data regarding every individual and the growing amount of data captured about individuals without their direct knowledge (e.g. closed circuit TV images), requires such identification systems and methods to balance the need to identify the individual with the individual's right to keep their personal information private and secure.

In other words, there is a strong need to develop systems and methods that securely encrypt or otherwise limit access to personal information, while concurrently providing the individual with an easy and intuitive way of accessing such data for identification and transactional purposes.

It is against this background that embodiments of the present invention have been developed.

SUMMARY OF INVENTION

In a first aspect, the present invention provides a method for the provision of a profile of information relevant to the identification of an entity, comprising the steps of providing at least one item of identity information to an identifying authority, wherein the identifying authority collects biometric information from the entity and utilizes the identity information and biometric information to form a profile of information relevant to the identification of the entity.

In one embodiment, the at least one item of identity information is an identity document.

In one embodiment, the step of providing the at least one item of identity information includes the identity authority accessing an identity database to access the identity document.

In one embodiment, the step of providing the at least one item of identity information includes the step of independently verifying the at least one item of identity information.

In one embodiment, the step of accessing the at least one verified identity document occurs electronically.

In one embodiment, the identity document is an independently verified identity document.

In one embodiment, the step of collecting the biometric information includes the further step of utilizing an algorithm to reduce the biometric information to a single biometric value.

In one embodiment, the step of collecting biometric information is iterated a plurality of times, wherein each iteration of collected biometric information is reduced to the single value and combined with other single biometric values to form a collection of biometric values.

In one embodiment, at least two of the plurality of iterations of collecting biometric information is performed by at least two different hardware devices.

In one embodiment, the profile of information is saved in a database. The database may be located in a device held by the entity. The database may be remotely located from the entity and the identifying authority.

In one embodiment, biometric information includes at least one of a fingerprint, a retinal scan, a palm scan and a facial scan.

In one embodiment, the identifying authority is a computing system.

In a second aspect, the present invention provides a method of identifying a claimed entity using a computing system, comprising the steps of providing to the computing system a profile of information including at least one item of claimed identifying information and at least one item of stored biometric information, wherein the computing system receives biometric information collected from the claimed entity and utilizes a processor to process the biometric information to form a processed biometric profile, and compare the processed biometric profile to the stored biometric information, wherein, if a match threshold is achieved, the entity is identified as the claimed entity.

In one embodiment, the step of collecting the biometric information is iterated a plurality of times, wherein the processor performs the step of collating the collected information to form a processed biometric profile.

In one embodiment, the invention comprises the further step of the computing system receiving at least one item of claimed identifying information from the claimed entity and utilizes a processor to process the biometric information to form a processed biometric profile, and compare the processed biometric profile to the stored biometric information, wherein, if a match threshold is achieved, the entity is identified as the claimed entity.

In one embodiment, the invention comprises the further step of, on identifying the entity as the claimed entity, issuing at least one instruction to allow the entity to perform at least one action.

In one embodiment, the at least one action is at least one of access to a physical space, access to a virtual space and access to a computing system.

In one embodiment, access to a computing system includes the step of allowing the entity to provide at least one instruction to the computing system.

In one embodiment, the at least one instruction is a programming instruction for a robotic device.

In a third aspect, the present invention provides a system for the provision of a profile of information relevant to the identification of an entity, comprising a database arranged to provide at least one item of identity information to an identifying authority, wherein the identifying authority collects biometric information from the entity utilizing a biometric information collection device and a processor utilizes the identity information and biometric information to form a profile of information relevant to the identification of the entity.

In one embodiment, the at least one item of identity information is an identity document.

In one embodiment, the at least one item of identity information includes the identity authority accessing an identity database to access the identity document.

In one embodiment, the at least one item of identity information includes verifying the at least one item of identity information.

In one embodiment, the at least one verified identity document occurs electronically. In one embodiment, the identity document is an independently verified identity document.

In one embodiment, the processor utilizes an algorithm to reduce the biometric information to a single biometric value.

In one embodiment, a plurality of collected biometric information is provided to the processor, wherein the processor reduces the collected biometric information to the single value to form a collection of biometric values.

In one embodiment, at least two of the plurality of iterations of collecting biometric information is performed by at least two different hardware devices.

In one embodiment, the profile of information is saved in a database. The database may be located in a device held by the entity. The database may be remotely located from the entity and the identifying authority.

The biometric information may include at least one of a fingerprint, a retinal scan, a palm scan and a facial scan.

The identifying authority may be a computing system.

In a fourth aspect, the present invention provides a system of identifying a claimed entity using a computing system, comprising providing from a database to the computing system, a profile of information including at least one item of claimed identifying information and at least one item of stored biometric information, wherein the computing system receives biometric information collected from the claimed entity via a biometric information device and utilizes a processor to process the biometric information to form a processed biometric profile, and compare the processed biometric profile to the stored biometric information, wherein, if a match threshold is achieved, the entity is identified as the claimed entity.

The processor may receive plurality of different instances of collected biometric information, wherein the processor performs the step of collating the collected information to form a processed biometric profile.

The computing system may receive at least one item of claimed identifying information from the claimed entity and utilizes the processor to process the biometric information to form a processed biometric profile, and compare the processed biometric profile to the stored biometric information, wherein, if a match threshold is achieved, the entity is identified as the claimed entity.

On identifying the entity as the claimed entity, the computing system may issue at least one instruction to allow the entity to perform at least one action. The at least one action may be at least one of access to a physical space, access to a virtual space and access to a computing system. Access to a computing system may include allowing the entity to provide at least one instruction to the computing system. The at least one instruction may be a programming instruction for a robotic device.

In a fifth aspect, the present invention provides a computer program including at least one command, which, when executed on a computing system, is arranged to perform the method steps in accordance with the first or second aspect of the invention.

In a sixth aspect, the present invention provides a computer readable medium incorporating a computer program in accordance with the fifth aspect of the invention.

In a seventh aspect, the present invention provides a data signal encoding at least one command and being arranged to be receivable by at least one computing device, wherein, when the encoded command is executed on the computing system, the computing system performs the method steps in accordance with the first or second aspect of the invention.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 13 is an example input form in accordance with an embodiment of the present invention;

FIGS. 28 to 32 are example data structures in accordance with an embodiment of the invention;

FIGS. 58a and 58b are example profile records in accordance with an embodiment of the invention.

DESCRIPTION OF EMBODIMENTS

General Overview

The present invention relates generally to a system, method, computer program and data signal for the provision of a profile of identification data. Embodiments of the invention find specific, but not exclusive, use in the identification of entities, such as individuals. A more specific embodiment finds use in the identification of individuals for the purpose of granting access to electronic systems, such as databases, computing systems and computer controlled devices.

In more detail, two embodiments are described.

One embodiment is directed to a verification system and method that will herein be referred to as an "eLicence" (eL). This type of verification preferably requires the biometrics/particulars of the user to be verified (or registered) by a recognized authority.

Another embodiment is directed to a verification system and method that will herein be referred to as a "Profile Account", and may or may not be verified (or registered) by a recognised authority.

From hereonin, reference will be made to a 'Profile Account'. The term 'Profile Account' when used in the context of the present specification, will be understood to be a digital representation, signature and/or 'key' of an individual (person). That is, a Profile Account is a dynamic, many-factor, digital representation of an analog, 'in-the-flesh' entity.

Components of an eL may be found in a Profile Account, and vice versa. However, in the embodiments described herein, an eL does not devolve into a Profile Account, since an eL is an officially sanctioned form of identity verification.

An eL requires an owner to register their biometrics/recognition features/particulars with an officially authorised Credible, Respectable, Reliable and/or Responsible (CRRR) party (e.g. a motor registry or Department of Motor Vehicles). A Profile Account owner is not required to undertake such official steps but may do so voluntarily to obtain the privileges that accrue with registering.

A Profile Account, in the embodiments described herein, typically employ multi-factor authentication, whereas an eL may only use a single authentication factor. An eL is not required to undertake/pursue a Profile Account's multi-factor authentication.

An eL owner or entity may utilise a third party verification/authentication service provider, e.g. a Certificate Authority in order to validate their eL. A Profile Account owner is not required in the context of the embodiments described, to utilise such a third party.

Notwithstanding the above definitions with regard to the terms "eLicence" and "Profile Account", it will be understood by the reader that these terms are used only to clearly delineate the difference between two embodiments of the invention and no gloss should be drawn from the use of these two terms in the context of the embodiments described in the proceeding detailed description to limit or otherwise modify the claimed invention.

Figure 1:
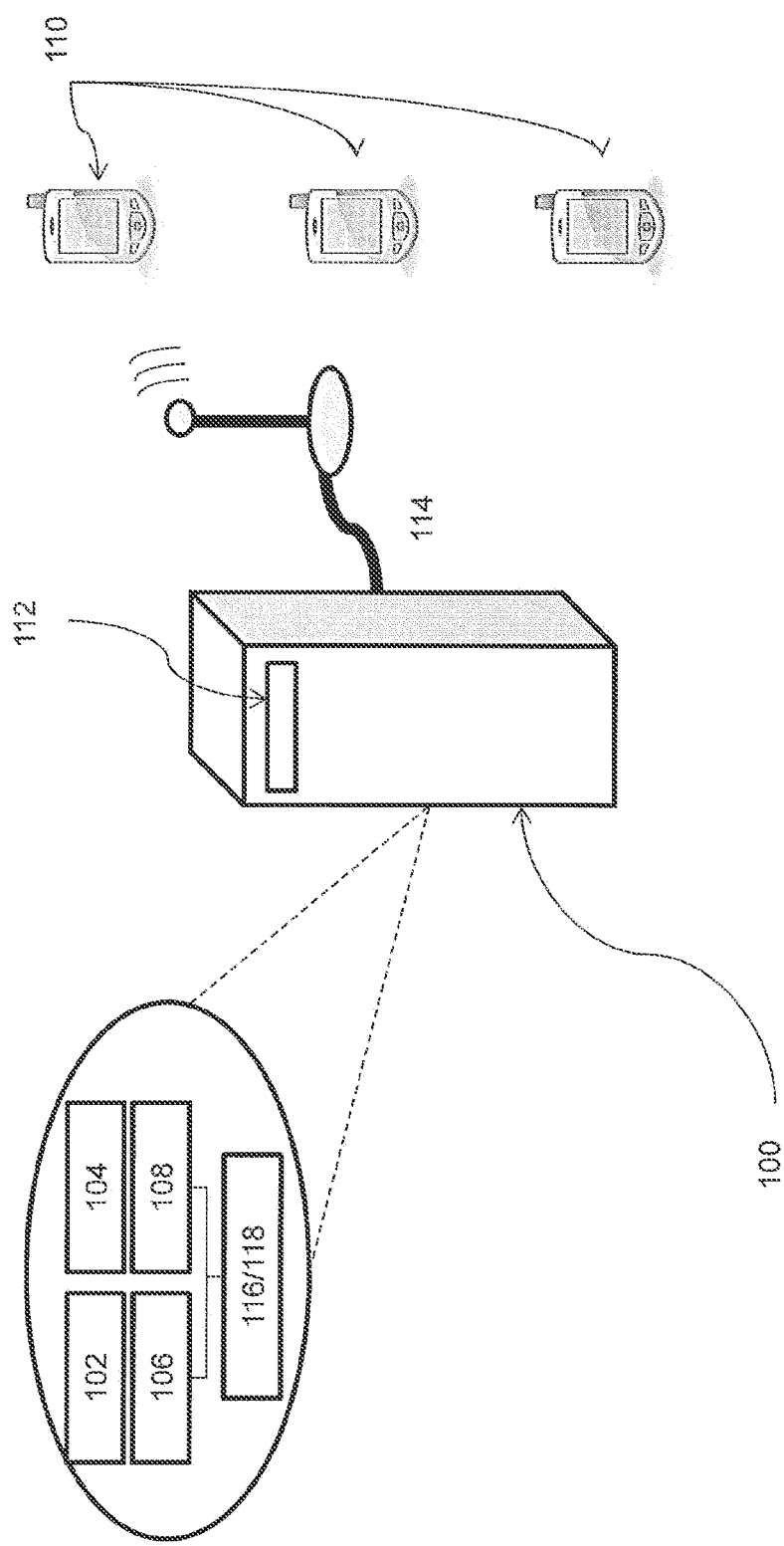
FIG. 1 is an example computing system which is capable of operating a device, system, method and/or computer program in accordance with an embodiment of the present invention.

Both embodiments are operated utilising a computing system, such as the computing system shown at FIG. 1.

In FIG. 1 there is shown a schematic diagram of a computing system, which in this embodiment is a server 100 suitable for use with an embodiment of the present invention. The server 100 may be used to execute application and/or system services such as a system and method for the provision of biometric data in accordance with an embodiment of the present invention.

With reference to FIG. 1, the server 100 may comprise suitable components necessary to receive, store and execute appropriate computer instructions. The components may include a processor 102, read only memory (ROM) 104, random access memory (RAM) 106, an input/output devices such as disc drives 108, remote or connected input devices 110 (such as a mobile computing device, a smartphone or a 'desktop' personal computer), and one or more communications link(s) 114.

The server 100 includes instructions that may be installed in ROM 104, RAM 106 or disc drives 112 and may be executed by the processor 102. There may be provided a plurality of communication links 114 which may variously connect to one or more computing devices 110 such as servers, personal computers, terminals, wireless or handheld computing devices, or mobile communication devices such as a mobile (cellular) telephone. At least one of a plurality of communications link 114 may be connected to an external computing network through a telecommunications network.

In one particular embodiment the device may include a database 116 which may reside on the storage device 112. It will be understood that the database may reside on any suitable storage device, which may encompass solid state drives, hard disc drives, optical drives or magnetic tape drives. The database 116 may reside on a single physical storage device or may be spread across multiple storage devices.

The server 100 includes a suitable operating system 118 which may also reside on a storage device or in the ROM of the server 100. The operating system is arranged to interact with the database and with one or more computer programs to cause the server to carry out the steps, functions and/or procedures in accordance with the embodiments of the invention described herein.

Broadly, the invention relates to a computing method and system arranged to interact with one or more remote devices via a communications network. The remote devices may take the form of computing devices, as described above, but may also take the form of robotic devices, as will be described in more detail later.

The system, in one embodiment, utilises a server including a database arranged to contain information regarding one or more Profile Accounts or eLicences. The database is arranged to receive the information via the communications network from the one or more remote devices and to subsequently create, refine and hold eLicences and/or Profile Accounts.

Other aspects of the broad inventive concept relate to a corresponding method, computer program, computer readable media and data signal. The method facilitates the transfer of information, and in particular biometric information, to be sent between one or more remote devices and one or more databases, as is described below in more detail.

Profile Account

Figure 2:
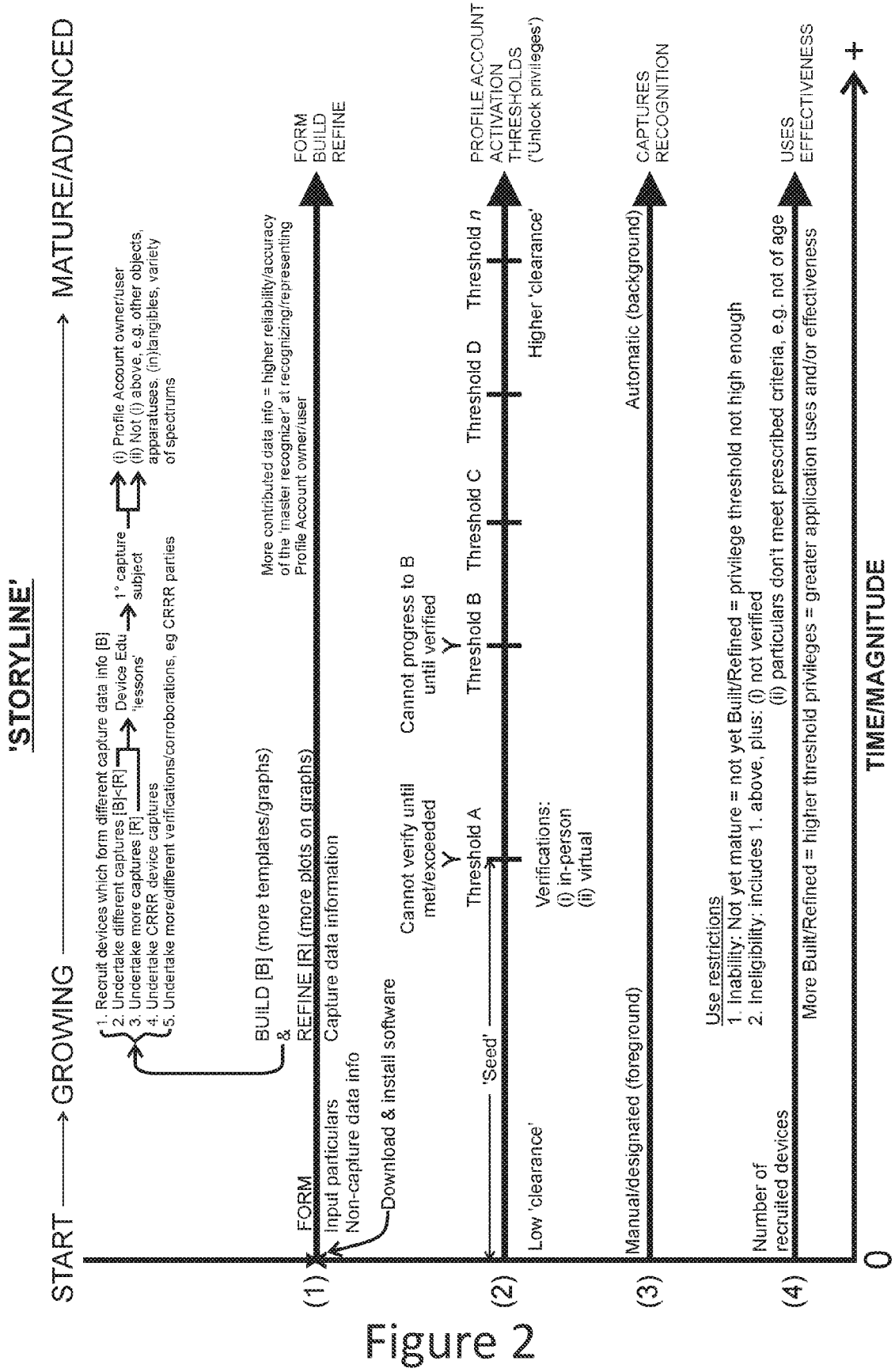
FIG. 2 is an example profile in accordance with an embodiment of the present invention.

Referring to FIG. 2, there is shown a 'storyline' of an embodiment of the present invention.

A Profile Account requires a series of initial manual, deliberate captures to build/refine the Profile Account. Once an acceptable amount of information has been captured to create a basic, account, the Profile Account proceeds to a second stage, where automatic captures and contributions may be added to further build and/or refine the Profile Account.

Further captures and other contributory information typically comprise a mixture of private or personal (Activity) Profiles along with public (Activity) Profiles. Public captures are produced, received and/or contributed throughout the lifetime of the Profile Account.

Figure 3:
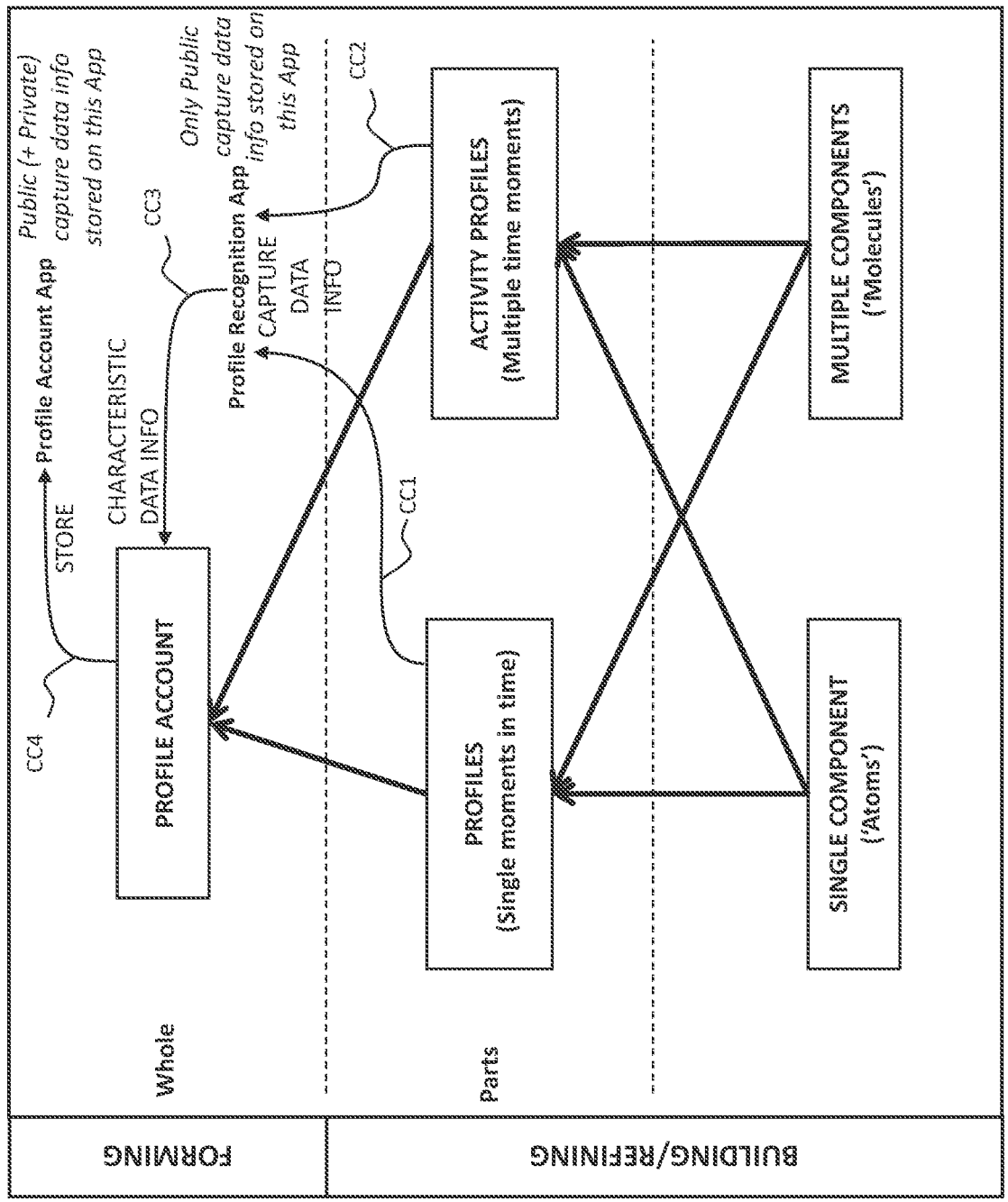
FIG. 3 is an example of a hierarchy of different components within a profile account in accordance with an embodiment of the present invention.

Referring to FIG. 3, there is shown a Profile Account comprising two primary parts being 'Profiles' and 'Activity Profiles'.

Activity Profiles comprise either a single component or multiple components. The term "components" refers to any information related to a user, including any tangible or intangible element, thing, artifact, object, entity, person or sound usable to identify a user. Activity Profiles contain information that is unique and associated with a person, but that is not intrinsically part of the physical person. This type of identification information includes information that would traditionally be used to identify and verify an individual (e.g. name, address, government assigned identification numbers such as a driver's license number, etc.).

The identification information can further include objects and/or artifacts that could also be used (tangentially) to help in the verification of an individual's identity (so-called 'circumstantial identification information'). For example, information regarding pieces of clothing, jewelry, or other worn items can be included as part of the identification information, as they may not be determinative, in and of themselves, of the identity of a person, but taken in combination with other information, provide identifying information that becomes useful in building a unique profile.

In one example, the Profile may include a capture (e.g. a multi-dimensional scan) of a hairclip.

Moreover, the components may also include information that identify a physical characteristic or trait of a person.

That is, the components may include capturing the physical characteristics of a person, including the person's gestures, movements, gait, etc.

In other words, Profiles contain one or more components digitally represented as data information, where each component represents data relevant to a specific (defined) moment in time.

For example, where the Profile includes one or more elements of information that relate to the physical characteristics of a person, the Profile may include an image capture of the person's hand during a single time moment, in a given anatomical position, structure or pose (e.g. an open/closed fist, spread fingers, thumb up/down, etc.).

Activity Profiles, in contrast, contain Profiles 'in motion' or 'changing' over multiple time units or moments.

For example, an Activity Profile may be a hand changing from a closed to an open fist (i.e. anatomical extension of the fingers), or the hand's fingers (or digits) moving from an adducted to an abducted position (i.e. fingers spreading apart, away from the centerline of the hand).

Profile Account Application

The abovementioned Profiles are managed, in one embodiment, by a Profile Account Application (or App) (PAA) which, in the embodiment described herein, is installed or accessed via an individual user's mobile and/or fixed computing device. An individual's PAA allows their captured data and/or information to be stored on the aforementioned mobile or fixed computing device.

Further, the PAA also incorporates a user's interface feature in order for the individual to manage aspects of their Profile Account.

The PAA may include further functionality, in the form of a Profile Recognition App (PRA). It will be understood that in the embodiment described herein, the PAA and PRA are two components of a single software application. However, in other embodiments, the PAA and PRA may be separate applications which operate on separate computing systems. The PAA and/or PRA also incorporate a user interface arranged to manage the PRA's (computer software or program) settings.

In one embodiment, the two components, namely the PAA and the PRA, may reside on a single device (and may form part of the same code), but may be arranged to operate independently of each other. For example, if an individual's device captures a scene using the PRA, the capture data information is not automatically contributed to the device's long-term storage, via the PAA, if the capture data information does not satisfy a series of 'threshold'(s) or rules (which will be described in more detail below). Therefore, a device which is both a capture and contributing device will still function as two separate devices, separated by a 'firewall'.

A third software application, Add-On App (or 'AOA'), is also described in more detail. In brief, the application is installed and/or operated on (participating) devices. Further, the AOA may be combined (as an 'add-on') to the PRA for increased PRA functionality features such as one or more of the following:

account holder authentications;
retail transaction facilities;
generating 'tags';
tagged advertising;
targeted account holder advertising or notifications;
recognition feedback service; and
tagged presence history.

Figure 4:
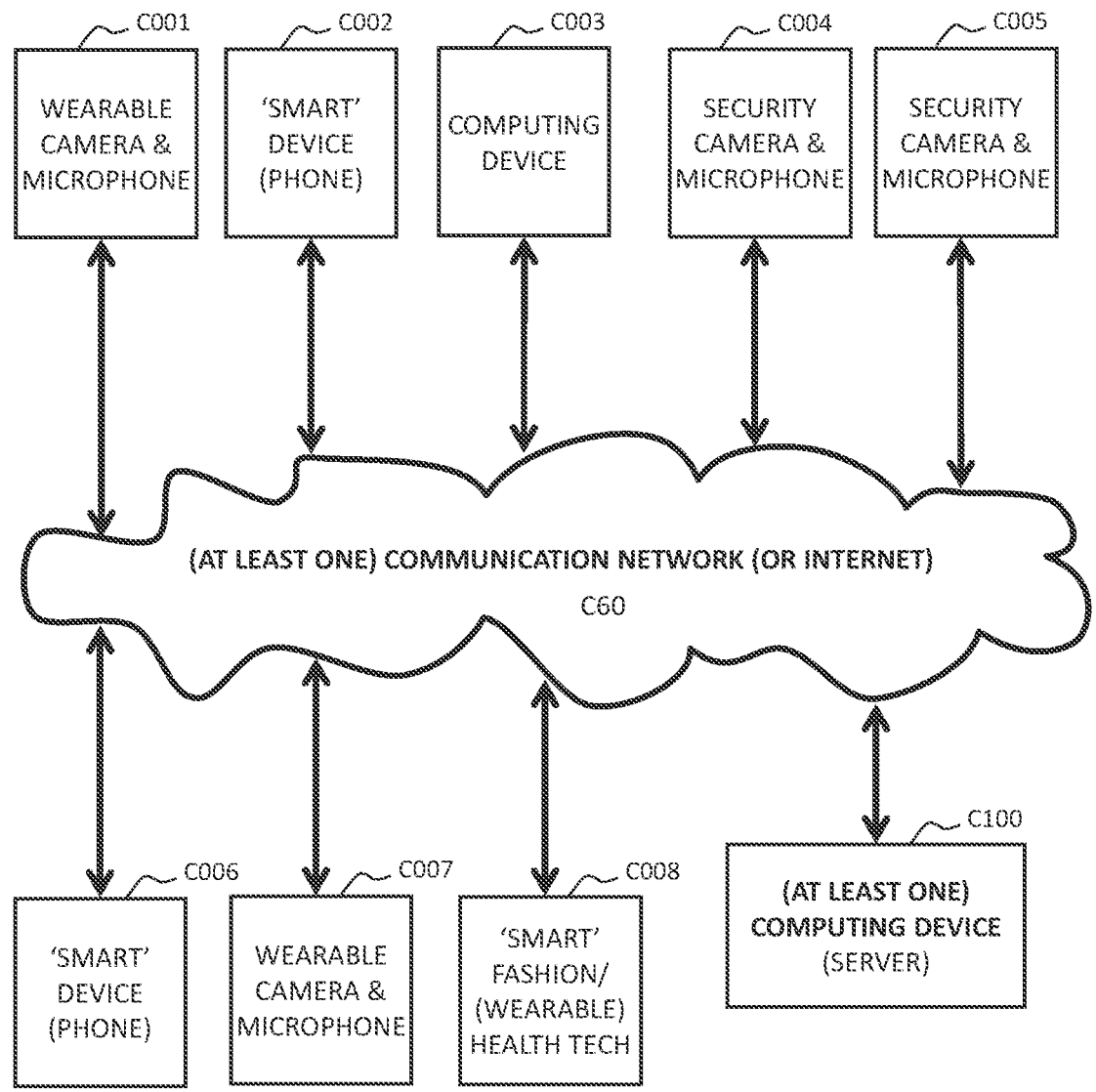
FIG. 4 is a network computing environment utilisable to operate an embodiment of the present invention.

Further depicted in FIG. 3 is a flowchart depicting the flow of capture data information (CC1 and CC2) to a 'Profile Recognition App', following captures of Profiles and Activity Profiles (e.g. in a visual and/or audio scene) by a capture device such as capture device C004 in FIG. 4. The PRA (running on a capture device) is the software application which first deals with capture data information, and also the software application which directs the storage of 'public' capture and/or characteristic data information to memory for long-term storage to enhance recognition capabilities. PRA also prevents 'private' capture and/or characteristic data information stored and managed.

Furthermore depicted in FIG. 3 is the 'flow' of characteristic data information CC3 to the 'Profile Account'. The 'Profile Account App' (PAA) contributes the characteristic data information onto a long-term storage device.

FIG. 4 is a block diagram illustrating a networked computing environment C111 in accordance with an embodiment of the invention. Networked computing environment C111 includes a plurality of computing devices interconnected through one or more networks C60. The one or more networks C60 allow a particular computing device to connect to and communicate with another computing device. The depicted computing devices include various (non-) mobile devices such as wearable cameras and microphones C001 and C007, 'smart' devices C002 and C006, computing device C003, security cameras and microphones C004 and C005, 'smart' fashion/(wearable) health tech C008, and a computing device C100 which may be an application server.

An application server, such as application server C100, allows a client (device) to download content from the application server or to perform processing of data information instead of relying solely on the client device and assist with facilitating verification sessions, i.e. officially linking or associating an applicant's 'seed' (capture and/or characteristic) data information to their Profile Account.

In one example, a client downloads lessons completed by other clients. In general, a server includes a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client (e.g. analysing a captured device's captured scene, then sending back any results).

One embodiment of capture device C001 includes a camera, microphone, network interface, processor, and memory, all in communication with each other. Cameras and microphones capture a scene, converting any surveillance data into encrypted, characteristic data (primarily, for pattern recognition).

The Network interface allows capture device C001 to connect to one or more networks C60. The network interface may include a wireless network interface, a modem, and/or a wired network interface. The Processor allows capture device C001 to execute computer readable instructions stored in memory to perform the processes discussed herein.

Networked computing environment C111 may provide an ad hoc (or cloud) computing environment for one or more computing devices.

In one embodiment, capture device C007 captures a scene involving an individual (a Profile Account holder), encrypts, buffers, converts, and analyses the scene data information in real-time, and transmits the data information to be contributed also to other contributing devices, which may include 'smart' wearable health tech C008 and/or 'smart' device (phone) C006.

Figure 5:
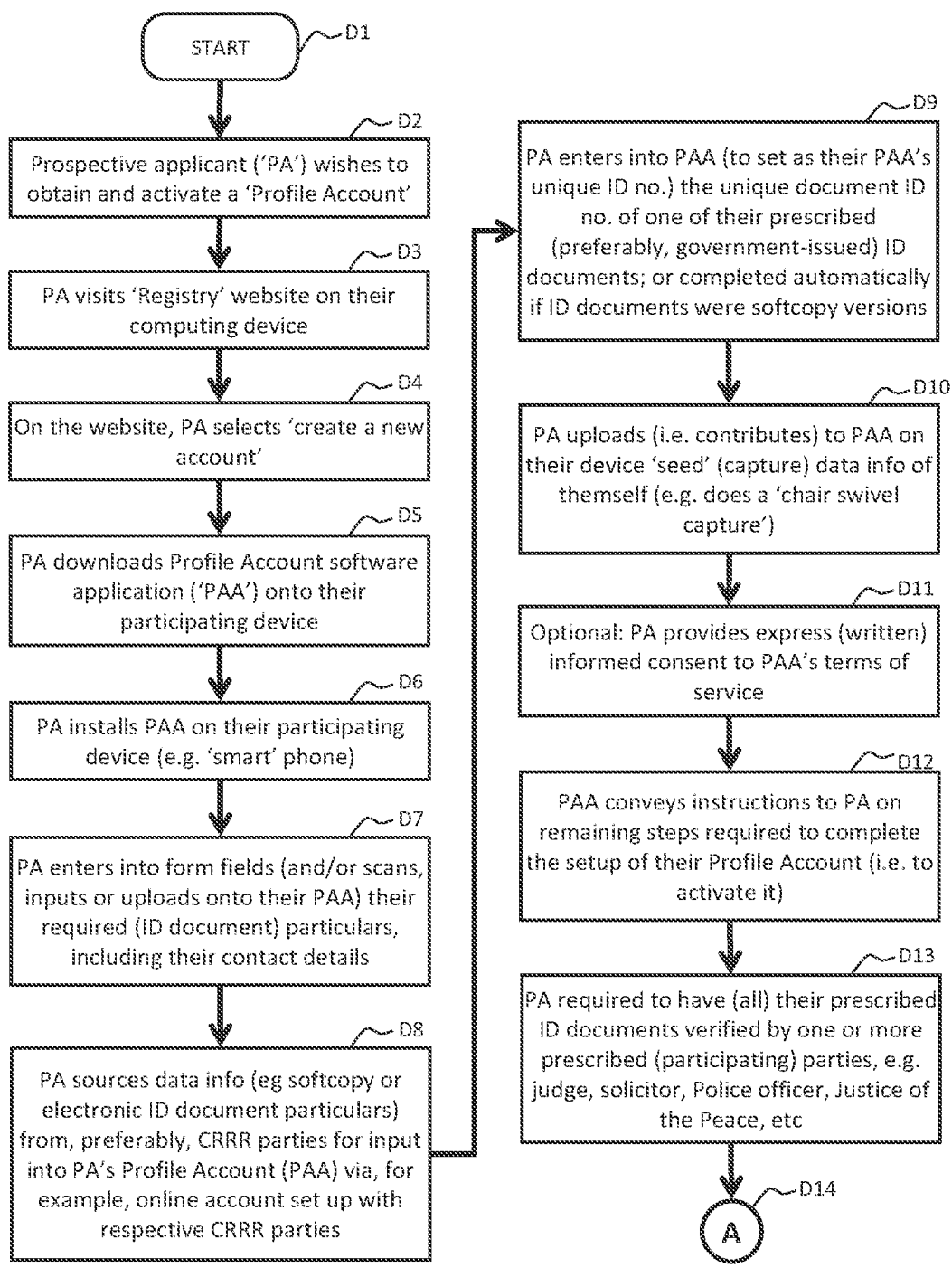
FIG. 5 is a flowchart depicting a method for seeding a profile account in accordance with an embodiment of the present invention.

In another embodiment, application server C100 is used as a remote contributing storage server for Profile Account data information. All of a client's devices may automatically synchronise with each other to ensure continuity, or most recent version, of the account holder's Profile Account data information. FIG. 5 is a flowchart describing an embodiment of an enrollment process for a Profile Account. That is, the process flow outlines how an individual proceeds through an initial setup of the Profile Account App (PAA).

In one embodiment, the process of FIG. 5 is performed by a computing device such as 'smart' device (phone) C006 in FIG. 4.

At step D2 an individual, who from hereonin will be referred to as a "Prospective Applicant" (PA) engages with the interface to obtain a Profile Account.

At step D3 the PA is directed to a Registry website on their computing device such as 'smart' device (phone) C002 or C006 in FIG. 4. In the context of the present specification, the term "Registry" is a generic term that refers to an organisation (such as a government body) that operates the appropriate technical devices, such as a server, a distributed computing system, a cloud service, or other computing devices which provide the functionality defined herein. It will be understood that the term "Registry" is used merely for clarity purposes and is not intended to limit the broader inventive concept described herein. At the Registry website, the PA selects a 'create a new account' menu item at D4.

Once the menu item is selected, at step D5 the PA is provided with the option to download the aforementioned Profile Account (e.g. PAA and/or PRA) software applications onto their (participating) device such as 'smart' device (phone) C002 or C006 in FIG. 4.

At step D6 the PA installs the PAA/PRA on one or more of their participating devices.

At step D7 the PA enters into form fields (and/or scans onto their PAA) their required ID document) particulars, including their contact details (e.g. email address and/or phone number).

It will be understood that the PA may cause text to be entered into the form fields by typing on the device or by speaking into the (or another) device (e.g. text dictation, using speech recognition), or by any other suitable method.

In another embodiment, optical character recognition (OCR) technology may be utilised. For example, the PA may scan their ID documents and suitable OCR software may convert the hardcopy information into digital information.

In one embodiment the PA uses a scanner to scan their hardcopy ID documents. The PA may use a dedicated scanning device, e.g. flatbed scanner, or their 'smart' device's camera or other input device capable of capturing an image of suitable resolution.

In one embodiment, at least some aspects of the identification documents may be in softcopy format. For example, some national authorities may provide limited access to databases that contain Passport, Driver's Licence or other identification material in a format suitable for direct electronic data interchange (EDI). The information may be provided in any suitable format, such as XML (eXtensible Markup Language) or any other suitable format Where ID documents are provided in a softcopy format, the PAA may include a function arranged to directly interface with such databases to acquire the required information.

Of course, it will be understood that the term identification data includes, where available, biometric data information embedded or associated with the electronic identification documents.

In step D8 the PA sources information from various, preferably, CRRR parties for input into their Profile Account (PAA) via, for example, online accounts set up with the CRRR parties.

If softcopy data information is not obtained directly from a hardcopy ID document, the PA may use other methods in order to obtain the information. Two example methods include:
(i) the PA receives softcopy data information transmitted to the PA's device while the PA is physically present at the ID document's issuing body's facility; and/or
(ii) by the PA logging onto the PA's customer online account (hosted and/or provided by the issuing body), with the PA then choosing to cause softcopy data information of the PA's to be communicated to the PA's device from one or more computing devices owned and/or operated by the issuing body (e.g. a remotely located central server such as C100 in FIG. 4).

It will be understood that the PA may obtain this softcopy data information via their online account in any number of ways. By way of example, two methods are implemented in the embodiment described herein:
(i) The issuing body can be instructed through the online account by the logged-in PA to transfer the PA's softcopy data information to the PA's device. The issuing body possesses an application that is capable of interacting with the PAA, termed the Add-On App (AOA). The AOA allows the issuing body to send an (encrypted) data information packet to the PA's device. The PA's PAA acknowledges the received data information signal as being from a recognised issuing body, and in one embodiment, ranks this data as being of a higher value due to the fact that it is received from a recognised source, which may be achieved through processes such as the processes herein described with reference to FIGS. 20 to 25.
(ii) The issuing body can be instructed through the online account by the logged-in PA to email and/or short message service (SMS) text to the PA's email address and/or mobile phone number a message in the form of a code. The PA's PAA could only make use of the code if it was sent by a recognised CRRR party (i.e. an ID document issuing body) and if the code corresponded with the PA's PAA. Therefore, once the code has been entered into the PA's PAA the code would be recognised as being from the issuing body.

In another scenario, an ID document issuing body such as a government department may present the option for a customer (i.e. PA) to create an online account (on that department's website), for example, not limited to, using the following methods:
(i) setting up the online account online at the department's website by:
(1) the PA validating themself using their ID document details,
(2) answering challenge-response type questions, and/or
(3) verifying other data information that the department holds that does not appear on the PA's ID document(s);
(ii) setting up an online account by phone, using the same, or similar, steps in (i); and/or
(iii) setting up an online account at the department's facility by providing Proof of Identity (POI) documents.

As part of creating an online account the PA may provide their email address, mobile phone number and/or other contact data information. The contact data information may then, in turn, be contributed to the government department's records of the PA's identity. Essentially, the contact details provided to the ID document issuing body (e.g. the government department) may become 'officially' associated to the PA's identity.

In some embodiments, CRRR parties may not be limited to government departments but other organisations which the PA may have already provided '100+ points' of identification to, to prove their identity.

In one embodiment, it may be a requirement that issuing bodies confirm the correctness of data that has been inputted into the PA's Profile Account (PAA) before that inputted data information is acknowledged as being factual. Therefore, in a manner analogous to a Profile Account having to become activated through verifications, particular data information inputted into the Profile Account may similarly be required to be verified before it is also activated, or acknowledged as reliable data information.

Below are given some non-limiting examples of the types of data that may be independently verified by government, quasi-government or other trusted institutions or bodies:
Residential address to be verified by one or more of the following: Driver Licence issuing body, utility companies, Police, or other relevant government department (including local council).
Mobile phone number to be verified by (re)seller of SIM and/or mobile phone handset (e.g. telecommunication carrier).
Birth date to be verified by birth certificate issuing party and/or Driver Licence issuing body, Police or other relevant government department.
Email addresses verified by the respective issuing body confirming that an email address is in fact assigned to that PA and/or account holder. Particularly, email accounts that are not free-to-obtain domain accounts, instead issued by parties that would have required the email address account holder to prove their identity before issuing.

It will also be understood that a Profile Account may be further refined by the addition of information that may be used to further identify or verify the account holder. For example, the account holder may add information regarding their academic, professional or trade qualifications.

Qualifications added to a personal account holder's Profile Account may, preferably, not be publically displayed. As with other aspects of a Profile Account, details may be withheld or private. It would typically be up to the account holder to elect to have any of the details publically disclosed.

Further, in one embodiment, an account holder cannot add details such as qualifications to their Profile Account, only issuing bodies may add such information. There is provided a specific section in a Profile Account that is arranged to directly accept qualification data information from approved institutions, such as Universities, Professional Associations, Trade Associations, and any other bodies tasked with overseeing a recognised qualification. In one embodiment, if an issuing body has not contributed qualification information to a relevant template field then the field may remain blank.

In another embodiment, a Profile Account (PAA) may only cause an account holder's qualifications to be publically displayed or conveyed via the PAA if the template qualification field has been contributed by an issuing party.

In step D9 the PA may (manually) enter into the PA's Profile Account, to set as their Profile Account's unique ID number, the unique document ID number of one of their government-issued ID documents.

In a preferred embodiment, this process is completed automatically. For example, the PAA may have installed a preferred prioritised list of ID documents, and following the PA causing their ID documents to be inputted into their Profile Account (as a digital scan of a hardcopy and/or a data information file of a softcopy) the Profile Application then determines which of the ID documents inputted has the highest list ranking, then uses that ID document's number to form the PA's Profile Account's (PAA's) unique ID number.

'Prescribed' in the context of the present specification refers to identification (ID) documents acceptable for completing the aforementioned registration steps and/or as required by local laws or policies. Preferably, in addition to assigning the ID document's number to the Profile Account, which may contain other characters or, the PA is required to also indicate the type of ID document it is such as issuing country (e.g. Australia), ID document class (e.g. Driver License), issuing state (e.g. NSW), and so on. Where the PA is required to input manually, the Profile Account includes a user interface selection menu. The PA's PAA presents the option of scrolling through a menu list to find the ID document type to select. In an alternative embodiment, the Profile Account may allow text or data to be entered into one or more interface form fields, during which potential ID document type matches may be presented or refined as a shortlist.

The ID document number, which now forms the PA's PAA unique ID number may, as a security feature, be subjected to cryptographic treatment, not limited to, rotating ciphers or circular-secure encryption techniques.

The applicant and the verifiers sought (or their respective participating devices) may be the only parties or devices that may unlock the cipher(s) or encryption scheme(s) to reveal the actual number representing the applicant's Profile Account unique ID number, and by association reveal their ID document's number.

Preferably, no party except the profile applicant or account holder may access, view, edit, copy, transfer, store and/or delete any of their Profile Account data Information, including any unique ID number that may be assigned to their Profile Account.

The unique ID number may also be revealed through pseudonymous methods. For example, multiple advocates (e.g. privacy foundations, civil liberty groups) retaining an encrypted portion (or data information packet) of the unique ID number. In this way, the full unique ID number can only be revealed by all advocates deciding to combine all portions (e.g. upon the presentation of a court order or warrant to identify the Profile Account entity). In one embodiment, each advocate may cause their packet to be transmitted to the ordering party. The ordering party may receive the packet via their respective AOA. The AOA reconstitutes the packets, revealing the ID number.

Figure 14:
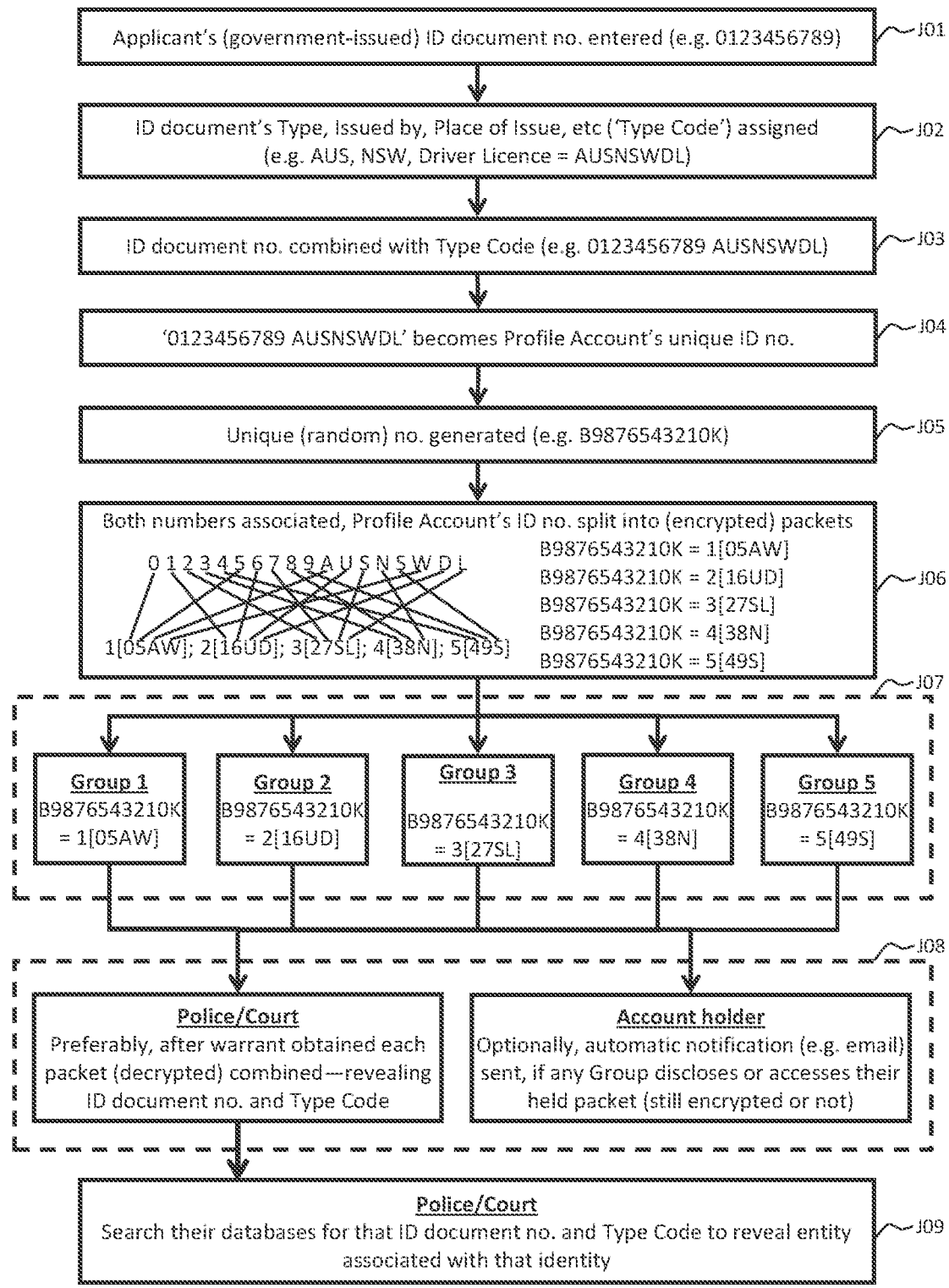
FIG. 14 is an pseudonymisation/anonymisation process in accordance with an embodiment of the present invention.

Referring to FIG. 14 there is illustrated a preferred embodiment of how an applicant may be identified when their identity is normally maintained as anonymous and/or pseudonymous.

Preferably, by default all data information associated with an entity's Profile Account is private, i.e. withheld from any disclosure, including from all parties involved in the development, production and ongoing refinement of the PAA. In normal circumstances, the Profile Account's owner determines whether they wish to cause any of their data information to be disclosed to another party.

However, in one embodiment, should an applicant wish to disclose any of their data information they may only be provided the opportunity to disclose genuine data information, or no information.

For example, an applicant's official name may be [First] John; [Middle] Roger; [Last] Smith. In this example, the applicant may disclose one, two or all three of their names. The Profile Account may convey to another party the class (e.g. First, Middle, Last) of any of the names disclosed. So, if the applicant only wished to disclose their First name, their PAA may disclose only '(First) John'.

In step D10 the PA contributes to their Profile Account on their device 'seed' (capture and/or characteristic) data information about themselves.

'Seed' capture and/or characteristic data information need not originate only from capture devices owned and/or operated by the Profile Account owner, but may originate from, or be captured by, one or more third party devices.

Further, seed data information may include multiple Profile Account data information sets. In one embodiment, (surveillance-type) capture data information is not contributed to a Profile Account. Instead, only characteristic data information is contributed in a form which does not allow a reverse conversion into (surveillance-type) capture data information for playback or viewing; thus, reinforcing entity and/or identity privacy.

However, a Profile Account accepts seed capture data information to be contributed so that an applicant's head/face, neck and tops of the shoulders (e.g. 'portrait shot') may be taken and attached to the applicant's Profile Account). This would form the applicant's 'passport-style' profile image. It will be understood that the image may be a multi-dimensional multimedia file not limited to two-dimensions or a single frame. Such a media file may be principally used for the verification sighting process, as described later.

In a further embodiment, the (surveillance-type) seed (capture) data information may be deleted automatically by the Profile Account and/or manually by the applicant following Profile Account activation. From the time of activation no further (surveillance-type) capture data information may be stored or contributed to a Profile Account.

In yet another embodiment, despite seed (capture) data information being initially stored or contributed in the previous embodiment, i.e. before PAA activation, characteristic data information may still be produced, then stored or contributed to the Profile Account, at the same time.

At step D11 the PA provides express (written) informed consent to Profile Account's Terms of Service (ToS) agreement (this may be an optional step, depending on local laws and regulations).

At step D12 the Profile Account conveys instructions to the PA on any remaining steps required to complete the setup of their Profile Account. Instructions conveyed in this regard may occur at other times. For example, instructions may be conveyed at or after particular times or 'initiating events' up until the PA's Profile Account is activated.

An initiating event includes the completion of a verification by a prescribed verifier. The instructions to follow an event such as this may convey the remaining verifiers to be engaged before the PA's Profile Account becomes activated, should more than one verifier be required.

At step D13 the PA may be required to have their prescribed ID document originals verified (and/or authenticated) by one or more prescribed parties such as a judge, solicitor, Police officer, Justice of the Peace, etc.

The more CRRR parties that verify the applicant's Profile Account (or PAA), in conjunction with, for example, the PA's associated ID documents, the more credible the PA's Profile Account may become.

Preferably, the PA would be required to have their prescribed ID documents verified by each respective document issuing party.

At step D14 the flowchart process may end, though the next Profile Account stage (e.g. the verification process, for activating a Profile Account) may continue, as outlined with reference to FIG. 12 and/or FIG. 19 (described below).

Figure 6:
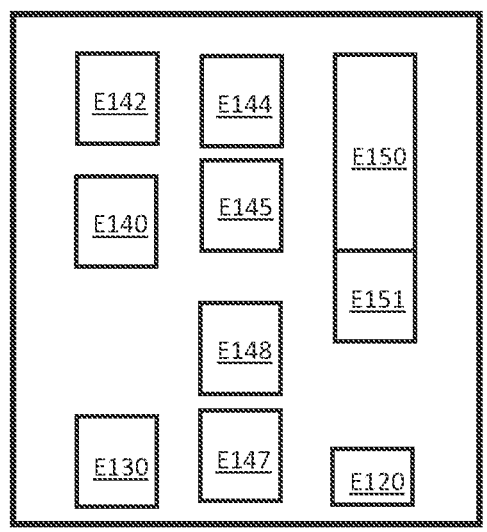
FIG. 6 depicts an example capture device in accordance with an embodiment of the present invention.

Turning now to FIG. 6, there is shown a device which is one embodiment of a portion of a wearable capture and/or contributing device E100, such as the wearable camera and microphone device C001 or C007 in FIG. 4. Device E100 includes a capture devices (e.g. a microphone and camera) E120 and E130, processor E140, memory E142, temporary cache E144, optionally non-volatile memory E145, input ports (e.g. USB port) E147 and communications link E148, operating system (e.g. a boot up EPROM) E150 and operating software E151.

Figure 7:
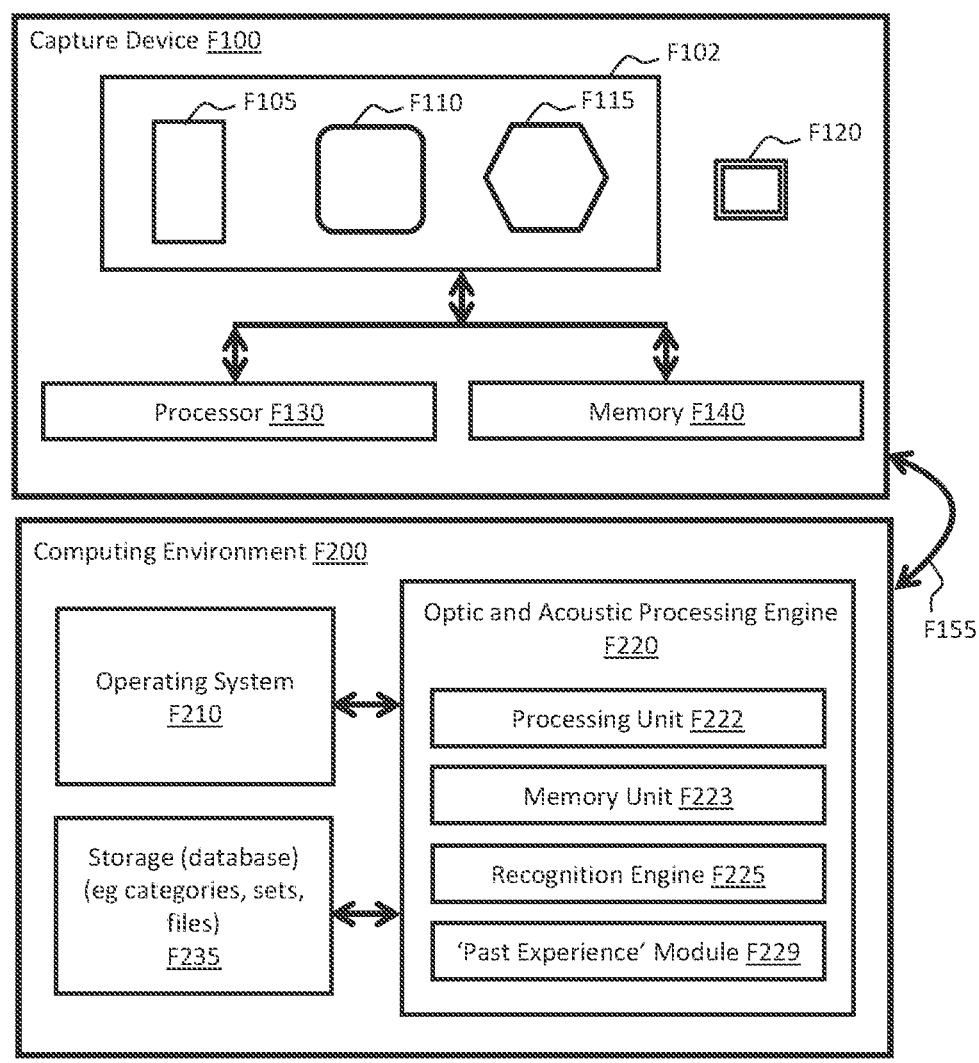
FIG. 7 depicts another example capture and contribution device in accordance with an embodiment of the present invention.

The manner in which the device of FIG. 6 interacts with a computing environment is shown in more detail with reference to FIG. 7. A capture device F100 includes capturing devices (generally denoted by F102) F105, F110 and F115, which may be a microphone, a camera, an Infrared camera, etc. These devices interact with a processor F130 and memory F140. The device may have an input port F120 (e.g. a USB port). The capture device F100 interacts with computing environment F200 via a communications link F155. The computing environment includes an operating system F210, storage F235, and an optic and acoustic processing engine F220, which comprises a processing unit F222, a memory unit F223, a recognition engine F225, and a 'past experience' module F229.

It will be understood that the capture device F100 and computing environment F200 may be two separate units, or may be integrated into a single unit, depending on the specific application. Indeed, both units may be integrated into a wearable device.

Such wearable devices may take the form of devices integrated into clothing. Clothing integrated devices may be able to determine body positions, how one sits, stands or walks, crosses one's arms or legs. Many of the items (i.e. recognition qualified (data) sources) mentioned above could be incorporated into 'smart' clothing (or fabric), not limited to, pulse oximeters.

Figure 8:
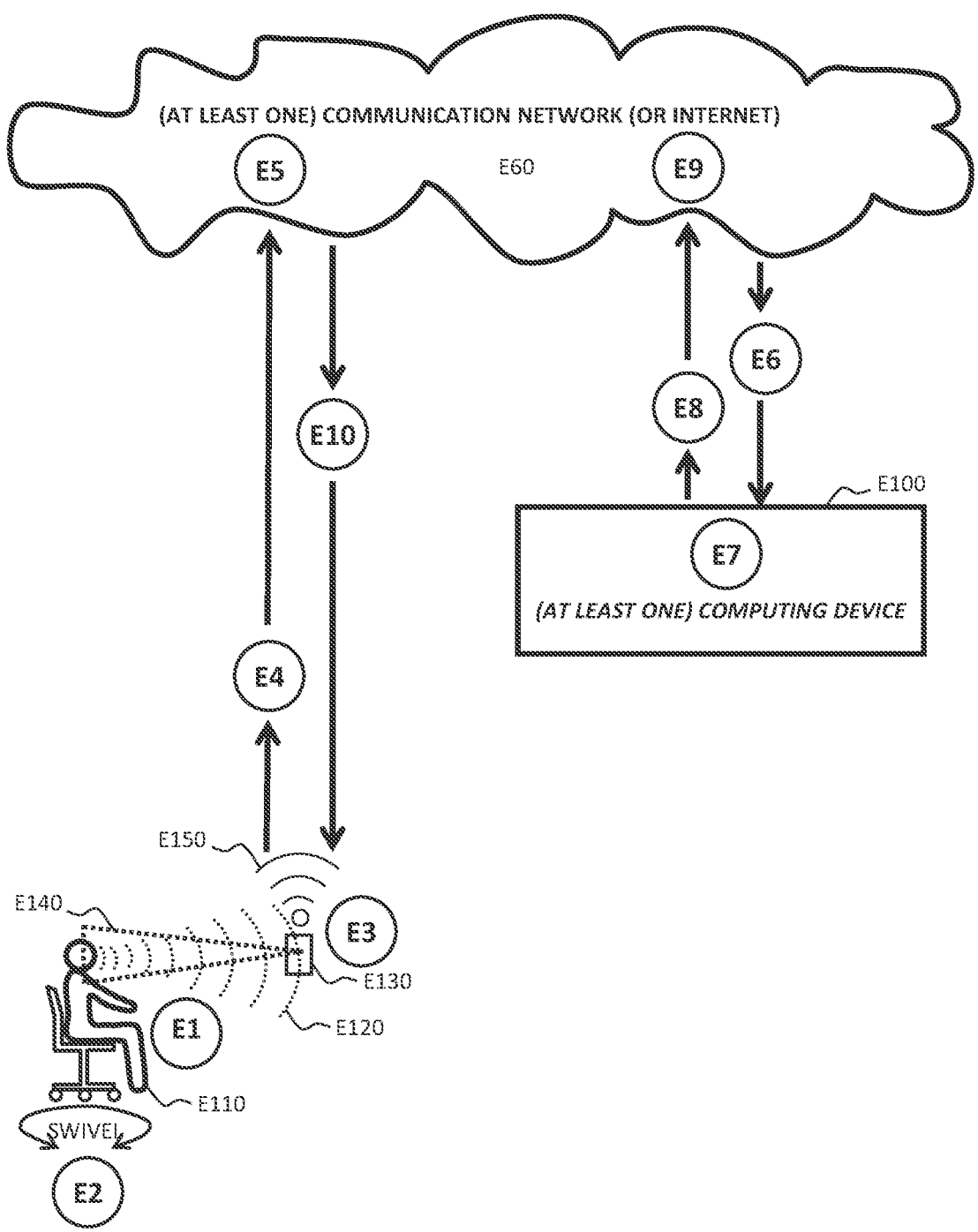
FIGS. 8, 8a and 8b are diagrams depicting an example of aspects of a profile account in accordance with an embodiment of the present invention.

FIG. 8 is a flowchart diagram which describes a typical capture session by a Profile Account owner E110. It will be understood that while the ensuing example describes facial and vocal captures, various other capture subjects, or reference or focal points form part of the embodiment described herein.

Biometric data information, 'digital persona' data information, orientation, location and position data information, or any combination of these types of data information may be employed to form 'seed' capture data Information of the Profile Account owner. These different types are represented by the different categories/classes or sets illustrated in the FIG. 10A screenshot example.

At step E1 the PAA owner (labeled 'User A' for the purpose of this example) E110 may initiate one or more captures on a computing device E130 such as 'smart' device (phone) C006 in FIG. 4. The smartphone E130 may be a capture and a contributing device, as described in FIG. 7 and may include the PAA, which conveys various instructions. A user E110 may be required to read particular content out loud, such that it may be captured by the smartphone E130.

For example, the PAA may include certain pre-chosen phrases which are intended to cover a wide variety of phonetic sounds and inflections. When a user E110 reads the phrases, the smartphone E130 captures vocal (i.e. voice patterns) and biomechanical or anatomical (e.g. facial) data information.

Interactive information may be conveyed such as summarised statistics or analytics on the user's E110 Profile Account, e.g. the progress of their captures, what (capture) tasks may be remaining, tips on how to achieve the required or outstanding captures ('turn your head to your left', 'increase the room's brightness/light conditions for this capture session'), notifications of capture completions, the need to repeat particular captures for greater accuracy, the current Profile Account recognition accuracy score or 'threshold' etc.

In step E2 the user E110 conducts the capture(s). In one example, a capture may be effected by moving (e.g. swiveling in a chair) to allow the capture device's sensor(s) and/or camera(s) to capture different aspects of the User's facial/head profile E140 and/or voice projections E120.

As mentioned above, facial and vocal type captures are only described as examples. It will be understood that the user E110 may not be required to sit in a chair to perform captures.

For example, in a further embodiment the user's E110 capture device may be a wearable device such as a health, medical or fitness device, tracker or monitor, e.g. 'smart' fashion/wearable health technology C008 in FIG. 4. Thus, the user E110 may simply wear the device and proceed with their normal life activities whilst the wearable capture device captures data information on and about the user E110.

In another embodiment, the user's E110 capture device may be a computing device such as computing device C003 in FIG. 4; and the user's E110 use or interaction with that device may lead to the formation of 'digital persona' and/or biometric capture (then characteristic) data information, as an associated or background activity.

Furthermore, in a specific embodiment of the Profile Account it is the requirement for all measurable metrics (e.g. biometrics) of the entity to be captured before seeking or being eligible for a Profile Account verification. In an embodiment, no further (i.e. uniquely different) captures of a particular metric may be added once all 'metric positions' have been filled. For example, once all of the user's E110 fingerprints, palmprints, earprints and both eyes (e.g. retinas/irises) have been registered in the user's E110 PAA no more new registrations (of those types) may be added for the user.

Advantageously, when the user E110 has their metrics verified, the user E110 would be required to capture (with the verifier witnessing) each of the user's E110 prescribed metrics.

Thus, if all 10 of the user's E110 fingerprints are verified as each being assigned to a Profile Account (PAA) 'metric position' (e.g. a 'finger slap') and since by design the PAA only has a maximum of 10 fingerprint positions available to be registered, then no other entity's fingerprint may later be used, or associated as, a 'key' for the user's E110 Profile Account (PAA).

Therefore, if another user had assigned one of their fingerprints to the user's E110 Profile Account then a verifier during the verification process would be informed that one of the user's E110 captured fingerprints was not recognised by the Profit Account upon, apparent, re-capturing. In one embodiment of this occurring, the PAA may permit any erroneous allocated data information to be deleted, with the user E110 required to (with the verifier witnessing) capture respective sources.

At step E3, if computing device E130 is also a contributing device, the user's E110 computing device E130 may (after capturing and processing) store the captured data information in the Profile Account data information categories, sets and/or files.

At step E4 the computing device E130 may transmit a wireless data signal E150 to a communication network E60 in the pursuit of remote data information processing and/or storage.

In a preferred embodiment the user's E110 capture data information is transmitted to another computing device (for synchronised backup), i.e. to another contributing device E100. This may be a local and/or remote server such as computing device C100 described with reference to FIG. 4. Further, in order for the user E110 to maintain control and secureness over their data information the backup device may be owned and/or operated by the user E110.

At step E5 the data signal transmitted in step E4 is, in one example embodiment, 'propagated' along an ad hoc communication network of one or more computer device (router) nodes. These computer device nodes include various participating devices which may be owned/operated by other entities.

Any data information propagated by another entity's operated device would be encrypted to prevent the possibility of the other entity being able to derive any benefit from the data information which may be temporarily stored on the device as the data is propagated through the device. In addition to being encrypted, the data is transmitted in (random) asymmetric data information packets via different propagation nodes. This method reduces further the probability of data information security breaches.

At step E6 the data information signal is transmitted to computing device E100.

At step E7 the computing device E100 processes and/or stores the transmitted data information. In one embodiment, in order for the user's data information to be trusted it must be captured by a trusted sensor device and referenced on and stored by a trusted contributing device. A device which is registry or regulator registered (as described in a co-pending application) is an example of a trusted device.

At step E8, should the computing device E100 be required to send a data information signal to another device, such as to 'smart' device (phone) E130, the data information signal transmission may be sent, at step E9, via a communication network E60.

At step E10 additional, refined, updated or synchronised data information from (at least one) computing device E100 is transmitted to device E130.

In one embodiment, the process of capturing data information is a completely automated activity. The user is not required to initiate the capture session. However, until the user's Profile Account has 'matured' the designation of the subject of the capture and/or initiation of the capture session may be required. These temporary capture device and long-term 'contributing' device storage steps are described in more detail in FIG. 9.

Figure 8A:
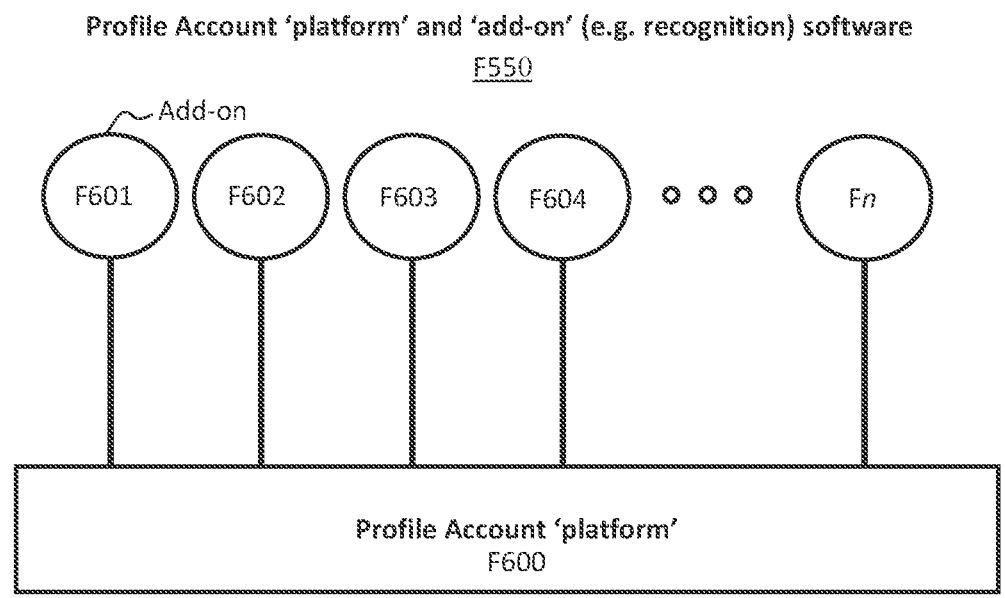

FIG. 8a is a diagram depicting the principal Profile Account software as a 'platform' F600 (e.g. PAA, PRA), with the capability to accept 'add-on' software (e.g. AOA) F601, F602, F603, F604 to F6n (e.g. recognition applications or programs, which may be developed by others).

Some example add-ons are described as follows:
(1) Biometric software which may facilitate recognition of appearances, bio-dynamics, social behaviors, natural physiography, imposed physical characteristics, etc.;
(2) 'digital fingerprint' or 'digital persona' software which may facilitate the acquisition, processing, interpretation of data information related to device interactions or use;
(3) software which may allow orientation, location and position data information to be utilised; and
(4) software which may derive benefit from data information related to social interactions, associations or reputations such as those related to social media engagement or third party confirmations of another party's relationships or claims.

In addition to the above, a variety of other person-identifying techniques facilitated by add-on software may include:
names—or what the person is called by other people:
codes—or what the person is called by an organisation:
knowledge—or what the person knows; and
tokens or qualifications—or what the person has.

Figure 8B:
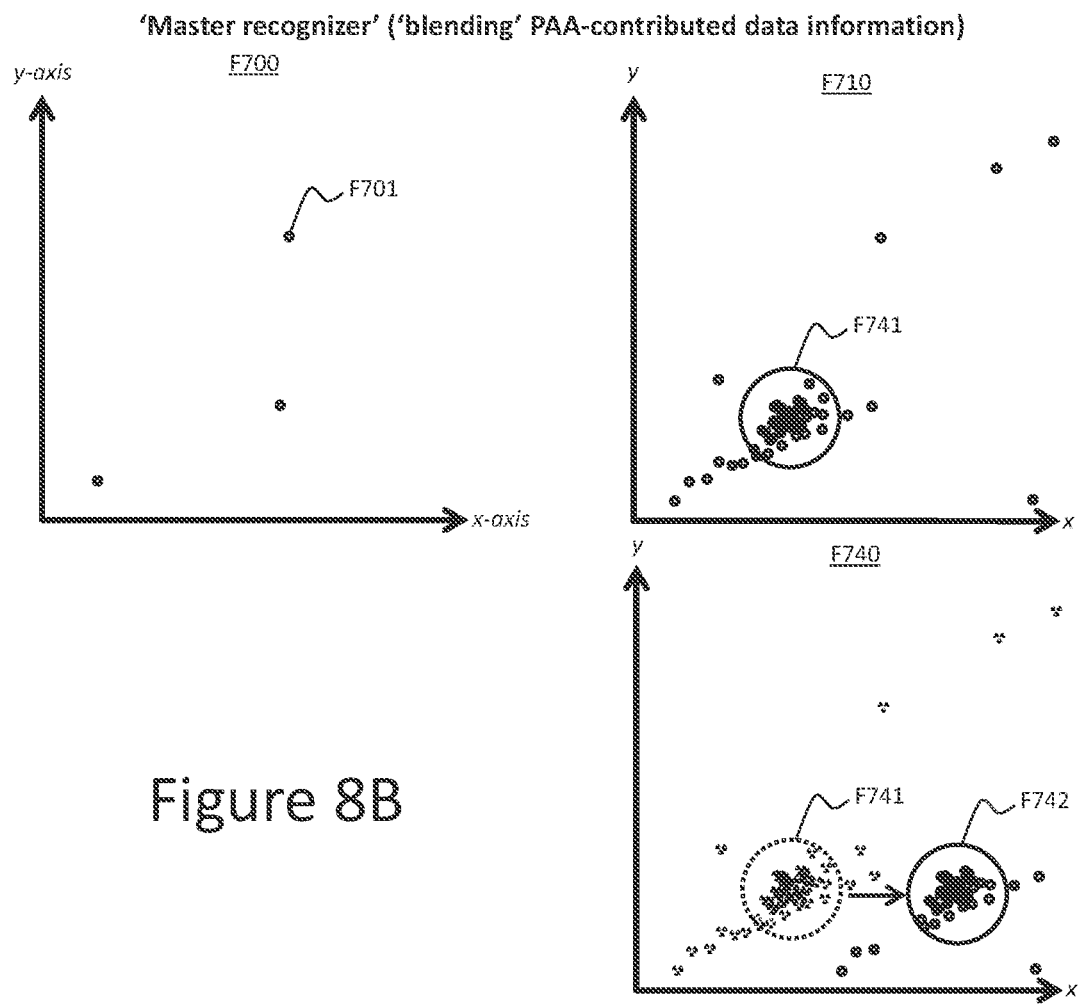

FIG. 8b describes a system and method for creating a Profile Account by taking contributed data information via add-on algorithms and 'blending' the data information into a single or master authenticator, identifier, verifier and/or recognizer for use in easy authentication, identification, verification and/or recognition purposes.

In one embodiment, a master recognizer may comprise of one or more 'templates', with each template being of either a particular type of Profile and/or Activity Profile. In another embodiment, a template may represent a single- or multi-dimensional scatter plot or graph of markers, e.g. F700, which is a two-dimensional graph with an x- and y-axis. Each plot point (or marker), e.g. F701, may form following the contribution of characteristic data information, e.g. a captured Profile may lead to one marker being formed on one particular graph. In another example, a marker may form on a three-dimensional graph, with the position of the marker dependent on the type, time and magnitude of the characteristic data information which it was derived from.

For example, a particular (e.g. biometric facial) Profile may give rise to a marker at position x=1.0, y=2.5, z=−3.0 on a three-dimensional template. However, a particular (e.g. gait movement) Activity Profile may give rise to a marker position at x=50.0, y=−22.0, z=12.0. Though, an Activity Profile may give rise to multiple markers.

In sum, more characteristic data information contributed to a Profile Account (PAA) consequently results in more markers contributed to a template, e.g. F710 versus F700; thus, creating a scatter of graph plots. Accordingly, a pattern may manifest, with trend lines or averages (e.g. F741) able to be calculated. Average values may represent the most 'refined image' of a Profile Account owner at a particular time. In regard to a refined focal point 'shifting' over time this may be illustrated by F740, showing the cluster has move to the right (i.e. an increase in x-axis value) from F741 to F742. Shifting may be due to natural evolutions or progressions such as changes attributed to aging.

It will be understood that while FIG. 7 shows a capture device F100 and computing environment F200 that are separate, both may be housed in the one housing, and if in the one housing may be considered a capture and contributing device similar to 'smart' devices (phones) C002 or C006 in FIG. 4. If in separate housings computing environment F200 may be considered only a 'contributing' device such as computing device C003 in FIG. 4. Alternatively, if there was no (long-term) storage (database) (e.g. categories, sets, files) F235 then computing environment F200 may operate only as a processing device such as server C100 in FIG. 4. Such variations are within the power of a person skilled in the art.

Figure 9:
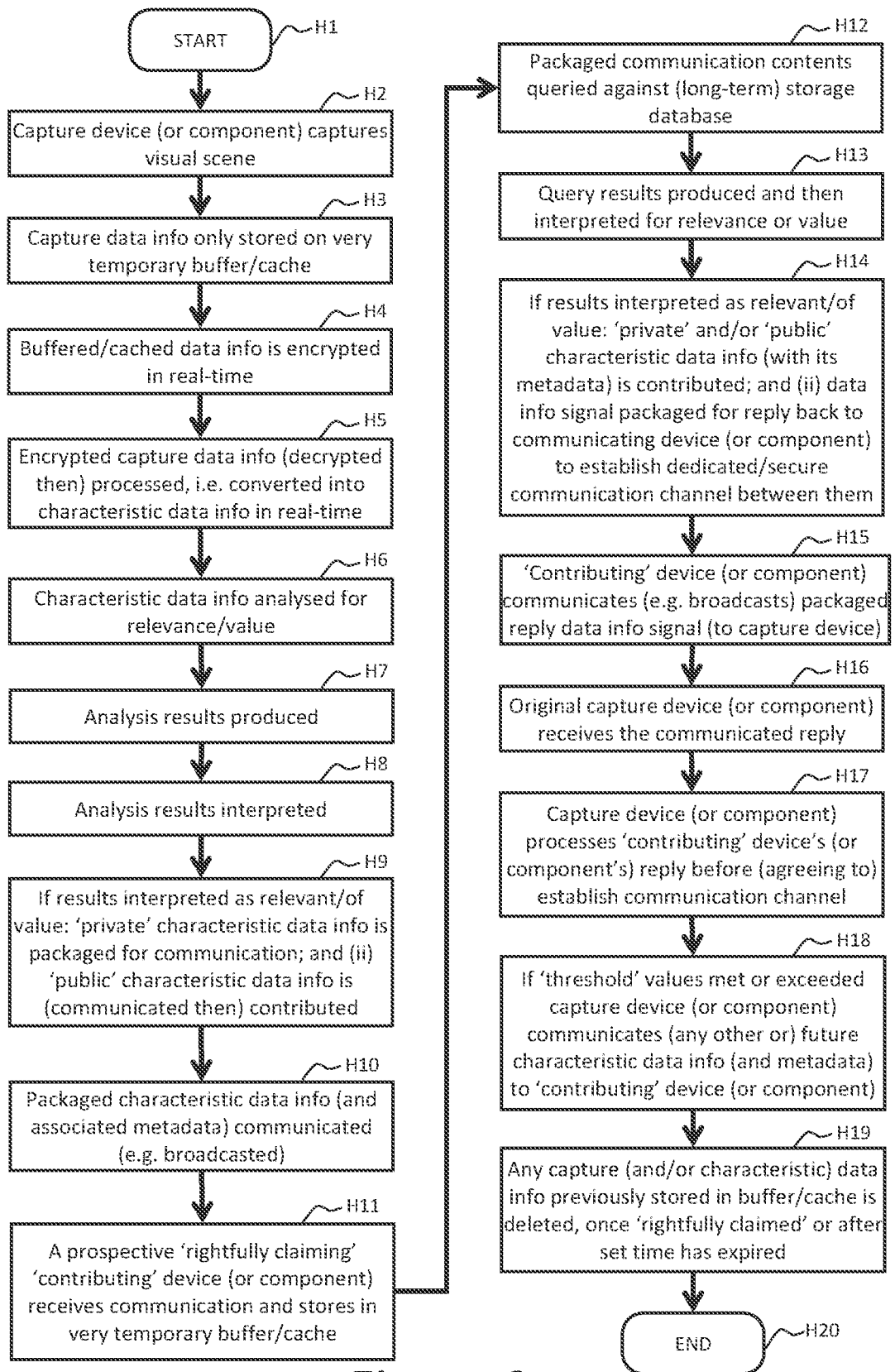
FIG. 9 is a flowchart depicting a capturing process in accordance with an embodiment of the present invention.

FIG. 9 is a flowchart describing one embodiment of a process for the capturing of data information is processed in order to protect sensitive or personal data information.

At step H2 a visual scene is captured by capture device F100. Subsequently, at step H3 the digital data information is stored in a temporary memory buffer. The temporary storage occurs while the data information is waiting to be encrypted by the next step; and, optionally, the data information is not allowed to remain in the memory buffer for a defined period of time, nor is it stored in a non-volatile form (e.g. tape, hard disk drive, solid state drive, DVD, etc).

At step H4 the buffered digitized capture data information is encrypted in real-time. This encrypted data information is temporarily stored. The encrypted data information may be transmitted via communications link F155 to a memory unit for temporary storage.

At step H5, which occurs concurrently with step H4, the PRA reads the digitized capture data information and utilises processor F130 and/or processing unit F222, 'past experience' module F229 and/or recognition engine F225 in FIG. 7 i.e. the PRA in this step may convert capture data information into characteristic data information, in real-time. Characteristic data information takes the form of pattern, machine readable or other mathematical and/or recognition code, which may be generated and recognised by an add-on program.

In more detail, the capture device may capture one or more scenes and a 'significant' or 'noteworthy' instance and/or sequence and a 'significant' or 'noteworthy' instance and/or sequence may then be PRA detected.'. Such instances and/or sequences may later be recognised as part of a behavioral pattern.

As previously described, a set of characteristic and/or algorithmic data information, for example, that related to 'points of reference' (e.g. Profiles or Activity Profiles) during the activity sequence would be stored. Such Profiles may relate to:
  (i) environmental objects (e.g. a chair); and
  (ii) physical biomechanics of the account holder during the sequence of events.

Therefore, no party is able to replay all instances of captured images for example. In another embodiment, should the account holder wish to view the data information stored on those chair sits, the only data information viewable is analytic data information, for example, about biomechanics, not an audiovisual file of the user.

Similar to a previous exemplary embodiment, characteristic data information (in step H5) is stored on a temporary memory buffer such as memory F140 and/or F223 in FIG. 7. The temporary storage occurs while the characteristic data information awaits one or more 'rightful claim' determinations; and preferably the data information (in this step or at this process stage) is not stored on longer-term mediums (e.g. tape, hard disk drive, solid state drive, DVD, and so on).

In the embodiment described, the capture data information is converted into a form of characteristic and/or algorithmic data information, which may be derived from analysis of pre-existing (multimedia) data information.

At step H6 the PRA analyses the characteristic data information using an optic and acoustic processing engine such as engine F220 in FIG. 7.

At step H7 analysis results are produced, and the analysis data information is temporarily saved in memory such as memory F140 and/or F223 in FIG. 7.

At step H8 the results are interpreted to determine if they are relevant and/or of value. A processor such as processor F130 and/or processing unit F222 in FIG. 7, in communication with data information stored in memory such as memory F140 and/or F223 in FIG. 7, runs the interpretation process.

Interpretation results are stored in a temporary state, as described previously. At step H9, should the results be interpreted as relevant and/or of value the characteristic data information (formed in step H5) is then packaged for transfer via communications link F155 and/or communication network C60, to a computing device (such as a computing environment F200 in FIG. 7), which may be a device such as 'smart' (device) phone C002 or C006 in FIG. 4.

The packaging process may include:
  (i) segmenting the characteristic data information, so that the characteristic data information concerns or relates to (prior capture data information that was of) a single moment in time of a visual scene or the smallest viable and/or feasible time moment to ensure no excess characteristic data information is transferred to other potential devices; and
  (ii) the adding or attaching of metadata to the characteristic data information to be transferred, and metadata may be, for example, not limited to:
    time/date and location of capture;
    the capture device's (unique) ID number and its position;
    interpretation analysis results; details of the characteristic data information such as type (e.g. which categories, sets and/or files the characteristic data information relates to perhaps, to assist with structuring long-term storage in a database); and
    the required 'threshold' value for contributing.

The packaging process (e.g. segmenting and/or metadata attaching) may utilise a processor such as a processor and/or a processing unit in communication with data information stored on, or in, memory and an operating system.

In another embodiment, any characteristic data information classified as 'public' that was interpreted as relevant may be stored into a 'learning' module such as 'past experience' module F229 in FIG. 7.

Alternatively or additionally, data information may be transferred via a communications link F155 to a server such as computing device C100, or any other device, for integration into a similar 'learning' module such as 'past experience' module F229 in FIG. 7.

Data information classified as 'private' is not treated to such integration and/or communication processes as described for 'public' data information, unless the 'private' data information is being contributed following a 'rightful claim' to one or more 'contributing' devices operated by that same 'rightfully claiming' party.

If there is not any relevant characteristic data information based on the interpretation results then the characteristic data information is deleted and/or overwritten by new data information.

At step H10 the packaged characteristic data information is transferred via a communication link F155 to a prospective 'contributing' device.

Communications link F155 may broadcast in conjunction with a communications module (not shown), and may connect to other devices, e.g. F100 and/or F200 in FIG. 7, which may have a similar communications module. These other devices may be a 'smart' device (phone) C002 and/or C006, and/or computing device C003 and/or C100 in FIG. 4.

At step H11 a prospective 'contributing' device receives the communicated packaged characteristic data information.

If the 'contributing' device F200 is the same device that transferred the communicated packaged characteristic data information, then the following steps apply as though it was a separate device.

The incoming data information, from the capture device described at step H10, is not allocated to storage such as storage in FIG. 7, but only stored temporarily in buffered memory such as a memory unit while a processing unit such as processing unit F222 in FIG. 7, a recognition engine such as recognition engine F225 in FIG. 7 and a 'past experience' module analyzes/correlates the incoming data information against database stored data information categories, sets and/or files.

At step H12 the 'contributing' device, described in step H11, queries the incoming characteristic data information (and metadata), or the contents of the packaged data information signal communication, against stored information for any correlation, without storing any of the incoming data information in a long-term storage database.

At step H13 the query results are produced and interpreted to determine if there is relevance or value.

In one embodiment, the incoming metadata includes positional (time and location) data information that may be an important element because the owner/operator (e.g. applicant or account holder) of the 'contributing' device may have a 'positional trail' of already contributed metadata that may be analysed against the new incoming metadata for geographical closeness. Should new, recently contributed metadata be determined as having feasible positional relationships, then the new incoming metadata (associated with its respective characteristic data information) may be interpreted as being of greater relevance or value, i.e. more likely to be representative of the 'contributing' device's operator or Profile Account's applicant or account holder.

At step H14 if results are interpreted as relevant or of value then the incoming characteristic data information meets or exceeds the 'contributing' device's Profile Account (correlation) 'threshold' for acceptance.

A correlation match allows the incoming data information to be allocated to storage. In other words, the characteristic data information (with metadata) is contributed to a 'rightfully claiming' 'contributing' device, but only if the capture device's imposed 'threshold' value for contributing is met and/or exceeded. The capture device may also dictate the minimum, not limited to, 'quality' level of new characteristic data information (and its metadata) being contributed to a 'contributing' device.

A data information signal is packaged for a reply back to the communicating device. The reply response informs the communicating capture device of the 'contributing' device's interpretation results, sending only (id)entity pseudonymous/anonymous data information.

Sending the response allows the capture and 'contributing' devices to enter into, together, a dedicated and secure data information communication channel.

At step H15 the 'contributing' device transfers the reply data information signal to the capture device, which preferably is the only device able to receive (and/or decrypt) the reply data information signal, as described in more detail later with regard to.

In one embodiment the 'contributing' device replies with a data information signal which includes 'handshake' and/or 'hash(ing)' data information which was originally transferred by the capture device. This method is used to establish a dedicated and secure data information communication channel between the two devices (or components). The method may employ, for example, Transport Layer Security (TLS) and/or Secure Socket Layer (SSL) cryptographic protocols and/or one or more other secure (e.g. client-server) communication methods from time to time.

At step H16 the capture device is able to receive the reply data information signal.

At step H17 the received 'contributing' device's communicated reply results in the following process steps being undertaken by the capture device (or component):

(i) 'contributing' device's query and/or interpretation results are evaluated, e.g. not limited to, ensuring that the 'contributing' device's (or component's) 'threshold' value meets or exceeds the capture device's set 'threshold' value;

(ii) a dedicated and secure data information communication channel is 'opened up' between both the capture device and the 'contributing' device.

At step H18 the capture device allocates future converted capture data information, i.e. characteristic data information (with associated metadata), to be transferred securely to the 'contributing' device.

Despite the parameters of the communication data information exchange being agreed to by the 'contributing' device, as part of step H14, the 'contributing' device for added security may additionally vet any future incoming characteristic data information (and its associated metadata) to ensure 'threshold' values continue to be met and/or exceeded.

Further, the 'contributing' device may also communicate similar vetting results to the capture device in a manner analogous to steps H14 and H15.

Furthermore, the capture device may also conduct similar processes as described in steps H16 and H17, not limited to, for example, ensuring that the 'contributing' device's 'threshold' values were, and continue to be, acceptable. If the values are not acceptable, the dedicated and secure data information communication channel between the two devices may be cancelled.

At step H19, preferably, any capture data information, that was stored in buffered memory, once 'rightfully claimed' by a 'contributing' device, is deleted from the capture device or overwritten with new data information.

It should be noted that at, or in, any step described with reference to FIG. 9, should data information be transferred and/or transmitted via a communications link such as communications link C60 in FIG. 4, and other devices such as wearable camera and microphone C001, 'smart' fashion C008 and/or 'smart' device (phone) C006 in FIG. 4 are used (e.g. in an ad hoc network data information communication 'propagation' arrangement or method), in order for the 'rightful owner' to receive their data information, then any data information must similarly conform to the exemplary and/or preferred embodiments with respect to maintaining the data Information of a first party (i.e. entity or account holder) as anonymous, private, encrypted and confidential while that first party's data information is 'propagated' during the communication exchange(s).

One method or embodiment to achieve this security is to ensure that during the 'propagation' process, data information is only temporarily stored on buffered memory (as described in other steps in FIG. 9), until such time as the data information has been 'rightfully claimed' and/or a set time limit has expired.

At step H20 the process ends or otherwise the flowchart process is repeated as necessary.

Figure 10:
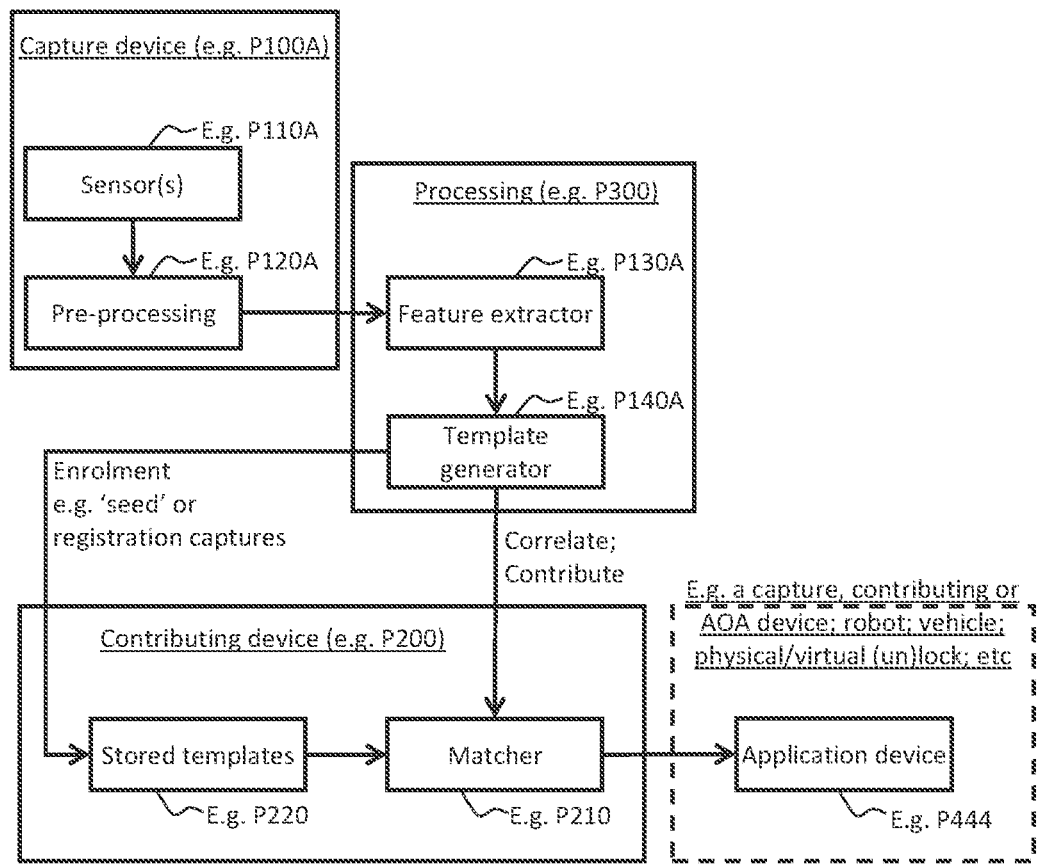
FIG. 10 is a flowchart depicting a process for a typical biometric system in accordance with an embodiment of the present invention.

FIG. 10 depicts a biometric system with reference to typical system's components.

In one embodiment, capture device P100A comprises two main components, i.e. one or more sensors (P110A) and one or more pre-processing units (P120A).

In another embodiment, a processing unit is integrated into capture device P100A. The processing unit P300 comprises two main components, a feature extractor (P130A) and a template generator (P140A).

A feature extractor may represent platform add-ons such as recognition software developer kits (SDKs). Any number of SDK service providers, for example, may be employed including Aurora; MegaMatcher, VeriFinger, -Eye, -Look, -Speak; OmniPerception; Gait Recognition System; Grus Iris; Ins ID iCAM; Fujitsu PalmSecure; and others.

In one scenario, a biometric source is captured by the capture sensor (P110A), the data pre-processed (P120A) and subsequent features within the data information are extracted (130A). Subsequently, a feature template is generated (P140A). If the feature template is a new template for registration or enrolment purposes it is contributed to a storage device (P200), or a new template is matched (P210) against stored templates (P220) and if correctly correlated (within set degree of tolerance or threshold) an authentication result occurs, which may 'unlock' a virtual or physical access point or application (P444). Such applications may include device or web-interface log-ins to effect control or convey commands, or to convey to another party a recognition value.

Figure 11:
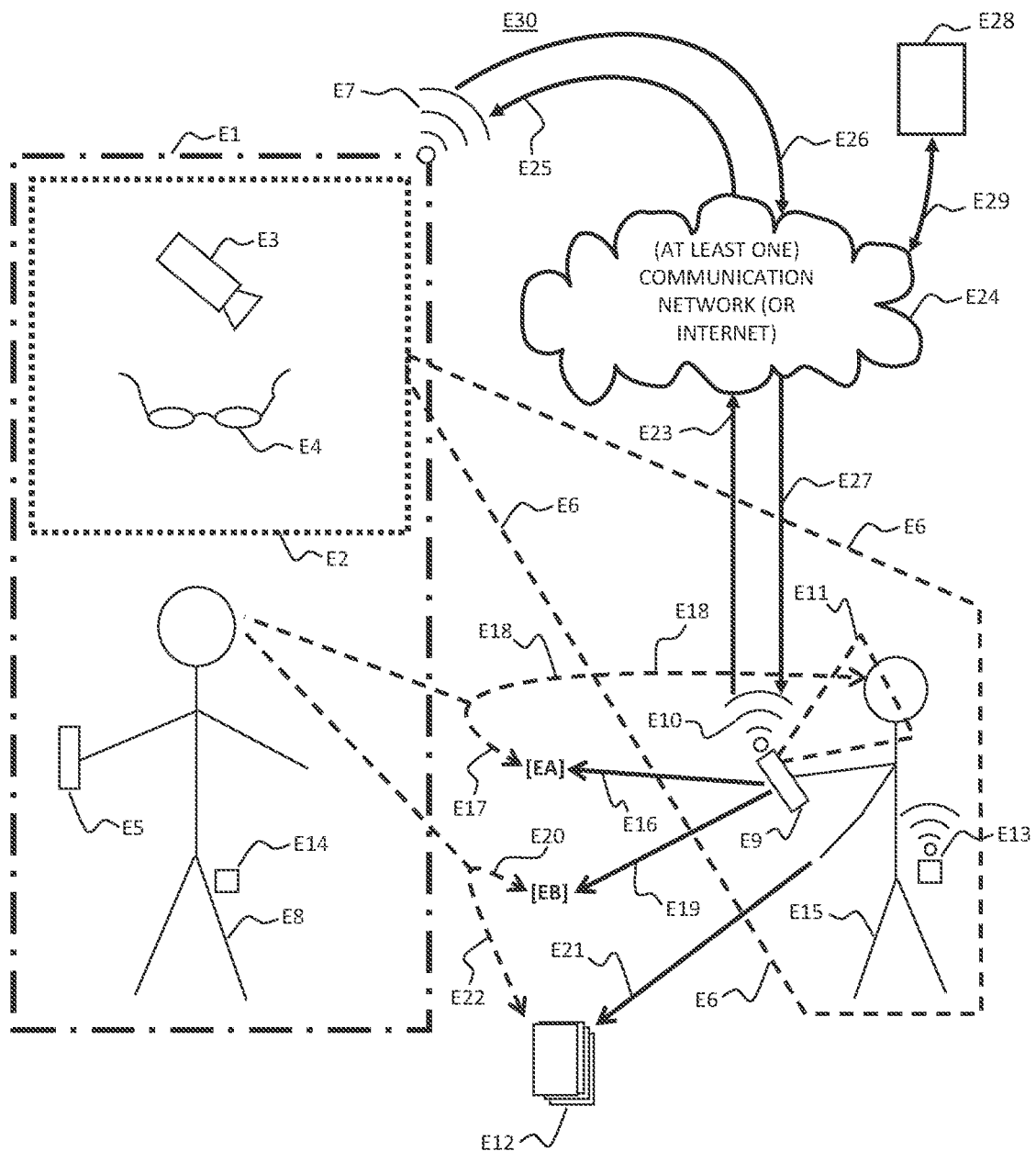
FIG. 11 is a diagram depicting a verification process in accordance with an embodiment of the present invention.

FIG. 11 is a diagram of one embodiment of a networked computing environment for a Profile Account verification session E30 to officially link or associate an applicant's 'seed' (capture and characteristic) data Information. This scenario is witnessed by, preferably, a CRRR party E8.

E1 represents the verifying party's E8 'domain' (and may, for example include devices such as E3, E4, E5 and E14, which may be operated by the verifying party, the verifying party's employer organisation or one or more third parties).

E2 includes example types of capture devices that may be involved in the verifying session, and may be operated by the verifying party E8.

E3 is one or more (participating) capture devices such as security camera and microphone C004 or C005 in FIG. 4 in the vicinity of the verification session.

In one embodiment, one of the devices captures the applicant before and/or during the verification process.

E4 represents one or more capture devices such as augmented reality glasses with a forward or externally facing camera/microphone, which may be the same as, or similar to, wearable camera and microphone C001 or C007 in FIG. 4.

E5 is the verifying party's 'smart' device, which may be the same as 'smart' device (phone) C002 or C006 in FIG. 4.

E6 represents a capture field of view of one or more of the devices represented within E1 and/or E2, e.g. E3, E4 and/or E5. Capture data acquired in this instance may be contributed (in a 'tagged' state) to the applicant's E15 Profile Account, e.g. on the applicant's device E9 and/or E13.

E7 represents the verifying party's data information signal transmissions which, preferably, are wireless network communications. The (method of) network communications may otherwise be the same as, or similar to, the specifications described with reference to FIG. 4.

Any one of the devices in the verifying party's E8 possession (or within the E1 domain) may have appropriate network communication capabilities (thus, are collectively represented by E7), and therefore is able to communicate with, or via, the communication network.

Further, the network communication capabilities of, for example, E3, E4, E5 and/or E14 in conjunction with the communication network E24 may allow any of these devices to communicate with any of the applicant's E15 devices (e.g. E9 and E13) and also any of the devices within E1.

E8 is the verifying party (or verifier).

E9 is the applicant's E15 'smart' device, which may be the same as, or similar to, the verifier's E8 'smart' device E5 described above.

E10 is the applicant's E15 data information signal transmissions, which, preferably, are wireless network communications.

E11 is a capture field of view (or sensor range boundaries) for the applicant's E15 'smart' device E9.

The 'smart' device E9 includes a (e.g. surveillance) camera and microphone, fingerprint/palmprint, eye (iris/retina) scanner and/or other biometric capture component(s) or module(s). The 'smart' device E9 may capture the applicant before and/or during the verification process.

E12 is a hardcopy original of the applicant's E15 ID documents.

E13 is the applicant's capture device(s) such as 'smart' fashion/(wearable) health tech device.

E14 is the verifying party's capture device(s).

E15 is the applicant presenting for a verification session at verification position E30.

E16 is the applicant E15 presenting to the verifier E8 'seed' (capture) data information [EA] stored in the applicant's E15 'smart' device E9.

[EA] is the applicant's E15 'seed' (capture) data information stored in the applicant's E15 'smart' device E9.

E17 is the verifying party E8 sighting E17 the applicant's E15 'seed' (capture) data information [EA].

E18 represents the verifying party E8 sighting the applicant E15.

E19 is the applicant E15 presenting to the verifier E8 the applicant's (ID document E12) particulars that were entered into the applicant's E15 Profile Account (PAA) [EB] on the applicant's E15 'smart' device E9.

[EB] is the applicant's (ID document E12) particulars that were entered into the applicant's E15 Profile Account (PAA) on their 'smart' device E9.

E20 is the verifying party E8 sighting the applicant's (ID document E12) particulars which were entered, or inputted, into the applicant's Profile Account (PAA) on the applicant's E15 'smart' device E9.

E21 is the applicant E15 providing to the verifier E8 the applicant's original (e.g. hardcopy) ID documents E12 for sighting.

E22 is the verifying party sighting the applicant's original ID documents E12.

E23 is data information signal transmissions from one or more transmitting devices (e.g. E9 and/or E13) of the applicant's E15 to the communication network (or internet) E24.

E24 is the communication network such as the communication network C60 in FIG. 4 and/or E60 in FIG. 8.

E25 is data information signal transmissions from communication network E24 to one or more data information signal transmission receiving devices (e.g. E3, E4, E5 and/or E14) of the verifying party's E8.

E26 is a data information signal transmission from one or more transmitting devices (e.g. E3, E4, E5 and/or E14) of the verifying party's E8 to the communication network E24.

E27 is a data information signal transmission from communication network E24 to the one or more data information signal transmission receiving devices (e.g. E9 and/or E13).

E28 is the computing device, namely a remotely located central server such as the computing device C100 in FIG. 4.

E29 is a data information signal transmission to and/or from the communication network E24 and one or more data information signal transmission receiving and transmitting devices, such as computing device E28.

E30 is the verification session position (e.g. the space/location at a particular time).

Figure 12:
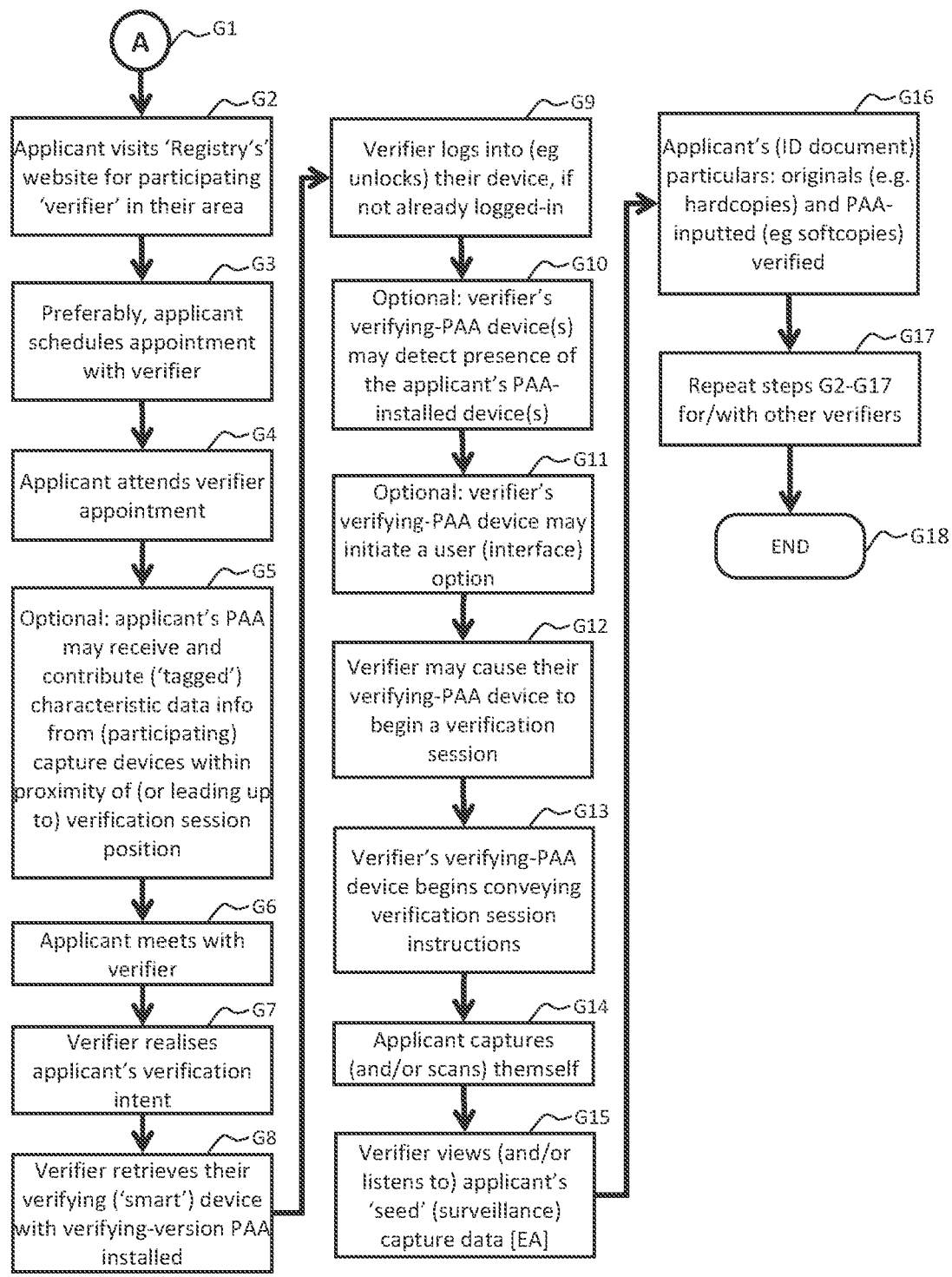
FIG. 12 is flowchart depicting a verification process in accordance with an embodiment of the present invention.

FIG. 12 is a flowchart describing one embodiment of a process for Profile Account verifications which officially links the data information which the applicant has inputted into their Profile Account (PAA).

The FIG. 12 process begins at step G1, which is a continuation from step D14 in FIG. 5.

At step G2 the applicant visits the 'Registry's' website, for example, to realise a participating verifier in their (geographic) area.

To view or access the 'Registry' website, the applicant E15 in FIG. 11 may use their 'smart' device E9 to communicate with a 'Registry' server such as computing device E28 via the communication network E24.

At step G3 the applicant uses their 'smart' device to schedule an appointment with the verifier E8.

In one embodiment the applicant E15 in FIG. 11 may be advised not to schedule appointments the applicant's Profile Account has advanced to a predefined level, e.g. enough 'seed' data information has been contributed. The level may be set and/or adjusted from time to time by the 'Registry', perhaps, in response to changes in government regulations.

In another embodiment the applicant's PAA may prevent eligibility of the applicant to schedule appointments with a verifier. Accordingly, a 'verification appointment system' (e.g. client software application) may be integrated into, or be working in conjunction with, the applicant's PAA and, the 'verification appointment system' may be hosted on a 'Registry' server such as computing device E28 in FIG. 11. Thus, if an applicant's Profile Account (PAA) has not advanced sufficiently, the applicant's PAA may not be made 'available' to the applicant. Instead instructions may be conveyed to the applicant, advising what is required to become eligible.

In yet another embodiment, reaching or exceeding the predefined advancement and/or maturity level may require that the applicant's 'seed' data information [EA] must first pass an acceptable 'threshold' of recognition accuracy. In other words, the applicant's Profile Account (PAA) data information sets may need to be developed to a particular level before an applicant is eligible for Profile Account verifications. Accordingly, the applicant may be required to undertake multiple deliberate capture sessions.

At step G4 the applicant attends the verification appointment.

Optionally, at step G5 the applicant's Profile Account (PAA) receives and contributes ('tagged') characteristic data information from participating capture devices within proximity of the verification session position.

Characteristic data information may originate from one or more capture devices operated by the verifier E8 or the verifier's organisation, e.g. E3, E4 and/or E5 in FIG. 11. Moreover, characteristic data information may originate from one or more capture devices owned and/or operated by the applicant (e.g. E9 and/or E13), or one or more third parties.

Characteristic data information contributed to an applicant's Profile Account carries associated 'tags' (e.g. metadata) which include information as to the source of characteristic data information and, preferably, within a short period of time before the verification session commences may indicate a higher level of credibility. Therefore, characteristic data information contributed from a nearby geographical location may grant to the applicant a higher probability that the verification session will be successfully completed.

At step G6 the applicant E15 meets with the verifier E8.

At step G7 the verifier E8 realises the applicant's E15 verification intent—simply, the applicant may inform the verifier of the scheduled verification appointment and the verifier acknowledges.

At step G8 the verifier E8 retrieves their verification ('smart') device with verifying-Profile Account installed.

The verifier's verification device may have installed on it a special version of the Profile Account (or the verification functions/features may be an 'add-on' to the normal version of the software application, an PAA AOA), which would grant the verifier the ability to conduct and complete an applicant verification. This specific version is referred to as the 'verifying-Profile Account'.

At step G9 the verifier logs into their verification device, if not already logged-in. Since a verifier's verifying-PAA may also be a full-version Profile Account (PAA), then the verifier's verifying-Profile Account device may automatically recognise the verifier—not requiring a deliberate (manual) log-in by the verifier (i.e. continually logged-in as long as the PAA owner is recognized).

Further, in order to utilise the verifying-Profile Account the verifier may have already pursued their own required verifications conducted by other verifiers (though, they may have been structured differently to non-verifying parties).

Optionally, at step G10 the verifier's verifying-Profile Account device may detect the presence of the applicant's Profile Account-installed device (and/or vice versa). Numerous methods are contemplated in order for the two parties' Profile Account devices to communicate with each other in this regard. In one embodiment, the applicant's E15 in FIG. 11 Profile Account-device E9 in FIG. 11 may emit or broadcast a data information signal via a communication network, and the verifier's verifying-Profile Account device may receive the signal via the network. In another embodiment, the verifier's verifying-Profile Account device may initiate and/or broadcast the data information signal. In yet another embodiment, either or both Profile Account devices may only broadcast the data information signal when one or both of the Profile Account devices recognizes that it is in a position within the vicinity of the other Profile Account device, and/or the scheduled verification session appointment position.

At step G11 the verifier's E8 in FIG. 11 verifying-PAA automatically initiates a user option on the verifier's verifying-PAA device.

Following detection of an applicant's PAA device, in accordance with step G10, the verifier's verifying-PAA 'anticipates' an impending verification session. This anticipation may cause the verifier's verifying-PAA to present an option for selection to the verifier, not limited to, for example, the following question:

'An applicant device is in the vicinity, do you wish to undertake a verification?'

At step G12 the verifier may cause their verifying-PAA to begin a verification session. The verifier may activate a verifying-PAA-related 'button' on, or via, their verifying- PAA device or undertake some other action to respond to the question described at step G11.

At step G13 the verifier's verifying-PAA device begins conveying verification session instructions.

The proceeding flowchart steps in FIG. 12 (i.e. G14 to G16) describe one embodied structured order, although other permutations are contemplated to achieve the same or a similar outcome.

Two main types of verifications may be considered as occurring in the following flowchart steps:
(i) device verifications; and
(ii) human verifications.

A breakdown of these two types are as follows:
(i) Device verifications: between verifier's and applicant's PAA devices.
  Throughout the verification process (and moments before) each party's PAA device may interact with the other party's PAA device. Each party's PAA may continually and simultaneously assess for authenticity, for example, but not limited to, assessing if the other party's PAA is genuine, untampered with and is running or operating exactly as designed or intended, as described in more detail in PCT/AU2013/001303.
  Further, a log of all interactions may be recorded on each of the party's, respective, PAA devices. Five, non-exhaustive, examples of log events are as follows:
  (1) Verifier's and/or applicant's PAA device detects the other party's PAA device (e.g. in proximity).
  (2) verifying-PAA successfully initiates a verification session with applicants PAA. The log event may read:
    Verifier [ID number] initiated verification with Applicant [Profile Account unique ID number 0123456789 AUSNSWDL]; or, preferably
    Verifier [ID number] initiated verification with Applicant [Profile Account (pseudonymous) random unique number B9876543210K].
  (3) verifying-PAA has received confirmation that applicant's left eye (iris) has been scanned and is 'good';
  (4) verifying-PAA has received confirmation that applicants face and earprint has been captured and is 'good'.
  (5) verifying-PAA has received confirmation that applicant's left thumb (1st digit) fingerprint has been scanned and is 'bad', with, this fingerprint being deleted, and applicant required to (re-)capture with verifier witnessing;
(ii) Human verifications: verifier sights (and authenticates) applicant and applicant's presented materials.
  This type of verification typically relates to the verifier witnessing or sighting:
    the applicant and the applicant's 'seed' capture data information;
    the applicant's originals (e.g. hardcopies) and PAA-inputted data information (e.g. softcopy) of their (ID document) particulars.

At step G14 the applicant performs a capture as necessary.

At Step G15 the verifier views the applicant's seed (surveillance) capture data and the seed (surveillance) capture data is compared against the applicant. The verifier can then confirm that the 'seed' capture data matches the 'in person' applicant.

Only 'seed' capture data (originating from an applicant's device) may be 'played back'. For example, if 'seed' capture data comprises audio and/or video surveillance, then the recorded surveillance data may be played back during this step so that the verifier may confirm (at least with the recorded visual surveillance) that the in person applicant is in fact the party represented in the surveillance recording(s).

Seed capture data (which originated from an applicant's device) may also be converted (in real-time) from the abovementioned surveillance data to characteristic data information for analysis.

Therefore, the applicant's PAA may have at least two 'streams' of 'seed' data contributed to, and stored in, their Profile Account, being:
(i) (surveillance-type) capture data information which can be played back; and
(ii) characteristic data information (ChDI) derived from (surveillance-type) capture data which typically cannot be converted back into surveillance data for playback.

The verifier's App and associated device may control the surveillance capture data that is played back by the applicants device (which may also form part of another authentication test). For example, the verifier App may cause the applicant's App to randomly play one or more surveillance capture data files. The surveillance capture data that is played back in this instance may be part or all of a particular 'seed' capture session of the applicant. For example, a 'chair swivel capture' at home may be a 15-30 second capture session. All or part of this session may be played back to the verifier on the applicants device for the verifier to watch and/or listen. The verifier, ultimately, is meant to compare/contrast the played back recording of the applicant to the in person applicant.

In one embodiment, a party cannot amend, alter, edit or compromise in any way the data information stored in a Profile Account including by an account holder in respect to their own data information (following the first verification). Should they delete any of their data information or particulars and this causes a change beyond prescribed thresholds, then it may trigger the requirement for the applicant to repeat (at least part of) a verification process. This is designed to address biased or fraudulent management of Profile Account data information, e.g. selectively determining the capture data information which is to remain contributed.

However, it may be permitted for an account holder to delete data files (e.g. a logged event), but within predetermined limitations, and this may be the only modification rights an account holder has to amend, alter or edit a Profile Account's contributed data information.

FIG. 13 is a sample form provided herein to illustrate the typical information that would be held in a Profile Account. The information would include the name and address of the entity, the date of birth (if appropriate), contact numbers (and other contact information), and document types used to support or verify the identity of the applicant/profile holder. It will be understood that the form shown in FIG. 13 is an example only and should not be construed as limiting the embodiments described herein, nor the broader inventive concept.

FIG. 14 is a flowchart process describing how an applicant's identity may be withheld or pseudonymised (kept private) during the course of their Profile Account's existence.

At step J01 the applicant's government-issued ID document number is caused to be entered into the Profile Account, as shown in FIG. 13.

At step J02 the applicant may cause their ID document details to be entered into their Profile Account. This step may be performed (semi-) automatically should, for example, the ID document data information that is entered be related to an (original) softcopy version (that was sourced from a CRRR party).

At step J03 the ID document number (from step J01) may be associated with its Type Code (from step J02), automatically by the PAA, e.g. 0123456789AUSNSWDL.

At step J04 the combined ID document number and Type Code (from step J03), i.e. 0123456789AUSNSWDL, then forms the applicant's Profile Account's (private) unique ID number.

At step J05 a random number is generated, e.g. B9876543210K, which forms the applicant's Profile Account's (public) unique ID number. Despite the term 'public' being used, this random number is, preferably only disclosed to CRRR parties such as those described in step J07.

At step J06 two processes occur. The first is the unique Profile Account ID number (from step J03), i.e. 0123456789AUSNSWDL, being associated in the applicant's Profile Account (PAA) with the random number generated (from step J05), i.e. B9876543210K. The second is the Profile Account unique ID number being split into packets for communication to independent CRRR parties. Step J06 in FIG. 14 illustrates one method of splitting, and sequentially assigning a number to a packet. Each packet is then assigned to the unique generated number, so each packet may later be recognised as being associated.

At step J07 each packet (from step J06) is individually communicated to separate CRRR parties to hold. At FIG. 14 five parties each receive a single packet. Each party may recognise that their packet of data information relates to, or is associated with, B9876543210K, the generated unique number. However, no party is able to derive any further significant data information from the packet received.

Types of preferred CRRR parties that may represent one or more of the five groups include privacy foundations, civil liberty advocacy groups or other similar organisations.

At step J08 two principal processes occur. The first step may eventuate in response to a justifiable need, following preferably (judicial) due process, to reveal the identity and, thus, the entity, associated with a Profile Account. One method of revealing an identity is by combining all the ordered packets from each group (step J07). A government body or authority, for example, may first obtain a (court) warrant causing each group to communicate its held packet to the government authority, e.g. Police. Once the Police have obtained all packets they may be reconstituted to reveal the Profile Account's unique ID numbers.

The ID number, correspondingly, represents an ID document number and Type Code of an identity associated with an account holder (entity). Alternatively, should one or more of the groups (unnecessarily) access, managed or communicate its packet to another party (or unauthorised device), whether or not for the purpose described in the first process, the account holder may be notified.

At step J09 the Police, described in the previous step, may cause the ID document number and Type Code to be entered, in one or more (e.g. government) databases for querying. The identity associated with the ID document number and Type Code is thereby retrievable.

Figure 15:
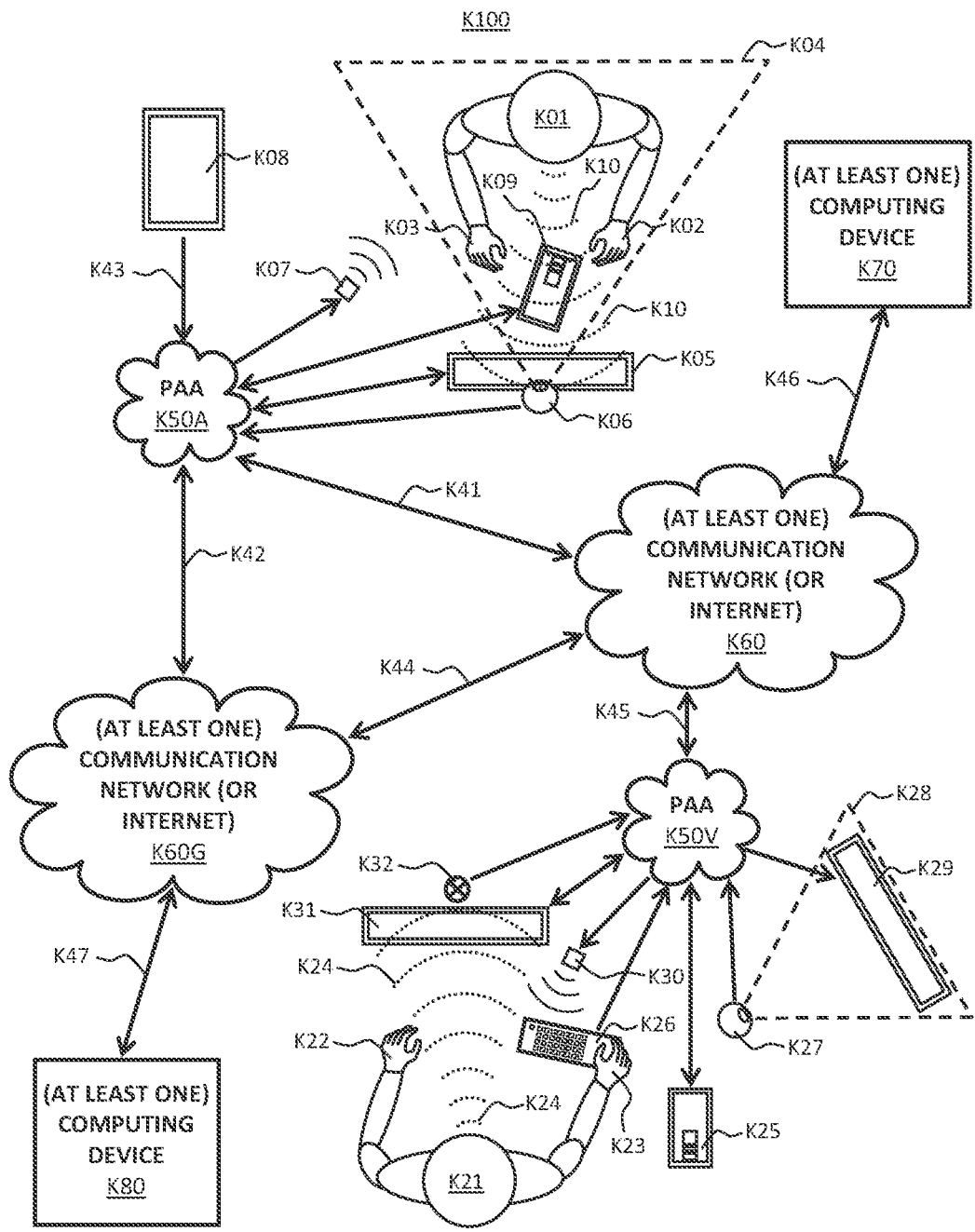
FIG. 15 is a diagram illustrating a virtual verification process in accordance with an embodiment of the present invention.

FIG. 15 is a block diagram of one embodiment of a networked computing environment to facilitate a (virtual) Profile Account verification session K100 to officially link or associate an applicant's 'seed' data information. The verification session is coordinated and/or witnessed by, preferably, a CRRR party.

Referring to FIG. 15, K01 represents the applicant, participating in a virtual verification session K100. The applicant's position (time/location) during the virtual verification session may be applicable to the successful facilitation and/or completion of the session.

K02 is the applicant's left hand, palm and/or digits (fingers and/or thumb). K03 is the applicant's right hand, palm and/or digits (fingers and/or thumb).

K04 is one or more capture fields of view (or sensor range boundaries) of one or more capture device(s) K06.

K50A is the applicant's Profile Account (PAA) installed, running and stored on one or more computing devices such as those depicted in FIG. 15, e.g. 'smart' device K09 and/or computing devices K05 or K70.

K05 is one or more computer monitors K05, which may be used to facilitate a video feed for the verification session K100, i.e. convey visual instructions originating from the applicant's K01, verifier's K21 and/or third party's (e.g. 'Registry's') PAA-device such as 'smart' device K09, K25, or computing device K70, respectively; and/or graphical and/or textual instructions displayed by the verifier's computer monitor K29 and captured by the verifier's capture device K27.

The computer monitor may be a touch screen device and, thus, have one or more input/output data information connections or links to the applicant's Profile Account K50A.

K06 is the applicant's one or more (e.g. surveillance, such as camera and/or microphone) capture devices.

In another embodiment, capture devices K06 (and computing monitor/device K05) may be housed separately or in the one housing; and may have an output data Information connection or link to the applicant's Profile Account (PAA) K50A.

In one embodiment, capture device K06 is housed separately to 'smart' device K09 and allows the capture device K06 to capture all required subjects in the capture device's frame, its field of view or sensor range boundaries K04.

K07 is an audio output device such as a speaker, which may be used to facilitate an audio feed for the verification session (or online conference) K100.

K08 is the applicant's or a third party's digital scanner, which is connected for inputting the scanned data information to the applicant's Profile Account (PAA) K50A.

K09 is the applicant's 'smart' device.

K10 is the applicant's voice projections. The voice projections may be captured by microphone K06 and/or the 'smart' device's K09 microphone.

K60 and K60G represent communications networks.

In the embodiment described herein, K60G is shown separately to K60 to illustrate one embodiment where K60G is a secure communication network, which facilitates an encrypted data information connection between one or more applicant K01 devices (via a communications link such as K42) and the computing device K80 (via a communications link such as K47).

The computing device K80 represents a government operated server.

In another embodiment, both the communication networks or K60 and K60G communicate via one or more communications links such as K44.

In another embodiment, both the communication networks K60 and K60G are integrated, i.e. 'one cloud'.

K70 is a (remotely located central) server and/or storage backup device, e.g. for an applicant's Profile Account. It will be understood that the computing device K70, while depicted in the Figures as a single device, may represent numerous and separately housed and operated computing devices operated by different parties. In one embodiment, the computing device K70 is not a device shared by the applicant K01 and the 'Registry' (or other non-family third party).

The computing device K80 represents the government's, or another third party's server. The server K80 facilitates the identity (ID) document authentication process such as cross-referencing an applying entity's (e.g. applicant K01) uploaded ID documents against government databases comprising digital versions of issued identity documents.

In one embodiment, ID document database query results are communicated to the applying entity (e.g. applicant K01) via communications links K47 and K42, and the communication network K60G to the applying entity's Profile Account K50A.

K21 is the participating virtual verification session K100 verifying party (or verifier).

The verifier's K21 position (time/location) during the virtual verification session K100 may be applicable to the successful facilitation and/or completion of the session.

K22 is the verifier's K21 left hand, palm and/or digits (fingers and/or thumb). K23 is the verifier's K21 right hand, palm and/or digits (fingers and/or thumb). K24 is the verifier's K21 voice projections (e.g. sound waves).

K25 is the verifier's K21 'smart' device K25.

K26 is a stand-alone input peripheral device such as a keyboard and trackpad K26 for one or more computing devices such as 'smart' device K25. In another embodiment, the keyboard and/or touchpad K26 may be embedded and/or integrated into the 'smart' device K25.

K27 is the verifier's K21 one or more (e.g. surveillance, such as camera and/or microphone) capture devices.

Depicted in FIG. 15 is the verifier's capture device K27 capturing monitor K29, rather than the verifier. However, it will be understood that in another embodiment a capture device has the verifier in a field of view K28. K28 represents one or more capture fields of view (or sensor range boundaries) of one or more capture device(s) K27.

In one embodiment, computer monitor K29 Is positioned within one of the capture fields K28 so displayed graphics or text, for example, on the monitor may be captured by capture device K27.

The computer monitor K29 may be a touch screen device and, thus, have one or more input/output data information connections or links to the verifier's Profile Account.

In one embodiment, the monitor K29 is not housed separately but is embedded into the 'smart' device's K25.

K30 is an audio output device such as a speaker K30. The speaker may have an input data Information connection or link to the verifier's Profile Account (PAA) K50V.

In one embodiment, the speaker K30 is integrated into the 'smart' device's K25 housing.

K31 is a computer monitor.

K32 is a separately housed (stand-alone) microphone.

In another embodiment, microphone K32 and capture device K27 may be housed together, and may have an output data Information connection or link to the verifier's Profile Account K50V.

Figure 16:
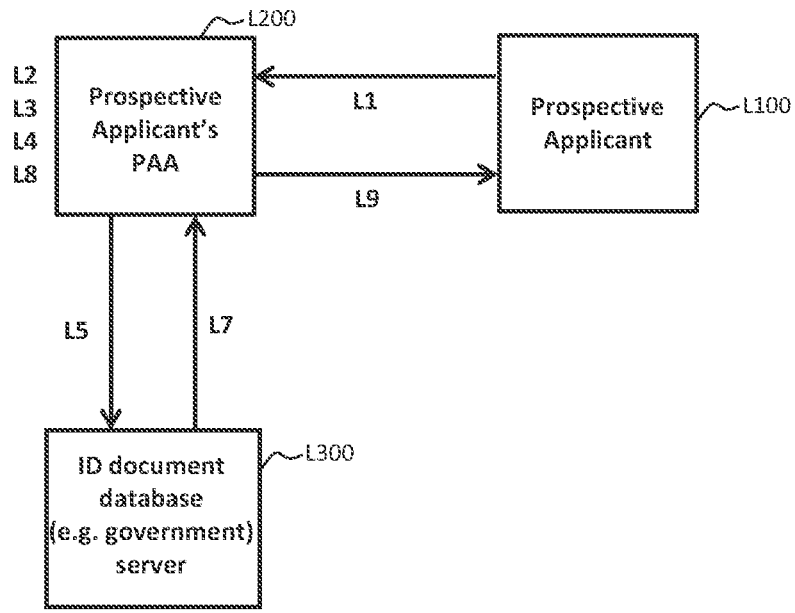
FIG. 16 is a diagram illustrating a correlation process in accordance with an embodiment of the invention.

FIG. 16 depicts a summarised process of:
(i) a prospective applicant's (PA's) uploaded ID documents being authenticated; and
(ii) an example of how a prospective applicant (i.e. an entity) may be verified as corresponding with, or to, the entity represented by the identity (ID) documents.

In other words, FIG. 16 describes an example process to confirm that the prospective applicant is the identified party in the ID documents and that the ID documents are genuine.

At step L1 the PA L100 inputs their ID documents into their Profile Account L200. This step is described with reference to steps D7 and D8 in FIG. 5.

With reference to FIG. 15, the PA K01 utilises scanner K08 to scan ID document hardcopies into softcopies, and the resulting softcopy data information files may be transferred to the PA's Profile Account K50A on a device such as 'smart' phone K09 via communications link K43.

At step L2 the PA's L100 Profile Account (PAA) L200 receives and contributes the inputted data information.

At step L3 the PA's L100 Profile Account (PAA) L200 queries for correlation any or all of the PA's capture and/or characteristic data information (e.g. facial captures, fingerprint and/or earprint scans) against the corresponding ID document data information.

At step L4 the PA's L100 Profile Account L200 returns results of the step L3 queries. Provided the query results in step L4 are interpreted as meeting or exceeding the defined 'threshold' of correlation, then at step L5 the PA's L100 Profile Account L200 uploads the ID document data information to ID document authentication server L300, or computing device K80 in FIG. 15, via a secure communication network K60G.

If all inputted ID documents in step L1 are softcopy originals and if the ID document softcopies were received from respective issuing bodies then uploading to a server for authentication may not be necessary. If so, steps L4 and L5 are optional steps.

In one embodiment, the ID document authentication server L300 is a government operated or endorsed system. However, it will be understood that this limitation applies only to the embodiment described herein and not to the broader inventive concept.

At step L6 the ID document database server 300 receives the uploaded ID document data information and undertakes authentication process(es).

In one embodiment, the ID document database server L300 compares the uploaded ID documents with versions stored in the (original source) database. For example, the authentication process may utilise a pixel correlation method to determine a match. This method may be sufficient to thereby avoid the use of biometrics.

In one embodiment, to counter identity fraud or address the issue of attempting to utilise another entity's identity (ID) documents, the system may employ one or more of the following techniques.

Where the server L300 recognises that the PA's uploaded ID documents have previously been uploaded the system 'flags' the applying PA's Profile Account, and halts further verifications, notifies the authorities and the account holder whose identity may have been compromised and suspends the account holder's Profile Account until the matter has been resolved.

If the rightful owner of the identity does not already have a Profile Account, nor intends to seek one, then the uploaded ID documents will not return a database server plurality query result. To protect the identity of new subscribers, various methodologies may be employed, including but not limited to:
(i) when an ID document is used for an application process, correspondence (e.g. a posted letter) is sent out to the entity's physical address listed on the ID document; and/or
(ii) when, an ID document is not only detailed by, or associated with, one correspondence method such as a (residential) postal address, but also one or more electronic addresses (e.g. email, instant or social networking site messenger) or contact phone numbers (e.g. mobile phone), electronic (and more immediate) methods of contacting the entity are utilised.

The recipient (i.e. ID document entity) then has the opportunity to confirm if they applied to have their ID documents authenticated in the pursuit of an activated Profile Account.

In one embodiment, the entity may also be required to respond before the applying entity's uploaded ID documents are eligible to complete the authentication process. One method of responding is by the notified entity being required to send a code to the (government) server which was disclosed in the posted letter, the email and/or sms text message. Numerous methods of sending the code are contemplated. In one method the code is sent as a reply email. In another method, the notification email contains a hyperlink which when activated causes a reply to be sent via a web browser. Such variations are within the power of a person skilled in the art.

Where a mobile phone number is associated with an ID document, the number may be queried against a database of subscribed consumers held by the telecommunication company which is the service provider for the mobile phone number. Results of the query may confirm if the number is associated with a consumer corresponding with an identity the same as that detailed in the uploaded ID document being authenticated.

Moreover, a website portal or forum may be provided where concerned people may enter any of their ID document particulars (or numbers) into the search field to determine whether any of their ID documents have been used to form (i.e. activate) a Profile Account. If so the person may request that the system 'flag' the allegedly fraudulent Profile Account (PAA), as similarly described above, notify the Police and suspend the account holder's (or applicant's) Profile Account until the matter has been resolved.

Moreover, a 'preventative' website portal may be provided so that an interested party can enter required details of their ID documents (plus contact information) into online form field(s), to set up an automatic notification. In the event any of the ID documents entered are later used to form a Profile Account, the party may be notified. Alternatively, instead of an opt-in arrangement, this identity theft preventative measure may be the default, and entities may opt-out.

At step L7 the server L300 issues results of the authentication process to the Profile Account (PAA) L200.

At step L8 the Profile Account (PAA) L200 receives and processes the ID document authentication results.

At step L9 the Profile Account (PAA) conveys the results to the PA. For example, if a 'pass' result is obtained the ID document authentication process is complete.

Figure 17:
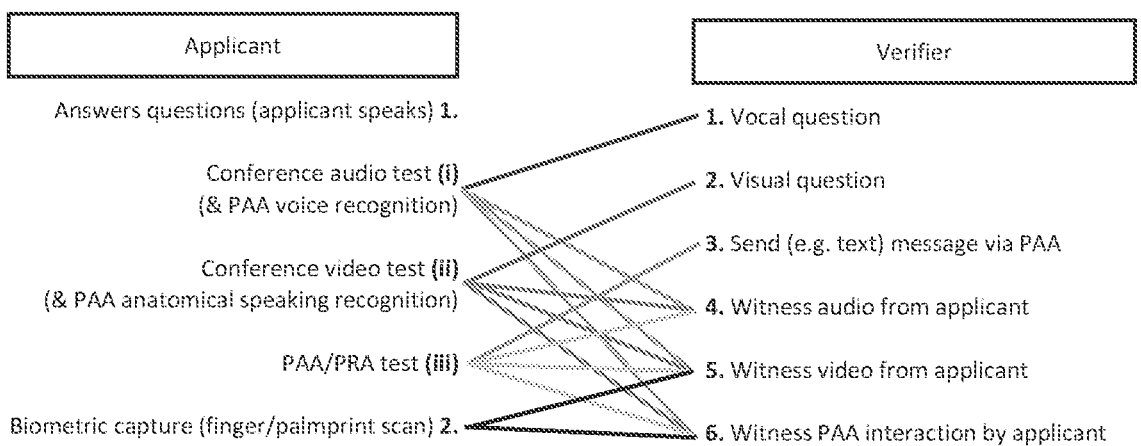
FIG. 17 is a diagram illustrating a verification process in accordance with an embodiment of the invention.

FIG. 17 illustrates example events that occur during the verification conference. The events are deliberately designed to achieve particular outcomes, with such outcomes helping to assess whether the verification session is being conducted to a suitable standard of creditability, reliability and integrity. These occurrences are designed to 'test' the system for irregularities.

All interactions an applicant's Profile Account (PAA) devices have with a verifying party's and/or other third party's device, and vice versa, can be considered a 'moment of truth', i.e. an opportunity for a genuine version of the involved software running on any of those devices to assess the genuineness of the software running on any one of the other devices. In other words, the software programs (e.g. verifying-PAA or applicant's PAA) scrutinise each other to confirm that they are operating as per the official design, intents and purposes. Firmware and hardware may also be tested as described in PCT/AU2013/001303.

Some examples of 'scrutinizing moments' include:
(i) Applicant scheduling an appointment with the verification system.
(ii) Verification system confirming that applicant's PAA meets or exceeds threshold.
(iii) Verification system confirming that applicant's PAA has completed the ID document authentication process.
(iv) Verification system confirming with ID document authentication server that the applicant did 'pass' the ID document authentication process and that the applicant's PAA 'passed' genuineness 'handshakes' throughout the time the applicant's PAA was interacting with the ID document authentication server.
(v) Verification system providing a reminder to the applicant's PAA about impending verification conference, and the applicant's PAA sending back a corresponding reply.
The applicant's PAA may make, and convey, suggestions and/or automatically reschedule the appointment to another date/time based on the expected date/time that the applicant's Profile Account (PAA) 'threshold' would likely be satisfied. For example, the applicant's PAA may calculate the probable data/time to meet the 'threshold' by referring to past trends for instance, of the applicant building/refining their characteristic data information. Accordingly, the applicant may confirm any automatically suggested rescheduled conference appointments before the applicant's PAA officially reschedules.
(vi) Verification system initiates a count-down timer on the applicant's PAA, and the applicant's PAA sending back a corresponding reply. The count-down timer may be regularly (or intermittently) 'refreshed' following review by the verifier's verifying-PAA (and/or a 'Registry' server) on how the verifier is progressing with the scheduled conference appointments. For example, the software program may calculate the probable time that the verifier would be available to engage in a conference. Therefore, an updated or revised count-down time may be communicated periodically to the applicant's PAA to adjust the count-down time operating on the applicant's one or more devices. This may process may continue up until 'zero-time' remaining is reached;
(vii) Verification system querying the applicant's PAA, and/or the applicant's PAA on its own accord, to ensure all necessary devices meet or exceed that specified or stipulated for the verification conference.
(viii) Verification system only accepting conference calls from authorised (genuine) applicants, and/or applicant PAA only able to connect, dial and/or engage with a genuine verification system for the purpose of performing a verification session.
(ix) Verification system receiving feedback from applicant's PAA informing the verification system that the applicant's biometrics being captured are consistent with the biometrics captured since the applicant began forming their Profile Account.
(x) Verification system may confirm with applicant's PAA that all devices of the applicant's are geolocated.
(xi) Verification system may confirm with applicant's PAA the correlation between the current geolocation data information of the applicant's devices and their geolocations when they captured one or more of the applicant's (Activity) Profiles that may be, or are being, performed for the verification session.

If the applicants PAA informs the verification system that the capture devices of the applicant have not previously been geolocated where they currently are during the verification session for past captures of the applicant, which were subsequently contributed to the applicant's Profile Account (PAA), then this may indicate unusual or suspicious circumstances, and cause for enquiry.

(xii) Verification system may confirm with applicant's PAA that the applicant is the only entity in the immediate vicinity.

(xiii) Verification system may convey to the applicant's PAA whether the verifier is geolocated in an authorised or designated verifier location. For example, should the applicant's PAA receive data information from the (apparent) 'verification system' claiming that the verifier participating in the conference is located in an unsanctioned or unrecognised verifier location (without, disclosing the verifier's location coordinates, for example, to the applicant's PAA) then this may be detected as a questionable or suspicious circumstance. Accordingly, appropriate action may be effected by the applicant's PAA such as concluding the conference prematurely, and then communicating a report of the incident automatically to the relevant bodies (e.g. a 'Registry' server).

(xiv) Verification system may regularly confirm whether the verifier entity participating in the verification conference is the, or a, Profile Account entity authorised to participate. The verification system may communicate with the applicant's PAA any adverse updates, i.e. that the (apparent) participating verifier is not an authorised verifier causing the applicant's PAA to react accordingly.

(xv) Verification system may convey a message (or 'question') to the applicant's PAA for the applicant to acknowledge. Should the applicant respond with something other than the message conveyed, and/or a suitable answer or action, then the verifier may witness this and act accordingly, and/or the applicant's PAA and/or the 'verification system' may recognise this and react accordingly.

(xvi) Verification system may regularly (or continually) assess the verifier's verifying-PAA device to ensure that it does not have connected, embedded and/or integrated in any devices which may allow the (audio-visual) conference to be recorded.

(xvii) Verification system may communicate with applicant's PAA to determine whether the applicant's PAA has interacted in a verification session before, either in person or virtual (online).

Figure 18:
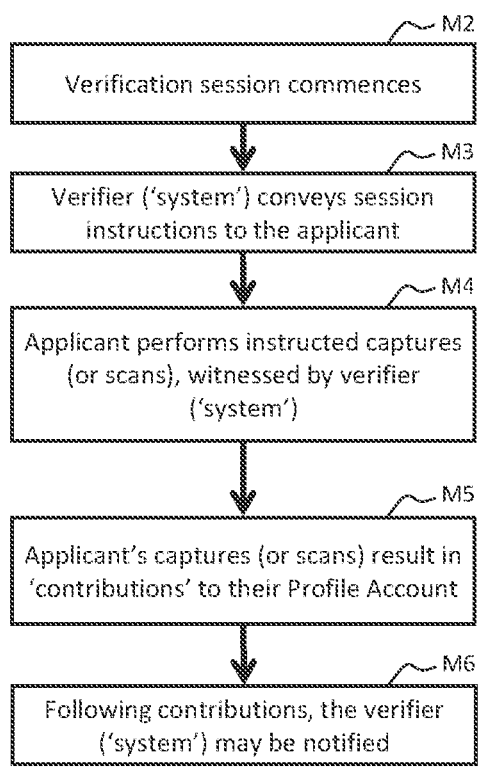
FIG. 18 is a flowchart depicting an identification process in accordance with an embodiment of the invention.

FIG. 18 is a flowchart describing one embodiment of a process for reliably facilitating the witnessing of an applicant verification capture (or scan) activity. Further, this embodiment describes one example of a computer implemented system, method and data information signal to assist a verifier to determine the genuineness of an applicant's participation in a verification session, i.e. to better establish or confirm that it is the participating entity which is performing the captures that are being recognised by the involved PAA devices. Furthermore, the following flowchart describes a process which may be implemented for either an in-person and/or virtual verification session. Some embodied variations between the two types of sessions are, however, described within each step.

The process begins at step M1. At step M2 the verification session may commence. At step M3 the verifier conveys instructions to the applicant. Conveying such instructions for an in-person and virtual session may occur as follows:

In-person: the verifier reading from instructional information displayed on their verification device may direct the applicant to perform a particular capture activity.

Virtual: the verifier and/or a 'Registry' server may cause the verifier's verifying-PAA to communicate data information to one or more of the applicant's PAA devices via the applicant's PAA which may then cause instructional information to be displayed on, or via, the applicant's PAA devices.

At step M4 the applicant, accordingly, performs the instructed capture (or scan) activity. For example, the activity being conveyed may require the applicant to capture (or scan) a particular biometric feature such as their left thumb (1st digit) fingerprint. Performing such a capture (or scan) for an in-person and virtual session may occur as follows:

In-person: the applicant using their 'smart' device which has embedded or integrated in it a fingerprint scanning module causes their left thumb to be scanned. The verifier witnesses this activity, ensuring that the correct finger's print is being scanned.

Virtual: the applicant using their 'smart' device which has embedded or integrated in it a fingerprint scanning module causes their left thumb to be scanned. The verifier and applicant's capture devices witnesses or captures this activity. The verifier may witness this activity by viewing the video feed being display on their monitor which receives the feed from the applicant's camera that has captured the applicant perform the activity. Correspondingly, the applicant's PAA (e.g. K50A in FIG. 15) may 'witness' this activity by a camera.

At step M5 the applicant's PAA contributes characteristic data information by the process as described with reference to FIG. 9. If the PAA contributed it means that the characteristic data information was relevant or of value to the applicant's PAA.

At step M6 the applicant's PAA in response to contributing data information during, and/or following, the verification session capture activity communicates a data information signal to the verifier's verifying-PAA device.

Throughout the above captures the verifier's verifying-PAA device may receive communicated data information signals from the applicant's PAA device. The data information signals include summarised results or the outcome of the captures. For example, following one of the applicant's fingers being captured (or scanned) the results of that activity may be analyzed by the applicant's PAA, then the PAA may communicate the outcome to the verifier's verifying-PAA device. The outcome may be a simple conveyed message such as 'first finger scanned: match recognized'.

Should the applicant's PAA recognise that the activity was performed with close correlation with past captures then this information may be conveyed to the verifier as another factor of authentication. This may be conveyed to the verifier in the form of a 'threshold' value with a green status indicator signalling a 'good' read.

Following the verifier receiving this fingerprint capture status determination, the verification system may then communicate a code to the applicant's fingerprint-scanning (secondary) PAA device. The code may be conveyed by the secondary PAA device by displaying a code on the device.

The applicant may then be instructed to present the displayed code to the verifier, by holding it up in view of the applicant's primary PAA device's camera. The correctly displayed code may then be read by the verifier and compared against the code that was originally communicated by the verification system.

The correct code helps indicate to the verifier that the fingerprint scanning PAA device of the applicant's is being utilised for the subject fingerprint scan.

Figure 19:
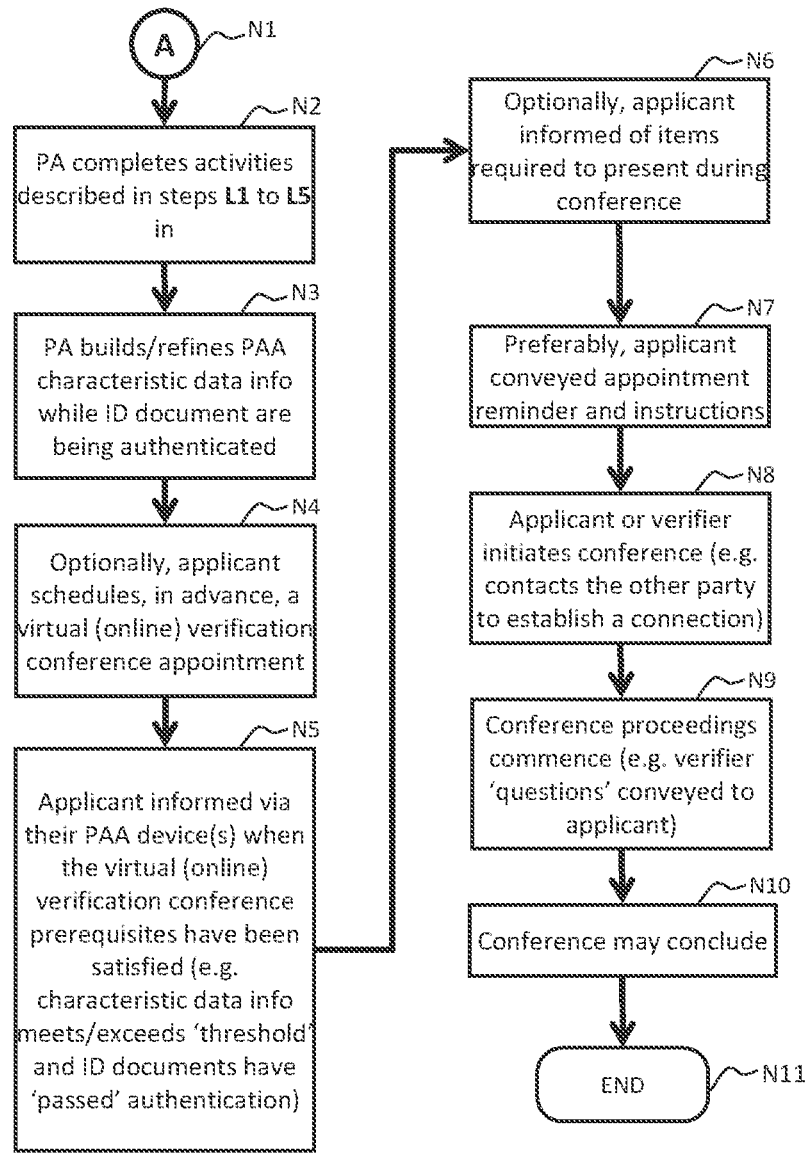
FIG. 19 is a diagram illustrating another example of a verification process in accordance with an embodiment of the invention.

FIG. 19 is a flowchart describing one embodiment of a networked computing environment and computing processes to facilitate a Profile Account (PAA) verification session K100 as broadly described with reference to FIG. 15 to officially link or associated an applicant's 'seed' data information. The verification session is coordinated and/or witnessed by, preferably, a CRRR party.

The profile account described above and the eLicence described hereinafter utilises a security model that includes biometric templates and public key infrastructure services to provide a ubiquitous and open authentication service.

The service provides authentication services whereby the user is both identified and authenticated, identification services whereby the end user is identified, public key encryption whereby a user can one way encrypt data to be sent to a known party and private decryption based on biometric template recognition.

Figure 20:
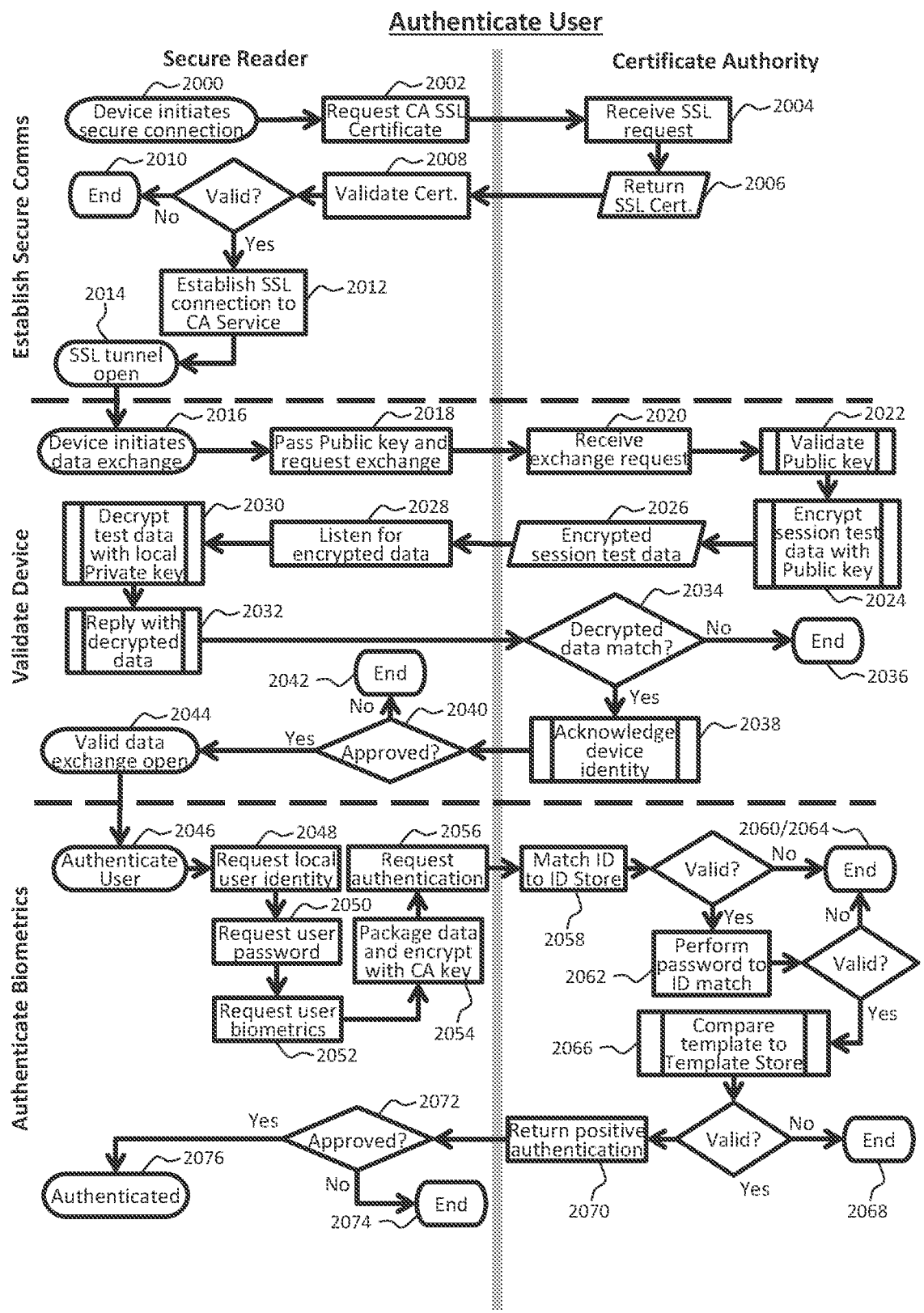
FIGS. 20 to 23 are authentication, identification and decryption processes in accordance with an embodiment of the invention.

Referring now to FIG. 20, there is shown a flowchart depicting an embodiment of a system arranged to validate a device to provide secure communication. The transactions between external parties and the system utilised to carry out the method of FIG. 20, utilise public key infrastructure (secure socket layer) secure communication and are based on a trusted authority hierarchy. The system provides a public certificate authority service that is trusted by individual organisations and/or public certificate authorities to ensure the maximum amount of valid client transactions.

In order to authenticate a user all communications must first be secured between the end points and the system. In other words, all devices communicating with the system must be validated and trusted. This is achieved by ensuring that devices are issued with organisational certificates and that they can pass an exchange of encrypted data before allowing them to communicate biometric data.

Figure 21:
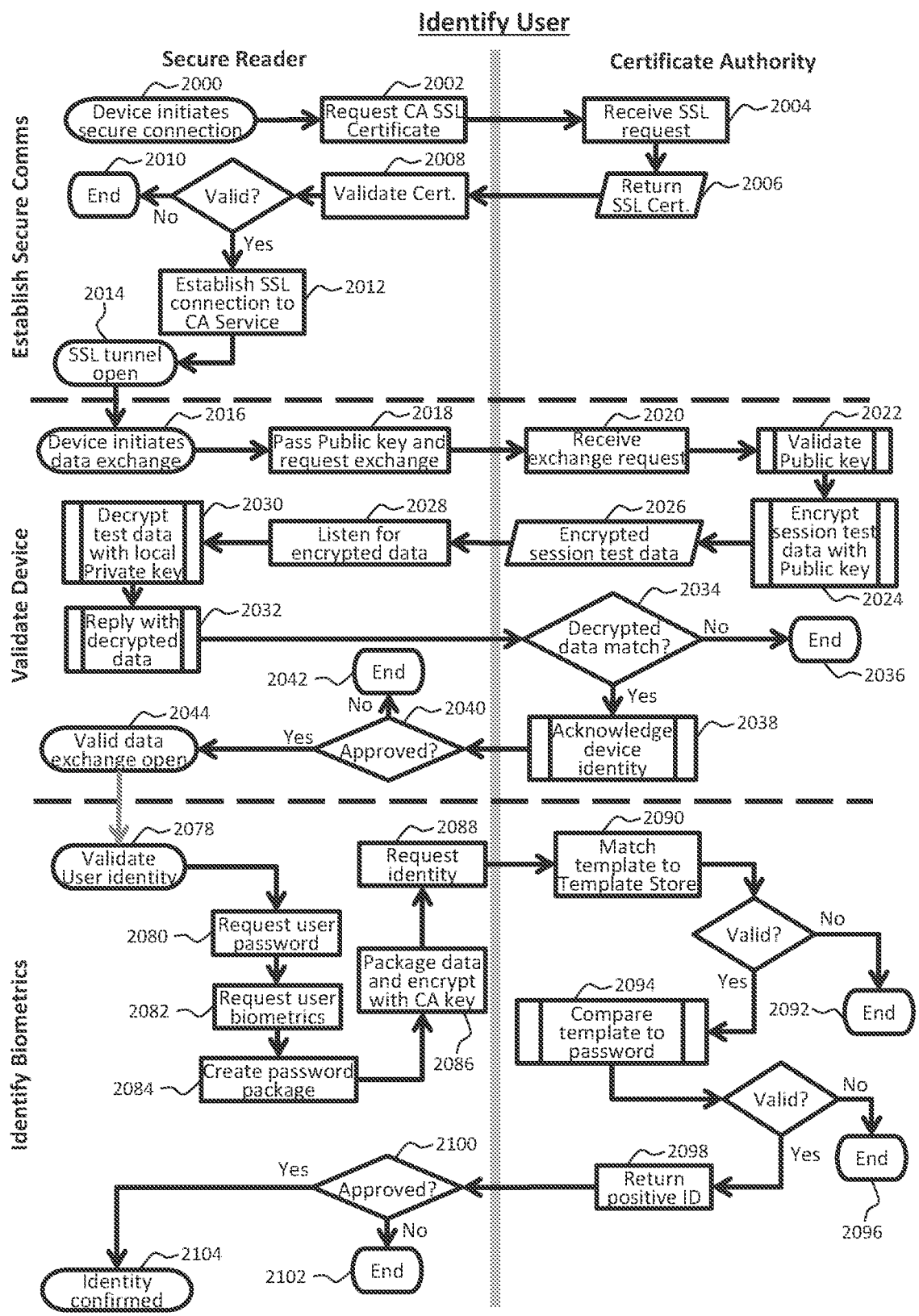
Figure 22:
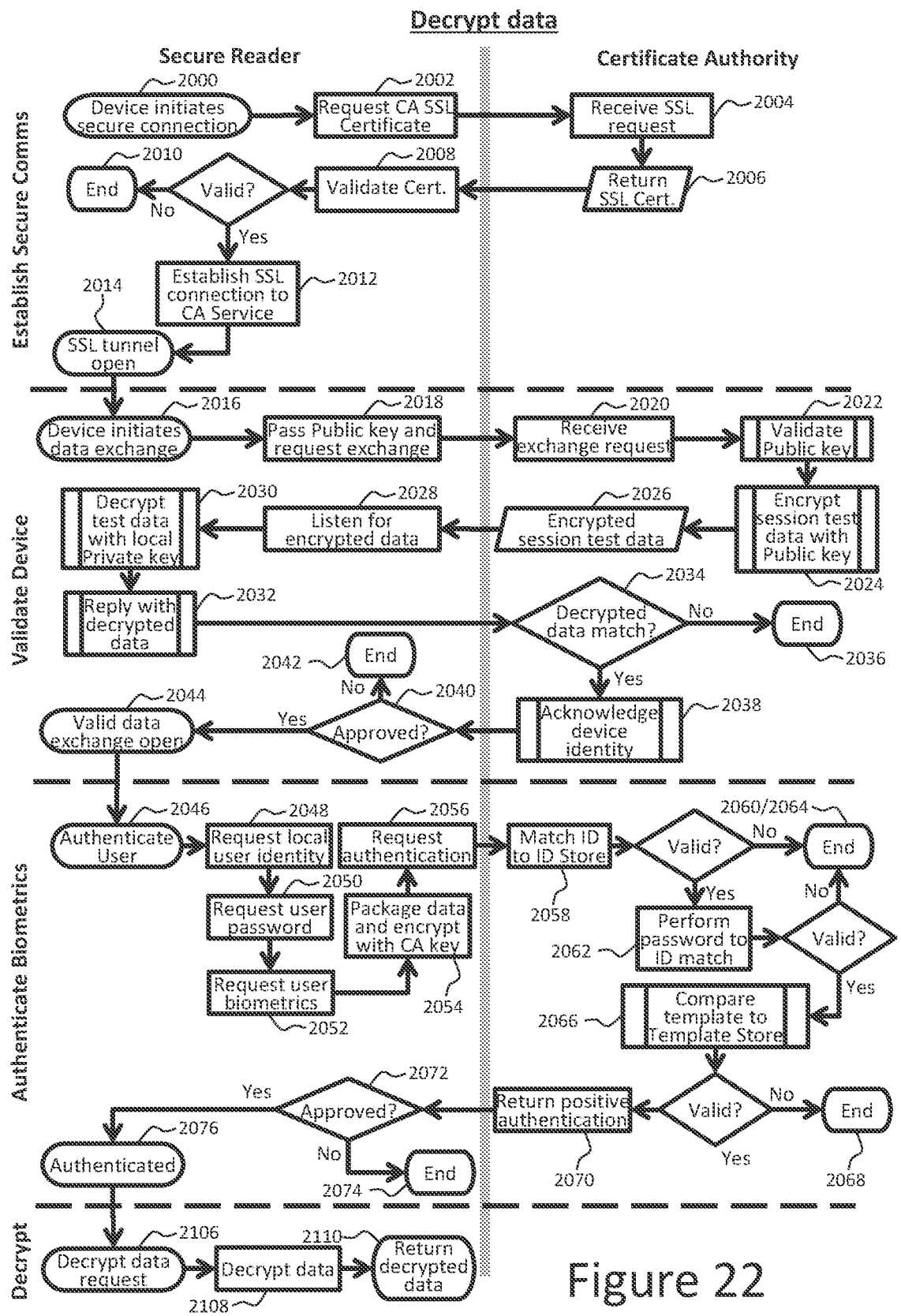

Referring to FIGS. 20 through 22 at step 2000, a device initiates a secure connection of request which results in a request for the SSL certificate (2002). The certificate of authority subsequently receives the SSL request at 2004 and subsequently at 2006 returns the SSL certificate.

At step 2008 the user's device validates the certificate and if the certificate is not valid the process terminates at step 2010 and no connection is initiated.

Alternatively, if the connection is valid, at step 2012 the secure device establishes an SSL connection to the certificate of authority service and subsequently at step 2014 a SSL tunnel is opened. Once the SSL tunnel is opened at step 2014 the device can then initiate data exchange at step 2016. This is achieved by passing the public key and the request exchange at step 2018 which is subsequently received by the certificate of authority at step 2020.

The certificate of authority validates the public key at step 2022 and encrypts the session test data with a public key at step 2024. The encrypted session test data is relayed to the reader at step 2026 and the device, which has been listening for the encrypted data at step 2028 decrypts the data with a local private key at step 2030.

The device subsequently replies with the decrypted data at step 2032. The certificate of authority tests the decrypted data at step 2034 and if the decrypted data does not match the process is terminated at step 2036. If the encrypted data matches, then at step 2038, the certificate of authority acknowledges the device identity and communicates the device identity to the device at step 2038. Therefore, the device determines whether the test has been approved at step 2040. If not, the process terminates at step 2042. However, if the process is approved, then a valid data exchange is opened at step 2044.

In other words, referring to FIGS. 20 through 22, the process to establish a secure communication and to validate the device is the same in the case of authenticating a user, identifying a user and decrypting data.

Referring now to each of FIGS. 20, 21 and 22 separately, at FIG. 20 where a user is to be authenticated, once the valid data exchange is opened at step 2044 a process to authenticate the user is initiated at step 2046 by firstly requesting a local user identity at step 2048 and requesting a user password at step 2050. Further, user biometrics are requested at step 2052 and all data is packaged and encrypted with the certificate of authority key at step 2054. This data is subsequently passed to the certificate of authority as a request for authentication at step 2056 and the certificate of authority at step 2058 matches the ID to the ID store. If the ID is not valid, the process terminates at step 2060. If the ID match is valid then at step 2062 the certificate of authority performs a password to ID match. If the password to ID match is not valid then the process terminates at step 2064. However, if the process is valid, then at step 2066 the biometric data is compared to a template in the template store if the data is not valid the process terminates at step 2068. If the template is valid then a positive authentication is returned at step 2070 and the reader tests at step 2072 to determine whether the user has been authenticated. If the user has not been authenticated, the process terminates at step 2074. Otherwise, if the user has been authenticated then the process terminates at step 2076.

Referring now to FIG. 21, once a user has been identified, the system may wish to independently identify a user. Thus, once the valid data exchange has been opened at step 2046 a user identity process validation may begin at step 2080. The validation includes requesting the user password at step 2080, requesting user biometrics at step 2082, creating a password package at step 2084, packaging the requested data and encrypting with the certificate authority key at step 2086, and forwarding a request to identify the user to the certificate of authority at step 2088.

The certificate of authority subsequently matches the template to the template store at step 2090 and if the match is not valid the process terminates at step 2092. Alternatively, if the process valid the password is compared to the template. If the password is not valid the process terminates at step 2096. Alternatively if the password is valid a positive ID is returned from the certificate of authority to the reader at step 2098 and subsequently the reader tests to determine whether a positive ID has been returned at step 2100. If a positive ID has not been returned then the process terminates at step 2102. However, if a positive identity is confirmed then this is reported at step 2104.

Turning now to FIG. 22, the process identical to the authenticate biometrics step of FIG. 20 is applied and like reference numerals refer to like steps in both processes as shown in FIGS. 20 and 22.

However, in FIG. 22 additional steps are taken to decrypt the data. This is initiated by a data decrypt request at step 2106. The data is subsequently decrypted at step 2108 and the decrypted data is returned at step 2110.

It will be understood that this process finds specific applications in a number of areas. An elect number of examples are provided herein but are intended to be illustrative rather than limiting. The first example is an age verification service which may be used at any venue where a user is required to be over a certain age to be admitted to the venue or to participate in a given activity.

Using a single device which runs an age validation application, an end user can confirm their identity and display the results on the screen for others to view. The device used is owned by a trusted source and not the individual who is validating their identity. This prevents spoofing or false verification. The system is explained generally with reference to FIG. 23.

Figure 23:
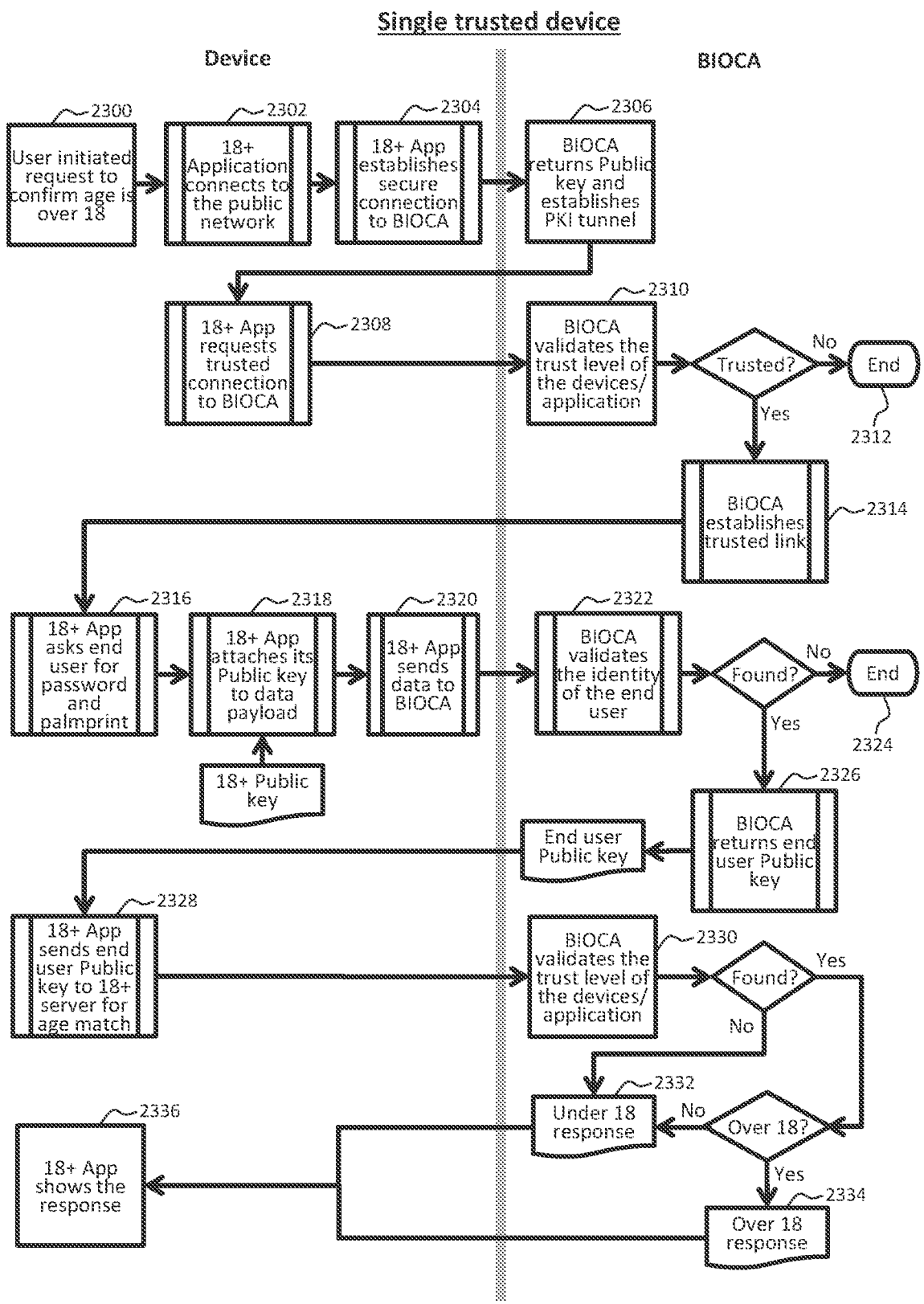

At FIG. 23 there is a user initiated request to confirm the user is over 18 at step 2300. This user initiated request is sent or provided by an application (referred to in this example as the "18+ Application"), which is connected to a public network at step 2302.

The 18+ Application establishes a secure connection to the certificate of authority at step 2304. At step 2306 the certificate of authority returns a public key and establishes a secure tunnel. In turn the 18+ application requests a trusted connection to the certificate of authority at step 2308 and subsequently at step 2310 the certificate of authority validates the trust level of the device application. If the device is not trusted the process ends at step 2312 and no age verification is returned. If the device is not trusted the process ends at step 2312 and no age verification is returned.

If the certificate of authority validates the trust level then a link is established at step 2314 and consequently at step 2316 the 18+ Application asks for a password and biometric (in this example in the form of a palm impression). The 18+ Application subsequently attaches the public key to the data payload and sends the data to the certificate of authority at step 2320. The certificate of authority validates the identity of the end user at step 2322. If the user is not found in the database then the process terminates at step 2024.

However if the user is found in the database the certificate of authority returns the end user public key at step 2326 and consequently at step 2328 the 18+ Application sends the user public key to the 18+ server for an age match. Subsequently at step 2330 the 18+ Application receives a public key and matches it in the database. If the public key is not found, then it is assumed that the user is under 18 and an under 18 response is returned at step 2332. However if the user is found and is over 18, an over 18 response is conveyed at step 2334 to the device and the 18+ Application shows the response at step 2336.

Figure 24:
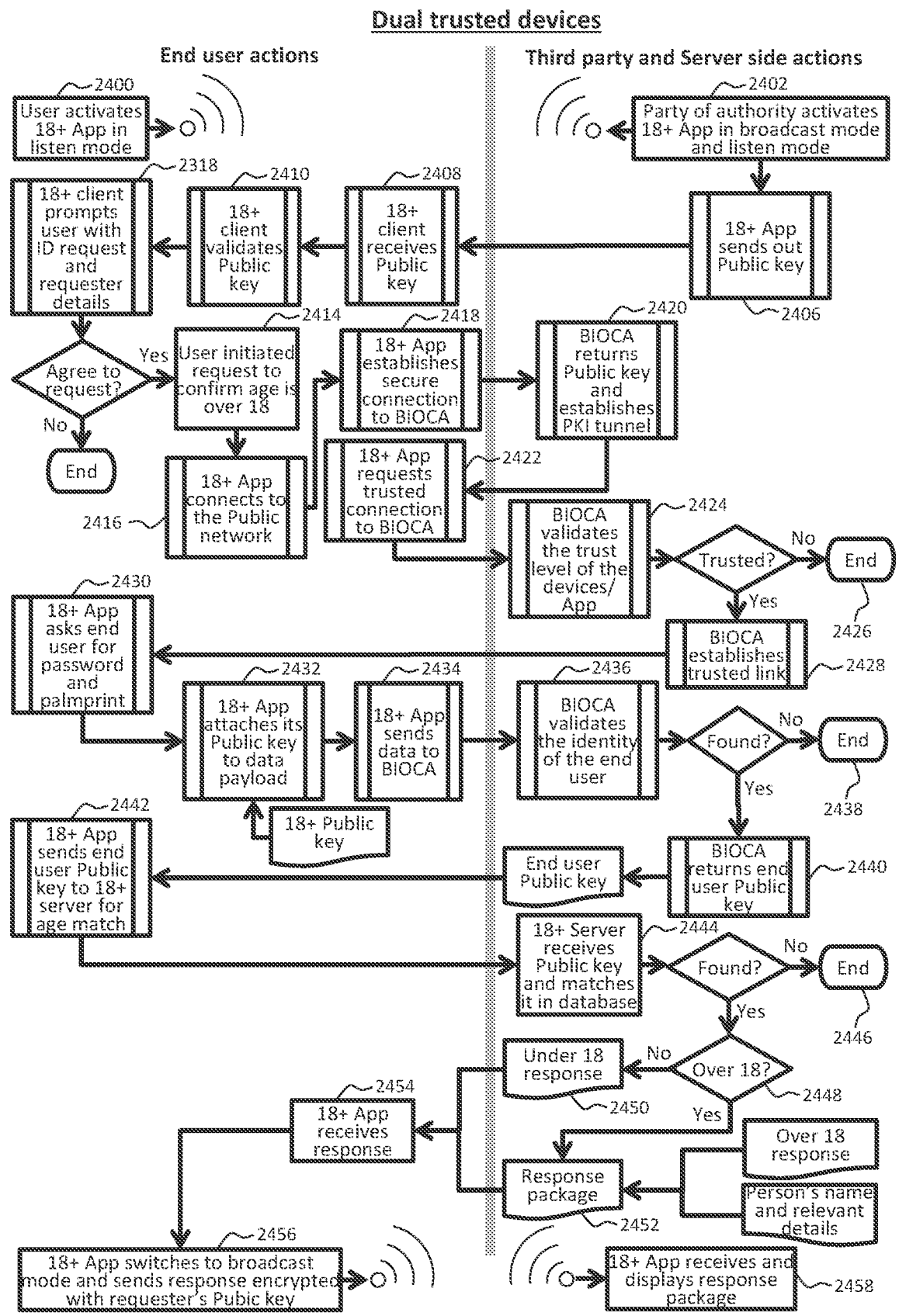
FIG. 24 is an example use of an embodiment of the present invention.

An alternative embodiment is shown at FIG. 24. The embodiment at FIG. 24 involves the use of dual trusted devices where both devices operate a version of the 18+ Application. At 2040 the user activates their wireless 18+ device in listen mode and the person of authority activates the 18+ Application in broadcast and listen mode at step 2402. Consequently the 18+ Application sends out a public key at step 2406. The 18+ client receives the public key at step 2408 and the 18+ client validates the public key at step 2410.

The 18+ client then prompts the user with an ID request and requests the details at step 2412. If the user agrees to the request, then a user request is sent to confirm that the user's age is over 18 at step 2414. The 18+ Application consequently connects to the public at step 2416 and the 18+ Application establishes a secure connection with the certificate of authority at step 2418. The certificate of authority returns a public key and establishes a secure tunnel at step 2420 and the 18+ client application requests a trusted connection to the authority at step 2422.

At step 2424 the certificate of authority validates the trust level of the device application and if the device is not trusted the process terminates at step 2426. If the link is trusted the certificate of authority validates an establishes the trusted link at step 2428. At step 2430 the 18+ application asks end users for a password and a palm impression. The 18+ Application attaches its public key to the data payload at step 2432 and sends the packaged data at step 2434. The certificate of authority validates the identity of the end user at step 2436 and if the user is not found the process terminates at step 2438.

However if the user is found the certificate of authority returns the end user public key at step 2440 and consequently at step 2442, the 18+ Application sends the user public key to the 18+ server for an age match. At step 2444 the 18+ Application receives the public key and matches it to the database. If no key is found the process terminates at step 2446. However if a key is found a further determination is made at step 2448 to determine whether the user is over 18. If the user is under 18, an under 18 response is returned to the 18+ Application at step 2450.

However if the user is over 18 a different response package is sent at step 2452. The 18+ client receives the response at step 2454 and the 18+ Application switches to broadcast mode and sends a response encrypted with the requested public key at step 2456. The person in authority subsequently receives and displays the response package at step 2458.

It will be understood that variations to the embodiments described herein are envisaged.

For example, a venue may subscribe to the 18+ service provider and receive a public key from the 18+ service provider. When a patron arrives at the venue a security guard may broadcast the venue's 18+ public key using the 18+ service providers' application and the patrons' device may receive the venue's 18+ public key.

When the patron's device displays the 18+ logo, the patron accepts that if they scan their biometric or provide a password at this point it will result in the requested personal information being supplied to the requesting party.

The patron scans their biometrics and may enter a password. The patron's device then communicates with the 18+ service provider and the service provider receives the patron's communication. The service provider authenticates the venue's public key and communicates with the certificate of authority to have the patron's public been authenticated.

The certificate of authority authenticates the patron's public key and communicates a pass result to the 18+ service provider. The 18+ services authenticates the venue's public key and then communicates an 18+ pass result to the patron's device encrypted with the venue's public key. If the patron's device receives the encrypted communication and the patron's device relays the encrypted communication to the security guards device with the patron's user name.

The security guard receives the patron's encrypted communication and the security guard decrypts the communication using the corresponding private key. That is, either the security guard's device has the private key locally stored or the security guard's device communicates with the service provider. The security guard's device subsequently displays the result and the patron's name. Upon the patron's device relaying to the security guards device the patrons device displays their name on the device for the security view, such that the security guard can confirm it is the same user name displayed on the security guard's device.

In yet another embodiment, the 18+ service provider authenticates the venue's public key and then communicates an 18+ pass result to the subscribed patron's user name to the security guards device encrypted with the venue's public key as well as sending a display user name signal to the patron's device. The security guard's device then receives the 18+ service providers communication as does the patron's device. The security guard's device decrypts the 18+ service providers communication using the security guards key. Subsequently the patron's device displays the patron's user name and the security guard confirms that the user name displayed on their device matches that displayed on the patron's device.

It will be understood that other variations on the embodiments described herein or within the scope of the broader invention described herein.

FIGS. 24 through 27 are flowcharts depicting a process flow followed by a capture device, a remote server and a contributing device in accordance with an embodiment of the present invention.

Referring now to FIGS. 40 through 55, there are shown various flowcharts and process flows for the creation and management of an eLicence.

An eLicence may be considered, in the real-world, as a special, specific implementation of a Profile Account. However, the reader is advised that where "real-world" examples of eLicences are provided in the ensuing description, particularly where such examples utilise non-technical language, no gloss should be drawn from the non-technical examples to limit the scope of the broader inventive concept, the claimed invention, or any one or more of the features of the claimed invention defined herein.

Figure 40:
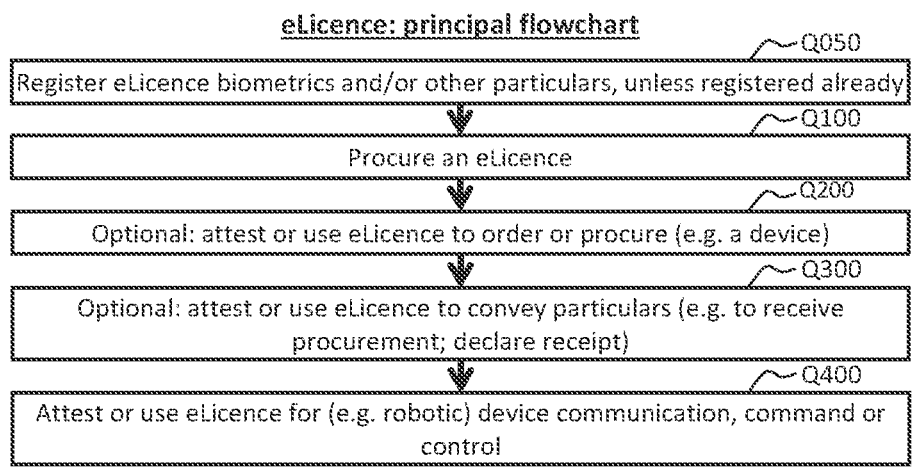
FIGS. 40 to 56 are example eLicence process flows in accordance with an embodiment of the invention.

Referring now to FIG. 40, there is shown a flowchart which combines the steps required for an individual to obtain an eLicence. The example provided with reference to FIG. 40 is arranged to operate most efficiently in a situation where a "retro-fitted" system is required. That is, where an existing licensing system exists (e.g. drivers licences) with conventional physical licence cards. Such conventional physical licence cards may already have associated with the cards particular biometrics. Information regarding the biometrics may be physically located on the physical licence card (e.g. as files stored on a smartcard). In such a situation, the eLicence may work in conjunction with the physical licence, but it will be understood that the broader inventive concept is not limited to utilising an eLicence in conjunction with a physical licence card. However, it will be understood that the embodiment described with reference to FIG. 41 may be used in a non-retrofit situation.

Turning now to FIG. 40, at step Q050 the individual who wishes to obtain an eLicence registers their biometrics and other particulars (e.g. their name, address, plus other identifying information). Once the biometrics and other particulars have been registered, at Q100 the individual procures an eLicence. Optionally at step Q200 the individual attests or uses their eLicence to order or procure a device. If the individual uses their eLicence to order or procure a device, the individual at step Q300 uses their eLicence to convey their particulars. This may be necessary in situations where a user needs to prove they are licenced in order to purchase a device. This is analogous to the requirement, in many jurisdictions, for a user to have a vehicle licence ("drivers licence") before they are legally allowed to purchase and register a road vehicle.

If the user has control over a vehicle (i.e. they own or otherwise have access to a vehicle), at step Q400 the individual uses their eLicence to command, control or communicate with a device either directly or indirectly via their 'smart' device. Such devices could include semi or fully autonomous vehicles and so-called robotic devices (i.e. devices capable of performing physical actions).

Figure 41:
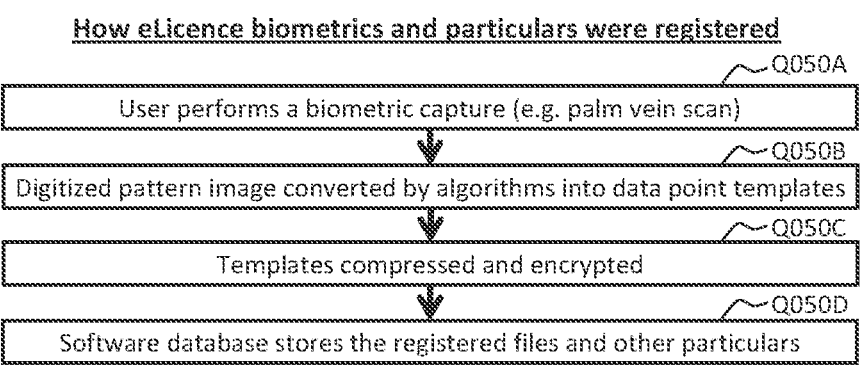

Referring now to FIG. 41, there is provided a more detailed process flow on how the user's biometrics and particulars are registered.

Firstly at step Q050A, the user performs one or more biometric captures or scans. This could take the form of registering fingerprints, facial image captures or palm vein/hand captures.

Once the biometrics have occurred, at step Q050B, the capture produces a digitized image pattern (or another suitable data format which may be stored in a computing device) which is then converted by an algorithm into data points utilizing a one or more dimensional template. Subsequently, the data points generator are compressed and/or encrypted at step Q050C. Finally, at step Q050D the registry's software database stores the registered files along with any particulars of the individual to form an eLicence record which may then be accessed.

Figure 42:
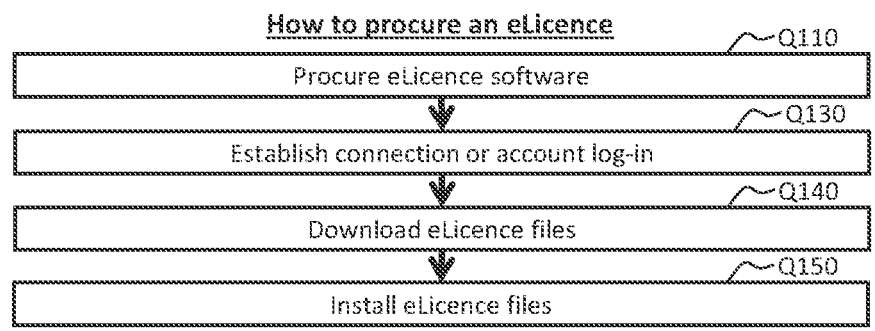

Turning now to FIG. 42, there is provided a more detailed explanation of how, in one embodiment, a user may procure an eLicence.

At FIG. 42, there is shown a flowchart which describes the process by which an eLicence is procured.

At step Q100 the individual procures the eLicence software which may be in the form of a smartphone application "App". The software may be procured from a registry's website or from an App Store. Using the 'smart' device, the individual is directed to a website to download software. The individual subsequently procures their eLicence files.

At step Q140, the individual downloads their files onto a 'smart' device. Subsequently at step Q150 the individual installs the files in the eLicence software App and this completes the process, such that the eLicence may now be used by accessing the App on the smartphone.

The manner in which an eLicence is accessed and used will now be described with reference to FIGS. 44 through 55.

Figure 43:
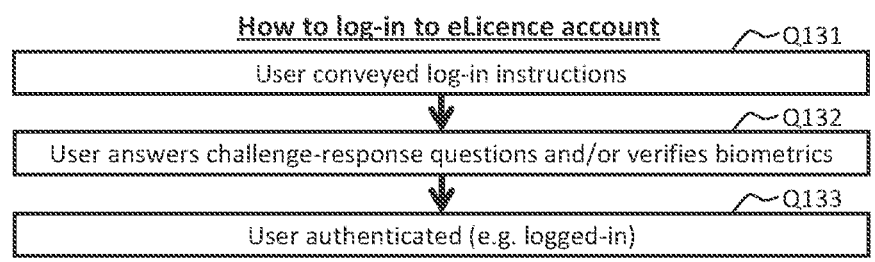

Referring now to FIG. 43, there is shown a number of possible methods for logging into an eLicence account, which is a precondition for using the eLicence for identification, verification and/or ecommerce applications.

At step Q131 in one embodiment, the individual may be prompted for a user name and/or password automatically when their device is brought into proximity with a smartcard. The username and/or password may have been previously supplied to an individual via email, sms or issued over the counter with their smartcard.

It will be understood that the two devices may communicate utilising any suitable communications protocol and in any suitable manner including the use of near field communication, radio frequency transmission protocols (such as Bluetooth) or optical transmission such as infrared.

It will also be understood that rather than the 'smart' device connecting to a smart chip, the device may connect to a node on a local network or may connect to a node on the internet. Such variations are within the purview of a person skilled in the art.

Turning to step Q132, the individual inputs their user name and/or password, or alternatively utilizes a code or utilizes a biometric authentication method, to gain access to the eLicence. Once the user is authenticated, then at step Q133 the individual becomes logged in to their eLicence account in order to download their eLicence files.

Figure 44:
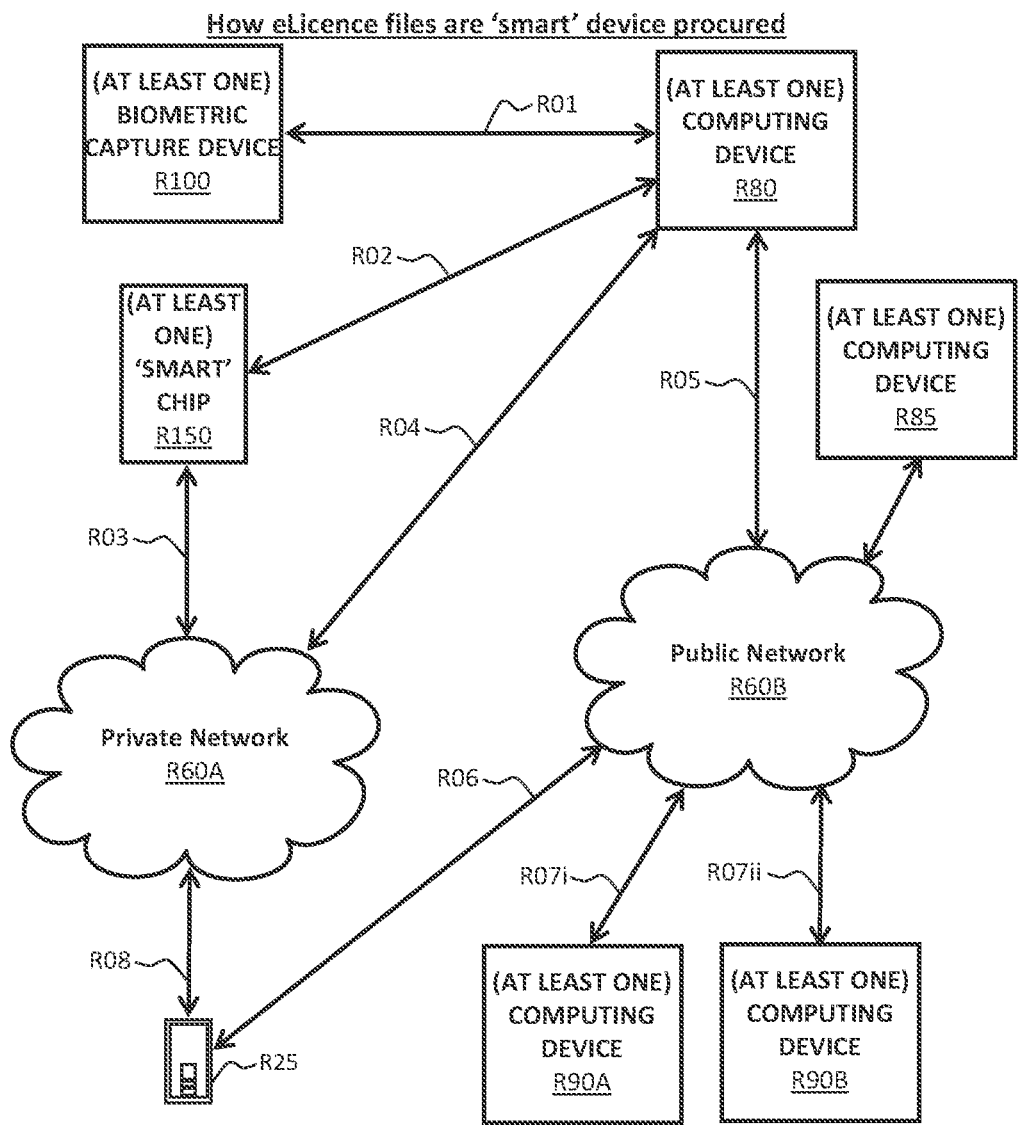

Turning now to FIG. 44, there is described a process by which eLicence files are 'smart' device procured.

eLicence files may be procured in a number of ways depending on the technology utilized. The technology utilised may include the provision of information from a smart chip/SIM card to a 'smart' device, from a local network to a 'smart' device and/or from a wide-area network, such as the internet to a 'smart' device. Each of these scenarios have similar process steps as outlined below.

Referring to FIG. 44, at step 1 an individual registers a biometric characteristic or source using the biometric capture device R100. In some embodiments, this step may take place at a government or authorised facility. At step 2, the captured data information is stored on the computing device R80. Again, in another embodiment, device R80 may be a government server connected to capture device R100.

The subsequent steps (that is steps 3 and 4) vary depending on how data is being transmitted to the 'smart' device (i.e. the source of the data).

If the data is being sent from a smart chip or a SIM card to a 'smart' device, then at step 3, the registry issues the individual with a smart chip/SIM card R150 which has installed the individual's eLicence biometric files (i.e. on the smart chip). Subsequently, at step 4 the individual may via the communications network R60A, which may be in the form of a close range communications network such as a near-field communicator or radio frequency network, cause the smart chip files to be transmitted to the individuals 'smart' device R25.

Alternatively, if the files are being transmitted from a local network to the 'smart' device, then at step 3 the registry may allow the individual to download their eLicence files onto their 'smart' device R25 via a local area network or some other form of near-range communications such as communication network R60A. In this instance, the individual may be issued with a login and/or password to join the network specifically for this purpose.

In a third scenario, where the individual downloads the licence files to from the internet to their 'smart' device then at step 3 the registry may email the individual eLicence files for download or alternatively, the individual may be emailed or otherwise sent appropriate hyperlinks or other links to an appropriate site or web address where the eLicence files may be downloaded.

Figure 45:
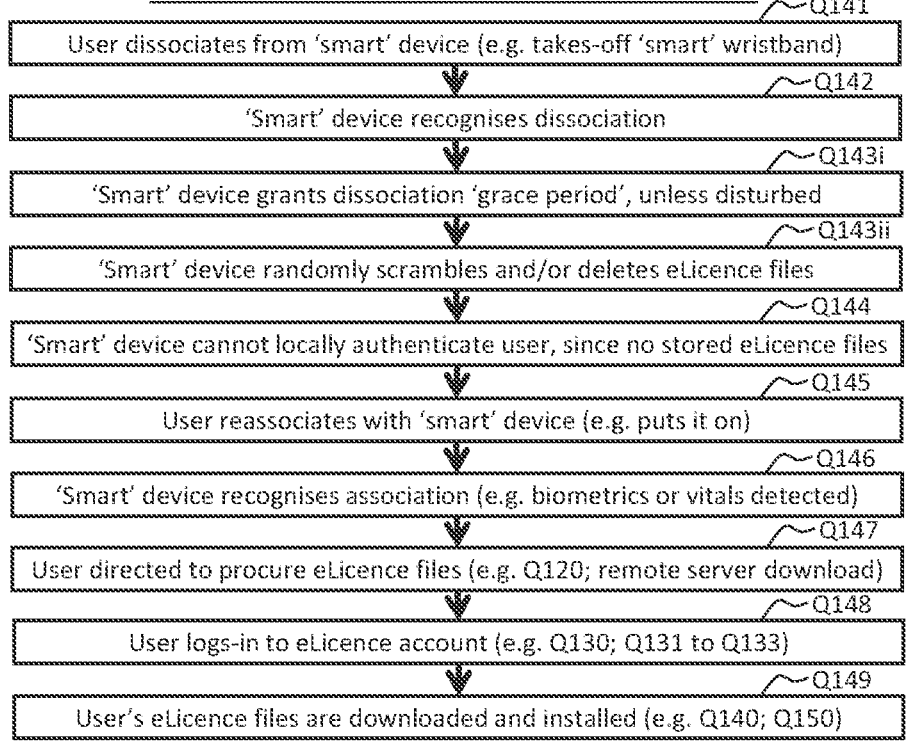

Turning now to FIG. 45, there is provided a scenario example for triggering and distributing events for a device.

At step Q141 the user may dissociate from their 'smart' device. In the context of the present example, device dissociation refers to a state where the user is no longer in contact with the device and/or the device can no longer detect/recognise the presence of the user. For example, the device may include a heart rate monitor which is able to detect the presence of a heartbeat. Where the user removes the device from their person, the device may no longer be able to detect the heartbeat of the user and it is therefore taken that the device has been dissociated from the user.

It will be understood that in this context the term "dissociate" is to be read quite broadly and may include activities such as the user physically separating from the device (e.g. moving to another room).

Once the user physically dissociates from their device, the user's 'smart' device, at step Q142 recognises one or more disassociation triggers or events. At step Q143i the user's 'smart' device may provide a "grace period" which allows the user to dissociate with their device for an extended period of time. However, if one or more triggering events occur then the device cancels the grace period and pursues a path to either scramble or delete the eLicence files. For example, a triggering event may be disturbing the device by moving the device from one location to another (which would be detected by way of accelerometers and/or gyroscopes). In another example, the device may include a geolocation module which detects movement of the device relative to a starting point.

Subsequently at step Q143ll the 'smart' device, if dissociated and/or disturbed may randomly scramble and/or delete the eLicence files.

Therefore, at step Q144 the 'smart' device may not be able to authenticate the user by comparing eLicence biometric files stored locally on the 'smart' device when newly captured biometric data information as the device has reverted back to an empty shell state. Therefore, at step Q145 when the user reassociates with the 'smart' device, the 'smart' device recognises association (at step Q146) and subsequently at step Q147 the user is directed to procure the eLicence files again such as by remotely downloading the files from a registry server.

Consequently, at step Q148 the user can once again log into their eLicence account and at step Q149 the user's eLicence files are downloaded and installed.

It will be also understood that the eLicence files may include other security mechanisms, such as a built-in expiry date, after which an eLicence file automatically is scrambled or deleted.

Figure 46:
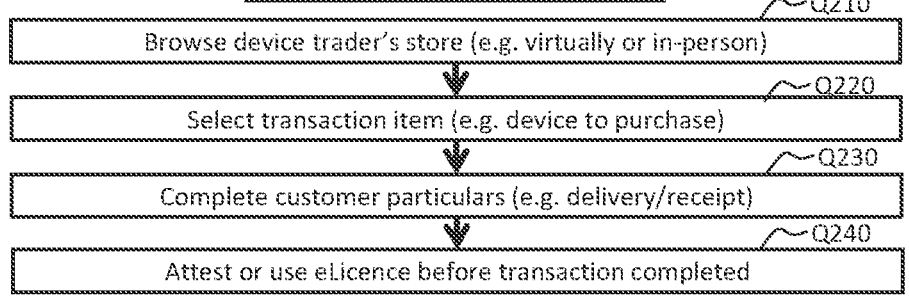

Referring now to FIG. 46, there is described a process on how to procure an item or a service using an eLicence.

At step Q210 an individual may browse an online store or a physical store. At step Q220 the individual selects the transaction items (i.e. the items which the user wishes to purchase).

At step Q230 the individual supplies their particulars (or authorizes to have their particulars supplied) which may include delivery or shipment details. Subsequently at step Q240 the individual uses their eLicence to complete the transaction. As the eLicence can attest to the identity of an individual and provide a large amount of personal information, the eLicence may be utilised to complete transactions with all activities typically requiring the user to manually perform the functions undertaken automatically by or in conjunction with the eLicence application.

Figure 47:
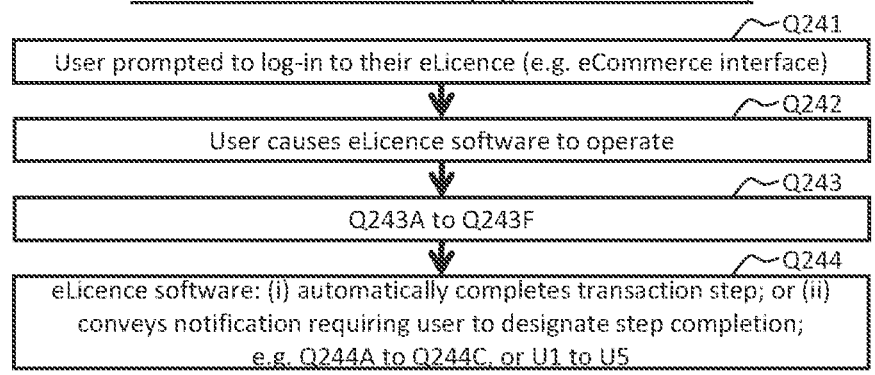

Turning to FIG. 47, there is shown a process flow and a method for how an eLicence may operate in conjunction with an ecommerce site.

Referring to FIG. 47, at Q241 the user is prompted to login to their eLicence. In once embodiment, ecommerce software has the eLicence software integrated into as an add-on. Thus when required the ecommerce software communicates with the eLicence on a user's 'smart' device causing a pop-up notification to be displayed or conveyed that advises the users to login into their eLicence.

At step Q242 the user causes their eLicence software on their 'smart' device to operate. Step Q243 is explained hereinafter with regard to FIG. 48.

At step Q244 after being logged in, the eLicence software automatically completes the transaction or conveys a notification requiring the user to designate the finalisation of the transaction.

Figure 48:
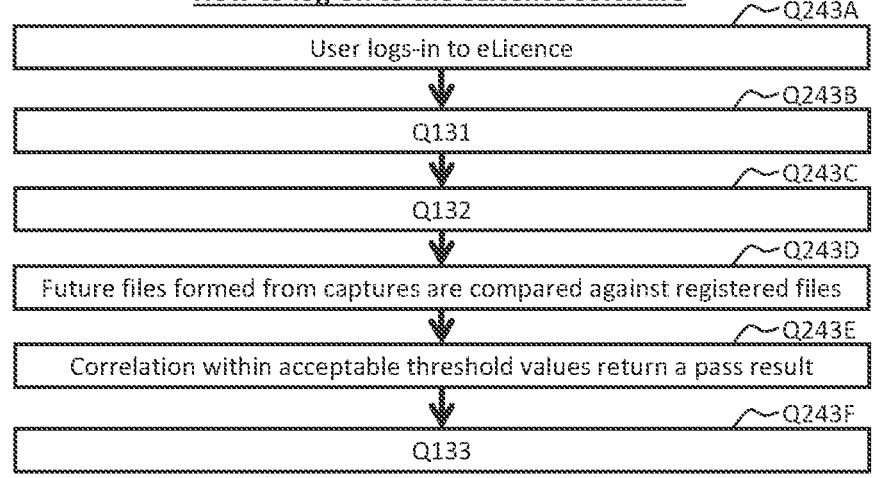

Turning now to FIG. 48, there is shown a process flow for how to logon to the eLicence software.

At step Q243A the user logs into their eLicence. At steps Q243B and Q243C the same steps as the steps utilised at step Q131 and Q132 are used.

At step Q243D the individual may perform subsequent captures. Consequently at step Q243E if the future files match with past files within acceptable threshold boundaries a pass result is returned.

At step Q243F the same procedure as step Q133 is carried out.

Figure 49:
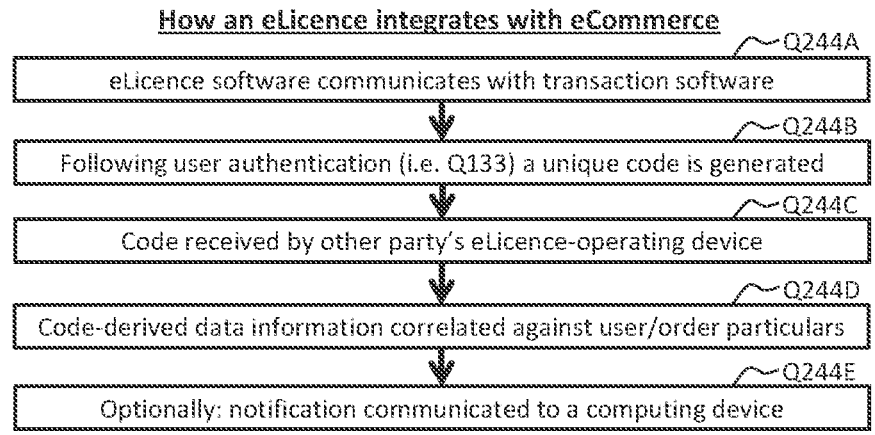

Referring now to FIG. 49 there is shown a methodology for an eLicence integrating with ecommerce.

At step Q244A the eLicence software (e.g. software developer's kit), integrated into a web-based application such as a merchant's eCommerce or other transaction software, communicates with the transaction software.

At step Q244B, following the user being authenticated (or logged-in to their eLicence), a unique code is generated. In one embodiment, a code is not generated if the user's eLicence software did not recognise or authenticate the user (i.e. if a pass result was not returned).

At step Q244C if the encrypted code is generated and subsequently received by the (e.g. merchants) transaction software it is then decrypted by the transaction software.

At step Q244D the decrypted data information is correlated against other user particulars and/or the user's order details, if applicable. For example, should the user's eLicence class (conveyed within the generated code) meet or exceed the 'restriction' or 'regulated' class designated for the order item then the transaction proceeds.

At optional step Q244E a notification may be communicated to a (e.g. third party or government) computing device either from the user's, merchant's or both parties' devices via a communication network (or Internet), to inform of the transaction's outcome.

Figure 50:
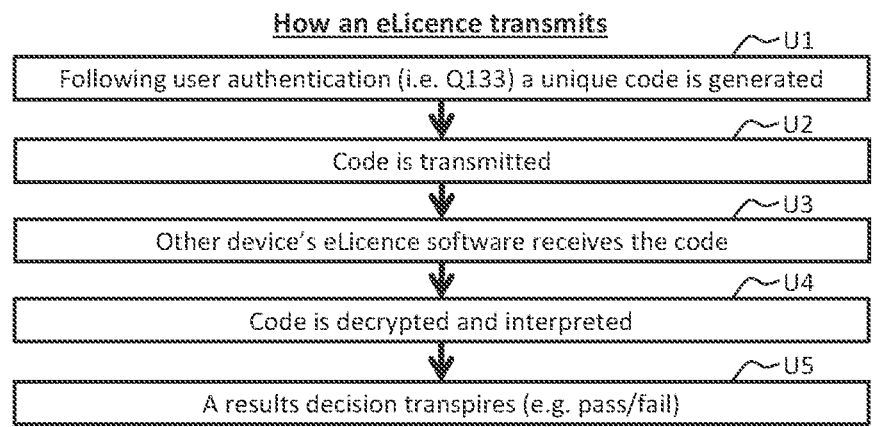

Referring now to FIG. 50 there is shown a methodology for an eLicence transmits.

At U1 refer to Q244B.

At U2 the user's device communicates a data information signal comprises an encrypted code.

At U3 another party's device also operating the eLicence software receives the code.

At U4 the other party's device decrypts and interprets (e.g. analyses) the code.

At U5 a results decision transpires, e.g. a pass or fail notification.

Figure 51:
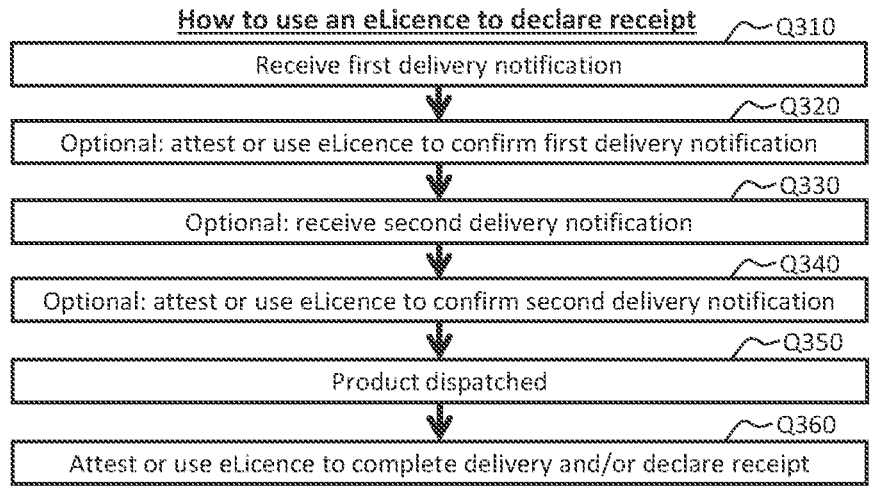

Referring now to FIG. 51 there is shown a methodology on how to use an eLicence to declare a receipt.

At step Q310, in one embodiment, the customer receives an email, sms or other instant message notification, advising the customer when and where their order will be delivered or asking the customer to define when and where the order is to be delivered.

At optional step Q320, the customer is required to confirm their delivery order using their eLicence, e.g. either accept the deliverer's delivery location or time, or define alternatives.

At optional step Q330, the customer receives another notification, e.g. 5-10 minutes prior to the delivery being dispatched to confirm that the customer will be present at the specified location and/or that the customer will be available to receive.

At optional step Q340, the customer performs similar activities as in Q320. However, in a further embodiment, the customer may be required to communicate their position (e.g. geolocation, altitude, etc, i.e. multi-dimension localisation) to the deliverer. In one scenario, providing position data Information would allow the deliverer to evaluate whether the customer is at or near the designated delivery location. In another scenario, the position data information is relayed in real-time to the deliverer so that the delivery may be completed where the customer is at a particular time (e.g. the customer's location may change over time, and the deliverer would be required to intercept the customer while on their travels).

At step Q350 the order may be dispatched, e.g. the deliverer completes the final journey to the customer's delivery position.

At step Q360 the customer is required to verify their identity using their eLicence prior to the delivery being completed and/or to declare receipt of delivery.

Figure 25:
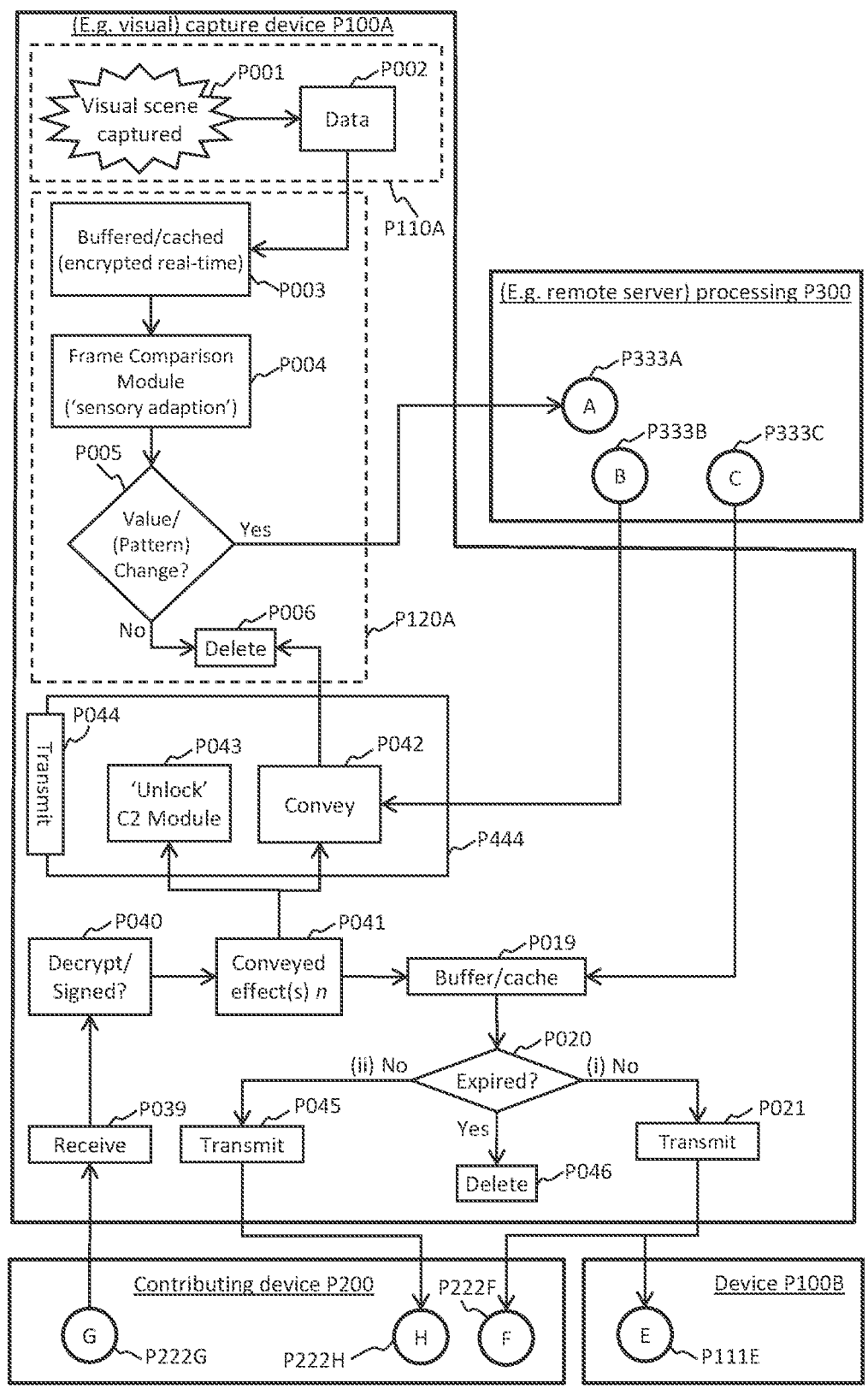
FIGS. 25 to 27 are example processes in accordance with an embodiment of the invention.
Figure 26:
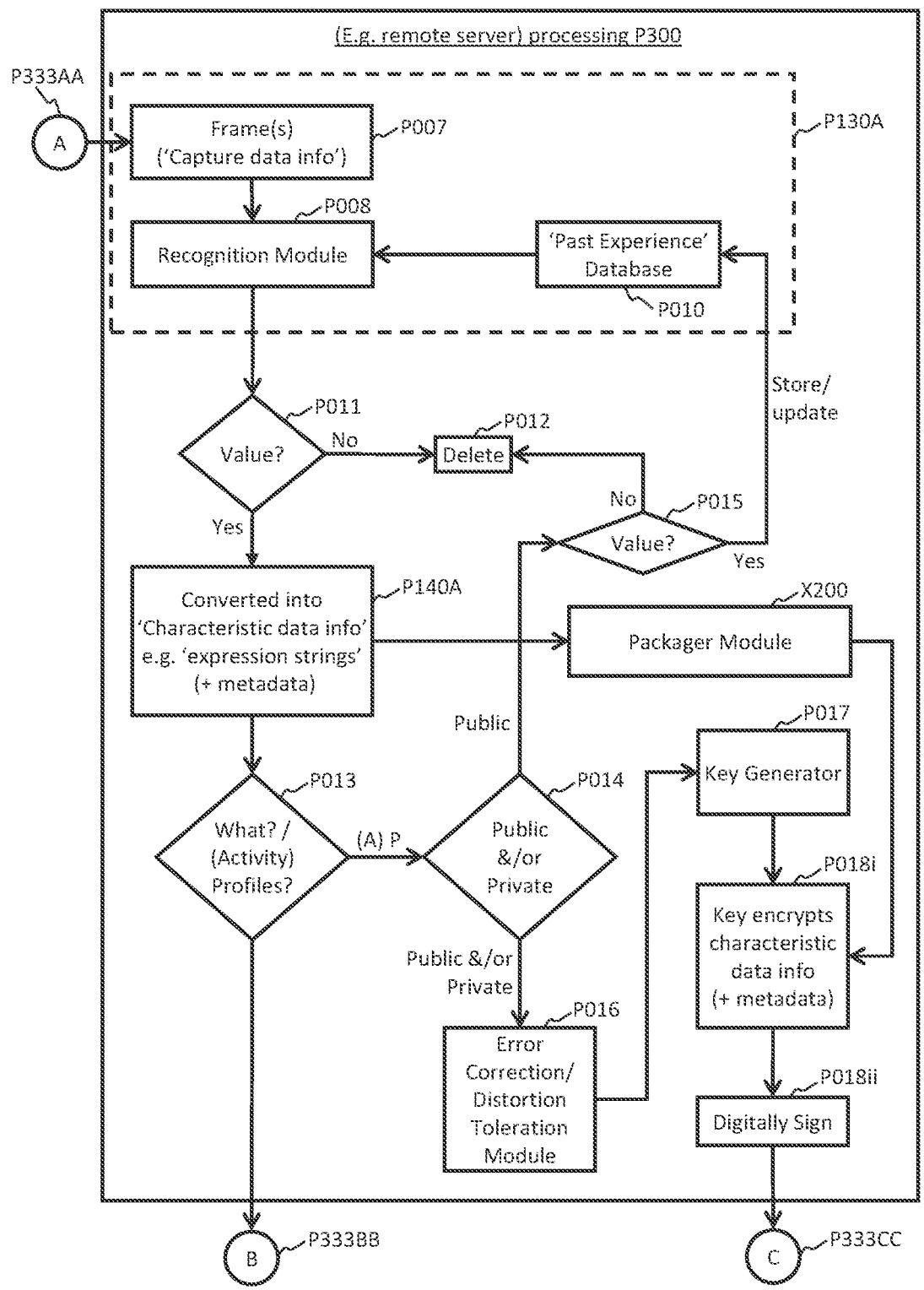
Figure 27:
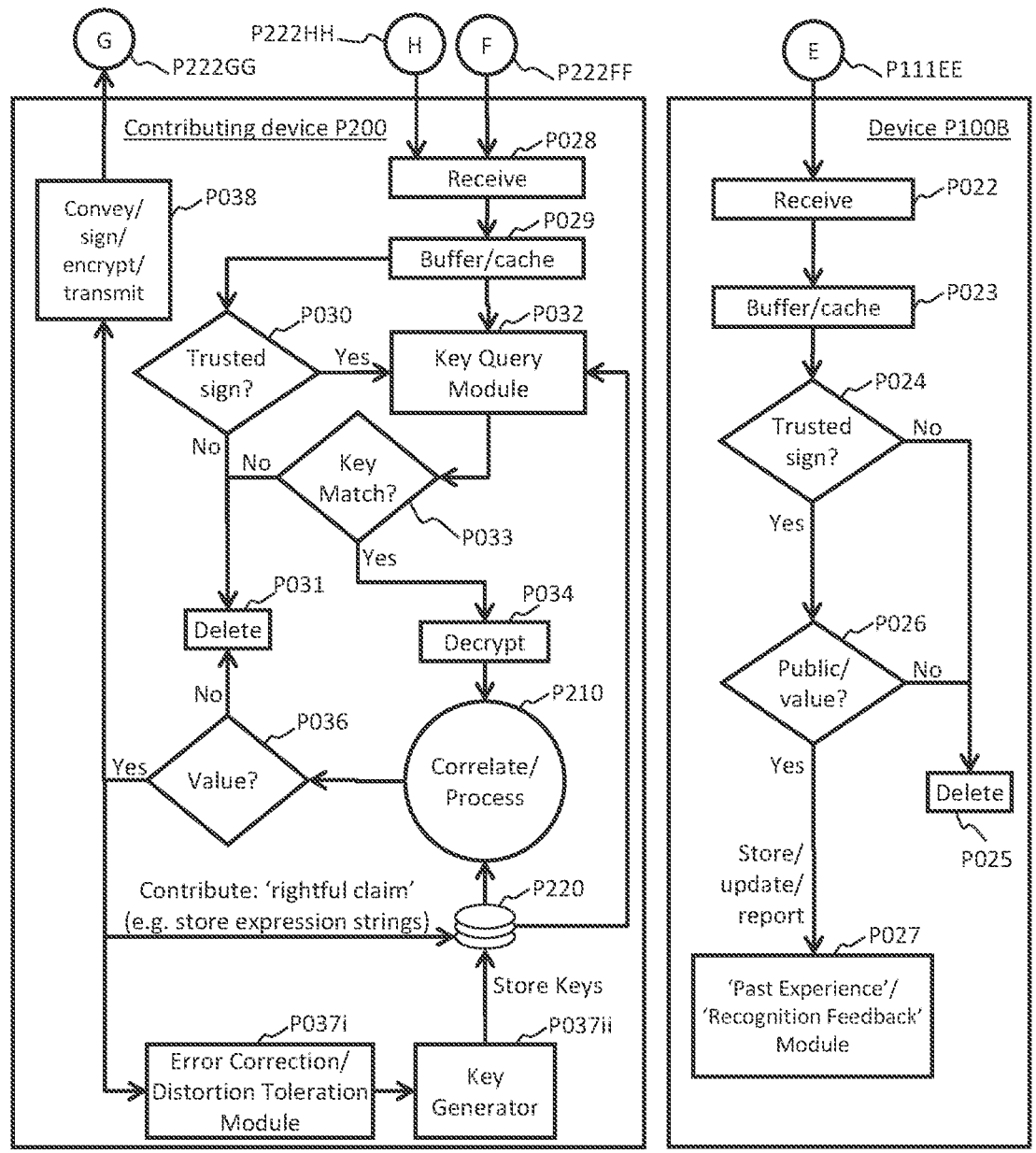

FIGS. 53 to 57 illustrate further verification scenarios in accordance with an embodiment of the present invention. FIGS. 25, 26 and 27 represent example embodiments of a capture device, processing device (or component) and contributing device respectively.

Figure 52:
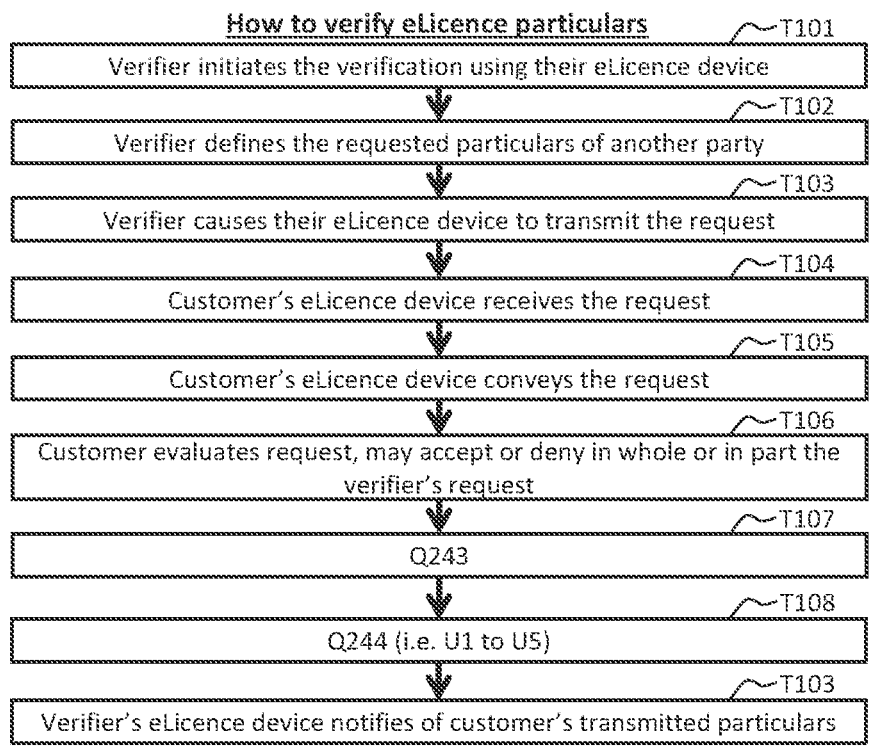

FIG. 52: How to verify eLicence particulars

At T101 an eLicence user initiates a verification. This user (labeled 'verifier' for the purpose of this example) intends to request another user's eLicence particulars, e.g. first, middle and last name; date of birth; residential address; eLicence number; or any other particulars which the eLicence may comprise.

At T102 the verifier defines the particulars which they wish the other user (labeled 'customer' for the purpose of this example) to supply. In one embodiment, the verifier navigates the eLicence software's available particulars options, selecting or deselecting for the customer request as necessary.

At T103 the verifier causes their eLicence device to transmit a data information signal, e.g. selecting the eLicence software's 'send request' option. Any eLicence device operating within wireless range could receive this transmission. Some embodiments are described herein which address selective, dedicated or secure communication between specific eLicence devices.

At T104 the customer's eLicence device receives the transmission.

At T105 the transmission causes the customer's eLicence device to convey a notification. In one embodiment, the verifier's request for the customer's eLicence particulars are displayed or projected on or via the customer's 'smart' device (e.g. 'smart' wristband). The customer's wristband display module (e.g. screen or monitor) presents, in one embodiment, the list of particulars the verifier has requested.

At T106 the customer evaluates the request for particulars, deciding whether they agree. If the customer agrees they may proceed with the request (i.e. T107). Otherwise, in one embodiment, the customer has the option to deselect one or more of the requested particulars.

At T107 the customer logs-in to their device's eLicence software. Refer to the description for Q243, specifically Q243A to Q243F.

At T108 the customer's eLicence software completes the transaction. Refer to the description for Q244, specifically U1 to U5.

At T109 the verifier's eLicence device notifies of the customer's transmitted particulars. In one embodiment, a list of the requested particulars is displayed on the verifier's eLicence device, with the particulars which were satisfied (or fulfilled) by the customer indicated with a green tick mark, those that were not shown, as a red "X" or, as appropriate, "NS" (not supplied). In another embodiment, the verifier may have requested the "18+" or "21+" (years of age) customer particular, which would return either a green tick if the customer's age satisfied that request, a red "X" if it did not, or "NS" if not supplied.

Note: in an alternative scenario a customer may be required to perform their biometric scan(s) on the verifier's eLicence device, e.g. a Police Officer requesting a citizen to verify their identity. In this scenario the Officer's device may have the citizen's eLicence files stored locally on the device or the Officer's device may communicate, e.g. via (at least one) communication network (or Internet) R60B, with another computing device such as a central server, e.g. the registry's server or (at least one) computing device R80. Results of the query would then be (relayed back to and) displayed on the Officer's device.

Creating selective, dedicated or secure communication between eLicence devices:

a. Transmission range modulation: if an eLicence device detects the presence of more than one other eLicence device then the eLicence software modulates the wireless transmission range (e.g. NFC distance) for the conveyance of any eLicence personal/private data information in a device to device exchange, i.e. to reduce the probability of unwanted devices receiving data information signals that were intended for exchange between two parties those devices may require their users to facilitate the exchange by reducing the distance between the their two devices, e.g. from a typical one meter range to a few centimeters. Thus, closer proximity for exchange becomes necessary. In one embodiment, the eLicence software conveys a 'traffic lights' user interface notification, e.g. green=maximum distance permitted, amber=closest distance required, and red=not working, e.g. failed process.

b. Code verification or exchange: following initiation of an exchange event (e.g. to request or convey eLicence data information) should a device detect more than one other eLicence device then the eLicence software notifies its user of the other devices, e.g. by presenting a list of user profiles, each transmitted from those devices. Each user can create their own user profile for this 'informal' promotion of their eLicence device. If two or more parties have the same user profile (e.g. name, symbol or logo) then each device may notify their respective user accordingly, e.g. suggesting the selection of alternatives, in the meantime. Therefore, for two specific users to communicate securely, they would each advise of and confirm each other's user profile, then select the other from their respective notification lists.

c. 'Is this of you?': in the scenario where one user (e.g. a verifier) captures on their device biometrics, for instance, of another user (e.g. a customer), then the verifier's device would process accordingly (e.g. as described for capture device P100A), i.e. it would convert the customer's biometrics into characteristic data information, then wirelessly broadcast that data information, seeking any 'rightfully claiming' devices (i.e. the customer's device such as contributing device P200). Therefore, an eLicence customer request may be attached with capture data information of the customer. Thus, only the customer's eLicence device would correlate the characteristic data information, causing the two parties' eLicence devices to establish a secure connection. In one embodiment, this would happen by the customer's device replying (e.g. P031), transmitting a data information signal which after being received by the verifier's device would generate an 'effect' (e.g. P033) such as 'send any other buffered/cached (e.g. P017) data information of me', and/or transmitting (e.g. P037) conveyed data information (e.g. P036) to the verifier's device, e.g. the eLicence requested particulars. In another embodiment, should more than one (prospective) customer be captured and characteristic data information formed of each and broadcasted by the verifier's device, then the customer which is recognized (e.g. P010 and/or P011) to be the 'primary', e.g. determined to be closer (millimeters) and more forward or directly facing to the verifier, may be allocated a higher probability or priority as the customer which verifier is interacting with. Consequently, the eLicence software decides that the primary customer should connect securely with the verifier's device.

Figure 53:
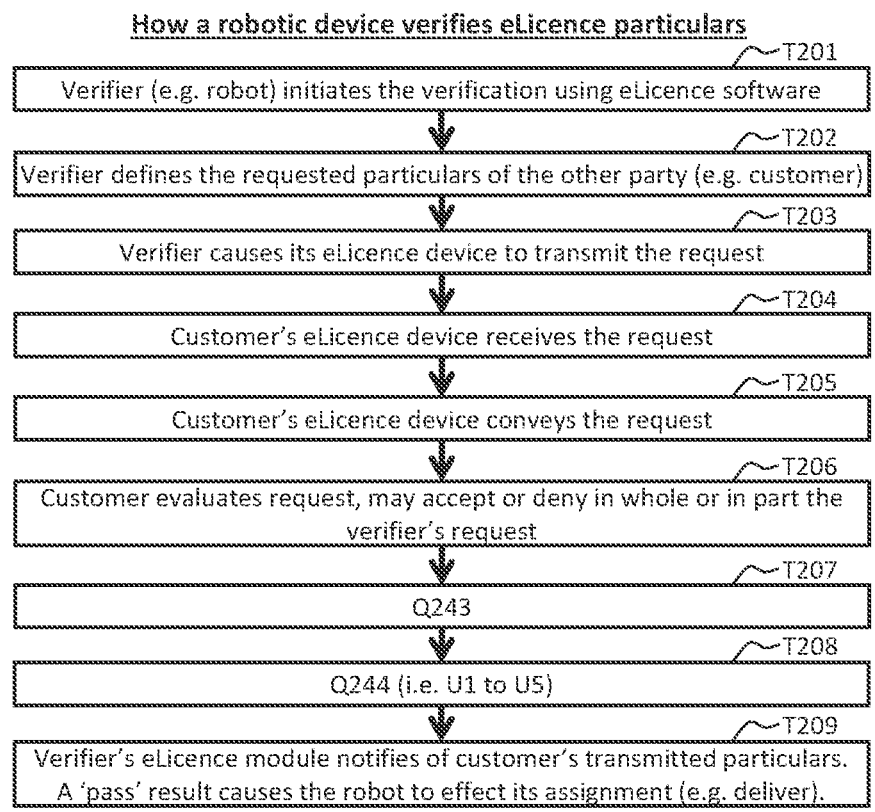

FIG. 53: How a robotic device verifies eLicence particulars

Note: this figure, in-principle, comprises similar processes as described in the previous figure (How to verify eLicence particulars, T101 to T109), however some changes have been made to address another embodied scenario, though the other figure may be referenced for other applicable description. For example, a robot has been dispatched to a customer's position. However, before performing a final approach, e.g. landing near (millimeters) the customer, the robot is instructed (or decides) to verify the identity of the potential customer first (from an appropriate, safe or secure distance, e.g. while hovering somewhere above).

At T201 eLicence software installed and operating on a robotic device or autonomous vehicle, for example, initiates a party verification (e.g. with a potential customer, receiver, passenger or another robot). This device or vehicle (labeled 'verifier' for the purpose of this example) intends to request this other party's eLicence particulars, e.g. first, middle and last name or other identification name/code; date of birth, or manufactured date; residential or base address; eLicence number; or any other particulars which the party's eLicence may comprise.

At T202: refer to T102. In addition, the verifier may capture the customer, e.g. one or more biometrics, or (Activity) Profiles, and package the formed characteristic data information (with associated metadata or 'tags') for transmission with the eLicence request.

At T203 the verifier causes their eLicence module to transmit the data information request signal.

At T204 the customer's eLicence device receives the transmission.

At T205, following the completion of one or more secure connection processes and/or 'rightfully claiming' correlation (e.g. P027, P028 and P029) steps, the transmission causes the customer's eLicence device to convey the request notification.

At T206: refer to T106.

At T207: refer to T107.

At T208: refer to T108.

At T209: refer to T109. The robot's eLicence module returns a 'pass' result, e.g. the encountered entity is the customer the robot was dispatched to meet. In one embodiment, the customer's eLicence particulars conveyed to the robot matched the customer order (manifest) details beyond an acceptable threshold. If a 'fail' result was produced the robot may then decide to return to base (e.g. no delivery effected).

Figure 54:
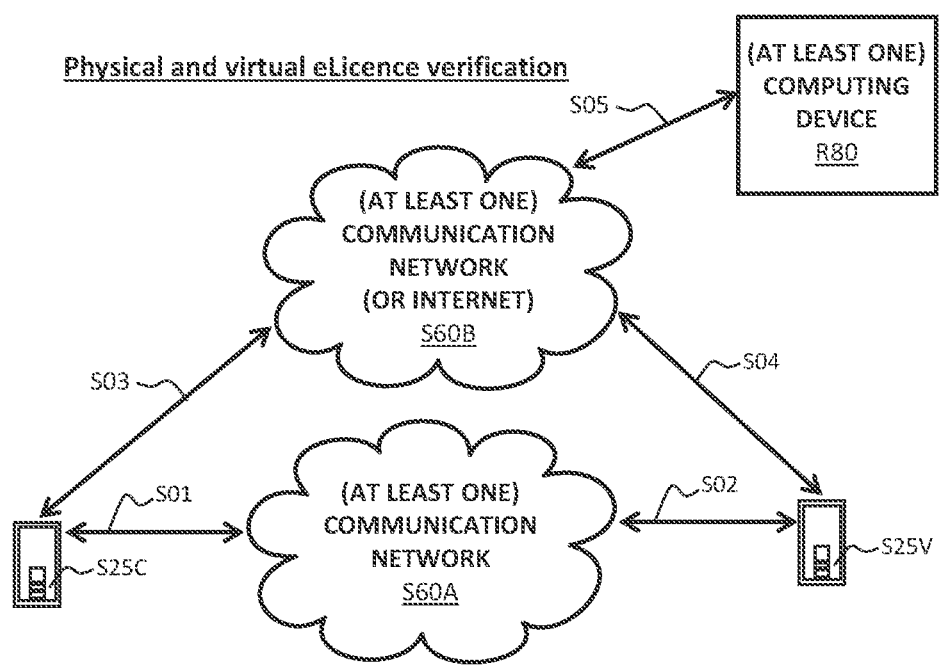

FIG. 54: Physical and virtual eLicence verification

S25C represents a customer's 'smart' device.

S25V represents a verifier's 'smart' device, which may be similar to the S25C.

S60A represents (at least one) communication network, e.g. close range communication such as NFC/RF, IR or Wi-Fi WLAN/PAN/DAN.

R80 represents (at least one) computing device, e.g. a third party or government server.

S60B represents (at least one) communication network (or Internet), e.g. 3G/4G (LTE, HSPA+, EVDO) Next G, GSM/GPRS or Wi-Fi WAN/MAN.

These communication forms (i.e. Public and Private network methods) may similarly apply to the other eLicence network diagram.

Figure 55:
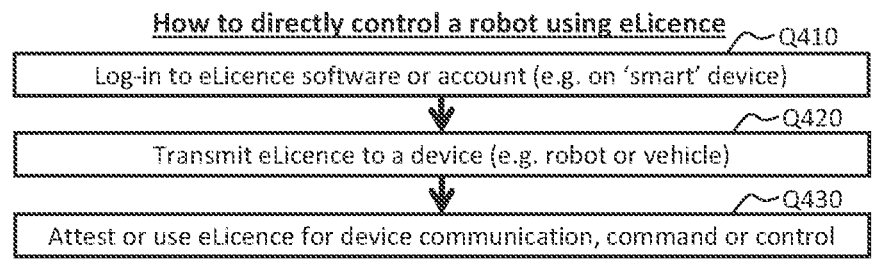

FIG. 55: How to directly control a robot using eLicence

At Q410 the individual logs-in to their eLicence software or account, e.g. on or via their 'smart' device.

At Q420, in one embodiment, the individual causes their eLicence software and/or files to be transmitted to another device, e.g. their autonomous or 'smart' vehicle, or robot.

At Q430 in order to communicate with, command or control their robot the individual now logs-in to their eLicence software using their robot.

Figure 56:
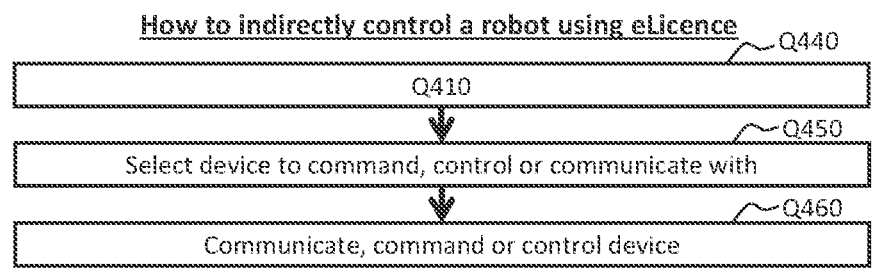
Figure 57:
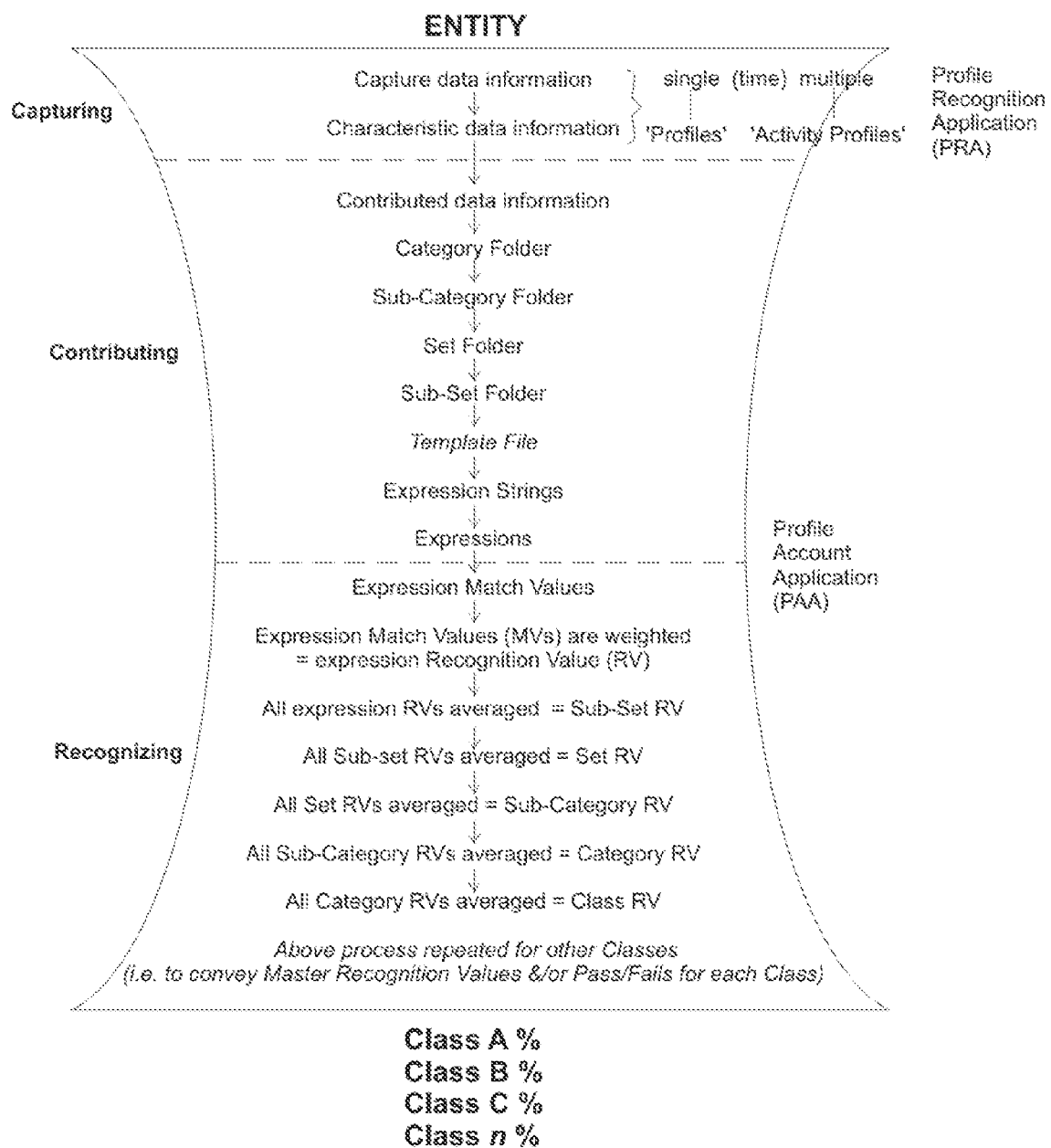
FIG. 57 a process flow for an embodiment of the invention.

FIG. 56: How to indirectly control a robot using eLicence

Using an eLicence to log-in to a user's account in order to initiate or facilitate the transmission of a data information signal which would permit the communication, control or command of another device, e.g. a robot or semi- or fully-autonomous vehicle.

At Q440 the same occurs as in Q410.

At Q450 the individual navigates their eLicence interface, and then selects the device they wish to communicate with, command or control, e.g. their autonomous or 'smart' vehicle, or robot. Therefore, in this scenario, for example, the individual is using their 'smart' device like a remote control for, or tethered device, to the robot.

At Q460 the individual communicates with, commands or controls their robot via their 'smart' device.

Referring to FIG. 25, at step 1, an entity is captured (e.g. visual scene captured P001) by a capture device P100A. At step 2, data is generated, e.g. Data P002.

P110A may represent a generic sensor, although for the purpose of conveying an example a visual capture device has been described in the steps proceeding.

At step 3, the data is buffered/cached while simultaneously being encrypted, i.e. in real-time, e.g. P003.

At step 4, the module analyses the visual feed, assesses changes in the data (for example, which may correspond with changes to a capture device's visual field of view).

At step 5, if a frame of a captured scene changes (e.g. a pattern change or pixel charge value change) then the frame is transmitted to a remote server P300. P300 may be a processing module integrated into the capture device P100A or a separately housed device such as a remote server.

At step 6, if there are no frame changes or frames of value then the data is deleted.

There may be instances where pre-processing of an image is required and in such a case, component P120A may represent a pre-processing component of the capture device.

At step 7, the frames that are of value are transmitted to the processing unit or device P300.

At step 8, the valued frames are received by the remote server P300, and the frame(s) are referred to as 'capture data information' P007.

At step 9, the capture data information (CaDI) is analysed by a Recognition Module P008 and a 'Past Experience' Database P010 is referenced.

Where feature data is required to be extracted from an image, P130A is a feature extractor in a typical biometric system.

At step 10, if the features extracted are of value P011 (e.g. Activity Profiles and/or Profiles were recognised), then the CaDI is converted into 'characteristic data information' (ChDI), e.g. 'expression strings' (+ metadata) P140A.

ChDI may be considered descriptive data information of the (Activity) Profiles, rather than the CaDI itself. For example, a scene/frame with a dog in it would in the case of a visual image capture not return a visual image file as ChDI but rather a description of the scene which includes the dog. Different recognition add-ons would be utilised depending on specific use cases, and such variations are within the power of a person skilled in the art.

At step 11, if the CaDI was not of value (i.e. no recognised (Activity) Profiles) then the data information is deleted.

At step 12, the remote server P300 may return a recognition result which may then be conveyed to the device P042, via movable P013. An example of conveying includes a capture device displaying augmented reality (AR) data information to a user, informing the user details of an object, or (in)tangible, which was captured by the AR device's forward facing camera.

P444 represents an application device or 'end use' of this recognition account.

At step 13, if (Activity) Profiles were present at P013 they may then be sorted into Public and/or Private categories.

At step 14, if Public (Activity) Profiles are identified, they may be transmitted to a value module P015.

At step 15, Public (Activity) Profiles are contributed (i.e. stored/updated) on the 'Past Experience' Database P010 if they are determined to have value. In other words, the Database P010 may accumulate addition or new experience/encounter memories.

At step 16, if the Public (Activity) Profiles are not of value they are deleted P012.

At step 17, Public and/or Private (Activity) Profiles are processed by an Error Correction/Distortion Toleration Module P016. The Module has the following functionality:

(a) A capture device forms CaDI, which is then converted into ChDI, e.g. expression strings (e.s.). ChDI is not always automatically contributed because the captured source may not be of the Profile Account/eLicence (i.e. recognition account) owner. A capture device, when dealing with Private ChDI, must manage transmission of data information accordingly, i.e. restricting which devices receive for contribution. This can be accomplished a number of ways. In one embodiment, a capture device utilises public/private key encryption.

(b) For example, in biometric reading multi-samples of the same captured source (e.g. facial) could result in not completely consistent codewords, data arrays or ChDI of the facial biometric to previously contributed or calculated strings for an individual. Such reasons could be due to noise or interference. This can be accommodated through the use of methods which ensure that multi-samples each with very similar biometric expression strings would lead to the generation of the same cipher key.

(c) In some embodiments, such methods include error-correcting code schemes, Shamir's key sharing scheme, soft two-level construction by wrap-around and pinsketch, and/or Cascaded Linear Discriminant Analysis (e.g. P016).

(d) In other words, error correction and/or distortion tolerance methods can accommodate the variance of the biometrics, allowing a 'robust key' to be generated from distinguishing features.

At step 18, the robust key is inputted into a Key Generator (e.g. P017). The same unique key (e.g. codeword/phrase) may be generated for the same user's biometric source even if the biometric is acquired at a different time or under different (e.g. environmental) conditions.

(a) In one embodiment, if a sufficient number of expressions are recovered correctly, the 'bound secret' (e.g. Private Package contents) can be restored exactly. In one scenario, if a recognition account owner formed 'seed' ChDI which contributed e.s. of a source and that e.s. was error corrected and/or tolerance distorted then a unique key may be generated from the 'raw' e.s. Later, when a non-seed capture device, captures this same biometric it may similarly form this unique key, and use this key to encrypt the transmission of the respective e.s. so only the rightful owner can contribute as they would have the same unique key to decrypt this Private Package.

(b) However, after a contributing device receives and decrypts the revealed e.s. may be first analysed against the corresponding average expression string in a template txt file to ensure it is within tolerance; if not, it is deleted, i.e. not contributed.

At step 18, the unique key is used to encrypt a respective ChDI package P018$i$, which was packaged by the Packager Module X200. However, before encrypting, a copy of the unique key is added to the package, to also form part of the encrypted 'message'.

At step 19, the encrypted packages are digitally signed by the remote server P300 or capture device P100A. In one embodiment, the device's Private Key is used to digitally sign the packages.

At step 20, the digitally signed (and encrypted) packages are transmitted to the capture device's buffer/cache (e.g. P019).

Referring to FIG. 27, at step 21 the package is time restricted. A newly formed package may not be expired at this point, proceeding to the next stage.

At step 22, the package is transmitted. At step 23, the transmission may be received by numerous devices. In one scenario a contributing device P200 and another device P100B may receive.

At step 24, device P100B receives the capture device's transmission. At step 25, the package is buffered/cached.

At step 26, the package is checked for a trusted digital signature. If no trusted signature is found the package may be deleted. Otherwise the package proceeds to the next step.

At step 27, the package is assessed for value or a Public designation. If the package is not of value and/or is not a Public package the package may be deleted. Otherwise the package proceeds to the next step.

At step 28 the Public package is contributed (e.g. stored/updated/reported) to a 'Past Experience'/'Recognition Feedback' Module.

A Recognition Feedback Module, in one embodiment, facilitates the acquisition of recognition data information on particular (Activity) Profiles which may have been captured by the capture device (e.g. P100A in FIG. 25). For example, a client (or business customer) may have subscribed to the recognition feedback service which would allow them to receive updates on their products in the marketplace or social environment. In one scenario, an individual may be captured wearing a particular hat (or other article of clothing or accessory). The client is interested in knowing where in the world their hat products end up, what season/date it is worn, what time of day, etc. In another embodiment, the wearer's biometrics may also be captured, and their contributing device may receive the capture device's broadcast of them, wearing the hat. The Recognition Module (e.g. P008) may have an add-on specifically for the Recognition Feedback service, searching CaDI for subscribed clients' products and/or services. The Packager Module (e.g. X200) may similarly process a package for such an embodiment. In addition there may be provided a Recognition Feedback request, asking the rightfully claiming account owner if they would be interested in supplying some of their personal details to the Recognition Feedback client, i.e. the hat company. Such details may include the person's year of birth and contact details. The contact details may utilised by the hat company to issue new product updates to that individual. An account owner may convey their particulars for this purpose in the reply communication to the capture described in the following steps (e.g. particularly, those referencing Convey P042 and Transmit P044).

At step 29, a contributing device receives the capture device's package transmission. At step 30, the package is buffered/cached.

At step 31, the package is checked for a trusted digital signature. If no trusted signature the package may be deleted. Otherwise the package proceeds to the next step.

At step 32, the trusted package is processed by a Key Query Module. This Module references the contributing device's P200 database (e.g. P220) of keys for a match in order to decrypt the capture device's encrypted package.

At step 33, a key decision is returned. If no corresponding key is found the encrypted package is deleted. Otherwise, the package is decrypted.

At step 34, the package contents (or items) are correlated/processed. For example, if the raw e.s. corresponds with a template stored in the contributing device's database it may be contributed if the expressions are within tolerance, or of value (e.g. P036). If not, it is deleted. In another embodiment, the text file (e.g. 'Read Me') is processed by the device, the capture device's Public Key is acknowledged and stored, and the respective unique key of the raw e.s. is contributed.

Note, an Error Correction/Distortion Toleration Module (P037$i$) and Key Generator (P037$ii$) may be utilised by the contributing device, particularly during the 'seed' stage or for early account contributions. A similar process as that described for the capture device's modules would occur. These contributing device components would facilitate the generation of the keys which the contributing device used in step 33 to decrypt the capture device's package.

At step 35, the contributing device completes one or more or combination of the following:

(i) conveys or packages a message for the captured device;

(ii) digitally signs the package with the contributing device's Private Key;

(iii) encrypts the package with the capture device's supplied Public Key; and (iv) transmits the package.

At step 36, the capture device receives (e.g. P039) the contributing device's transmission.

At step 37, the capture device decrypts the message with its Private Key and checks that the message is digitally signed (P040).

At step 38, the capture device is conveyed or processes the contributing device's message (P041) in one or more of a number of ways:

(a) In one embodiment, the message conveyed to the capture device by the contributing device is that which was originally packaged by the capture device, e.g. the contents in the Pr e.s. txt file. This message may then instruct the capture device to issue (or transmit) the outstanding files (e.g. expression strings) which were associated to the captured account owner, but not of the account owner. Refer to FIGS. 61 and 62 for further description.

(b) In another embodiment, contributing of the e.s. or decryption of the e.s. may be sufficient to authorise the account owner to convey special instructions to the capture device. These may include the account owner's: privacy constraints such as exclusion zone, shrouding and ghosting; particulars (e.g. 18+); membership, client, customer, subscriber or patron identification numbers; advertisements (e.g. business agent details); 'tags' (e.g. metadata); preferences (e.g. device customisation settings); or orders for commanding or controlling devices such as robots, 'smart' vehicles and other semi- or fully-autonomous machines.

(c) In some embodiments, privacy constraints may impose restrictions or functions on capture devices such as delete all other e.s. of the account owner which was captured like the one received by the contributing device, which is a form of shrouding. In one embodiment, the capture device is ordered to expire any other data information in the buffer/cache (e.g. P019). In another embodiment, the capture device may be ordered to superimpose, blur, pixelate, black-out an image such as that related or of the account owner; again, a form of shrouding. In another embodiment, the capture device may be ordered to prevent the conveyance (e.g. P042) of Internet 'tags', for example, of the account owner being return as augmented reality information, for example on the owner of the capture device's display or recordings. This is a form of ghosting. In another embodiment, the capture device is ordered to not function or fully-function within a (moving) exclusion zone of the account owner, or not to encourage inside that exclusion zone.

At step 39, following instructions receive from the contributing device, the capture device engages in a secure connection with the contributing device. In one embodiment, the capture device transmits (P045) the e.s. which did not correlate with the account owner but were recognised as being in the same scene as the account owner, so these other e.s. may now be issued as tags to be contributed in an Association's folder, for example (refer to categories in FIG. 28).

At step 40, the contributing device receives (P028) the contributing devices transmission.

Figure 28:
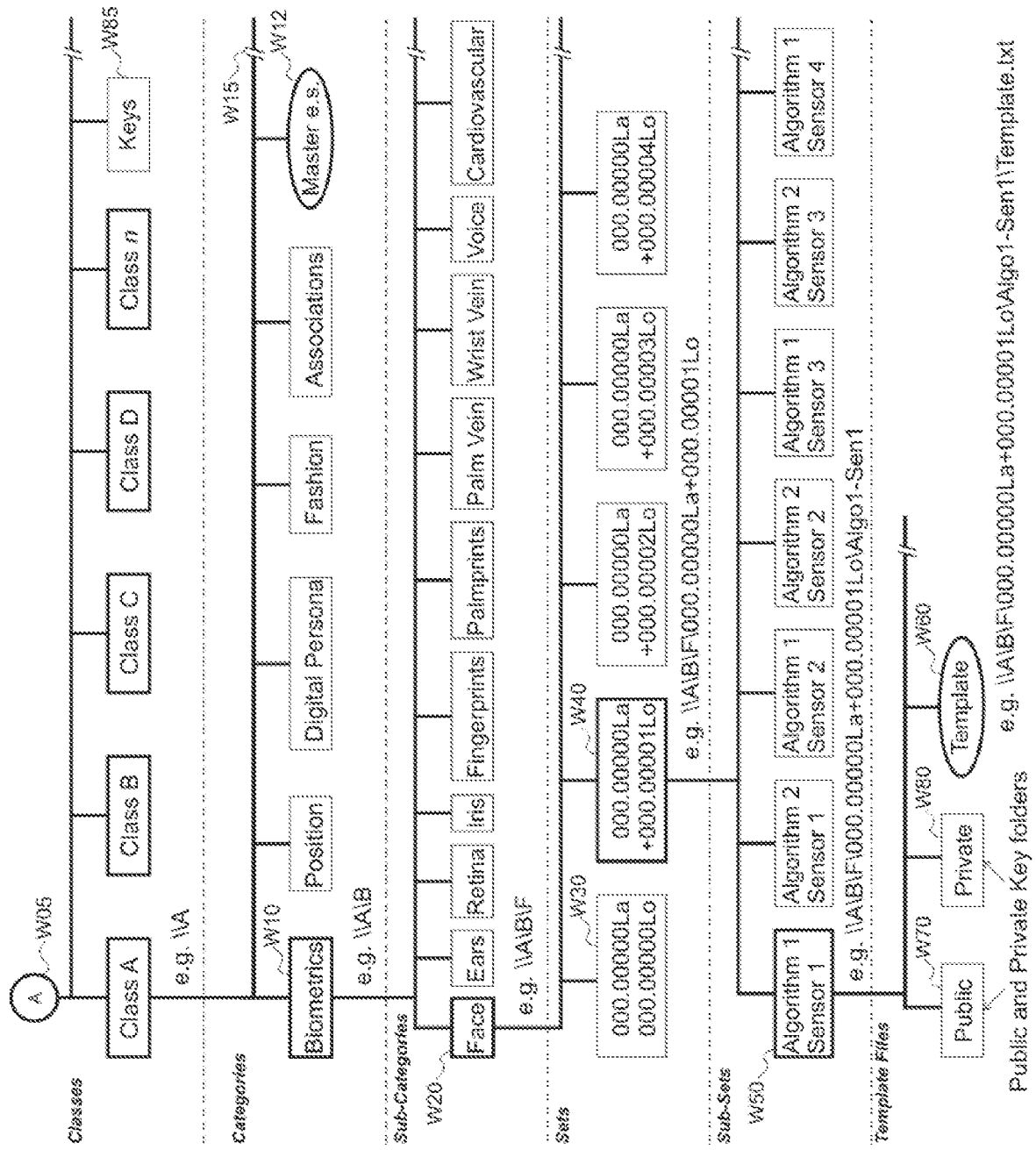

FIG. 28 depicts one embodiment of the structure of the contribution storage device (P220 in FIG. 27).

The structure may be divided up into six (6) levels, from Classes to Template Files. An example directory address is illustrated for each folder path.

W05 represents the root directory.

Class designations represent a different weighted sensor. In one scenario, Class A sensors are registered or digitally signed. In other words, they are owned/operated by a particular party such as a government, so they are trusted devices that are kept under controlled conditions and are regularly maintained, calibrated and audited. Class B are corporate enterprise owned devices which are attributed a lower weight. Class C are civilian or consumer devices.

At W50 the 'Algorithm' represents the type of recognition algorithm or software (e.g. 'add-on') which the capture device uses to generate ChDI from CaDI. The Recognition Module (e.g. P008 in FIG. 26) represents the component which operates this recognition algorithm software. The 'Sensor' is the capture device which captures the source (which with reference to FIG. 28, is a sensor captured by the facial biometric).

At W30 the Latitude Longitude folder represents the individual's face being captured by a device at a perspective normally taken for portrait photographs, i.e. 'head-on'.

Figures 29, 30:
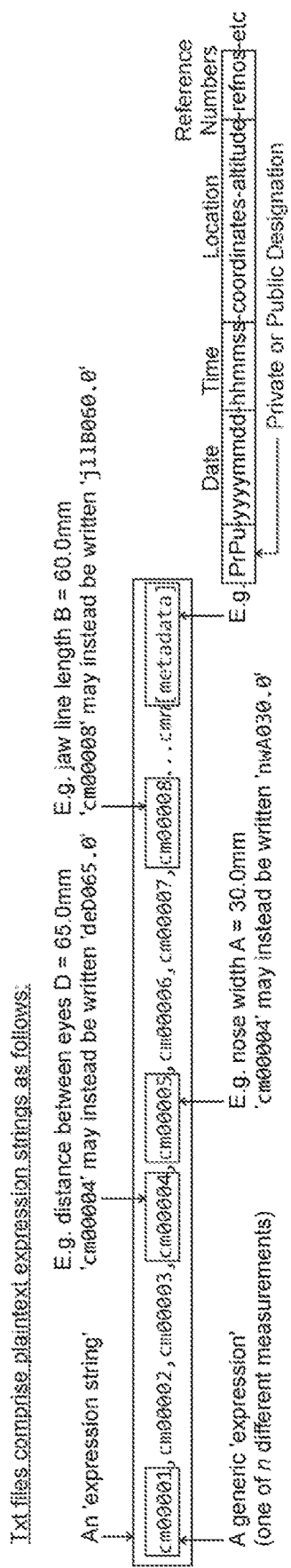

FIG. 29 depicts one embodiment of a text file expression string, which is one embodiment of ChDI.

Recognition software generates the expression strings. Different add-ons may generate different strings, depending on specific use cases.

Reference Numbers in the metadata represent links (or associations) to contributions in other text files, in the same or another folder within the root directory. For example, an individual's facial and iris biometrics may have been captured in the same scene, at the same time. Thus, the two respective expression strings which were contributed would each reference the other in their metadata to establish a known relationship.

In some embodiments, Date, Time and Location metadata are used for the recency and location closeness tests, e.g. when calculating the respective weights to generate the Recognition Values.

FIG. 30 depicts one embodiment of a contribution, i.e. the plaintext pasting or entry of an expression string into a text file.

At CN1a, when characteristic data information is contributed to a Profile Account/eLicence at least one expression string is added to a template text file. Each occasion an expression string is contributed to a template text file (and, consequently, a new average string is calculated) both lines (i.e. both identifiers or data arrays) are used to generate keys for asymmetric encryption (or, for example, binding a cryptographic key with the data arrays such as by using biometric-based key release or biometric-based key generation). In one embodiment, the keys may be generated using an RSA or DSA algorithm.

In one embodiment, Java programs are used to store the Public and Private Key files after key generation and encryption process. In another embodiment, Black Box ('functional testing') and White Box ('glass box') test design methods may be used for testing the applications.

At CN1b, average string is the same as the first string entry since there is only one string to average.

FIG. 31 depicts a second contribution.

At CN2, this is the average string of the two above contributed strings.

In one embodiment, a maximum number above or below, or percentage difference from, the average measurement value for a particular characteristic (e.g. expression) would be set or permitted. For example, the 'deA062.50' expression was 0.50 greater in value than the deA expression average in Contribution number 1. If this value was greater than or equal to +/−1.00 than the average value then this characteristic measurement may be rejected, representing a 'fail' (e.g. failed correlation) for that expression. In one embodiment, failed expressions (if contributed) may be represented as 'deAfff.ff'. Too many failed expressions would result in that whole expression string not being permitted for contribution. Therefore, an acceptable number of failed or error expressions are permitted. Further, the term which represents the minimum number of 'passes' (or minimum percentage out of the total characteristic measurements in an expression string) and, thus, the maximum fails or errors is called a 'contribution threshold' value.

In another embodiment, a text file may not be contributed to despite meeting or exceeding the contribution threshold value, because the text file may be linked to another text file in the same or different Sub-Set folder. In other words, expression strings in facial biometric text files may not be contributed if expression strings for ear or iris biometrics do not meet their respective contribution threshold values. In other words, an individual's face matches but their ears or eyes do not; thus, since these are programmed to be linked biometrics all expression strings are failed.

FIG. 32 depicts a third contribution.

At CN3 are shown error expressions. These return a blank result, i.e. not counted towards next average calculation. In one scenario the individual's nose may have been covered, i.e. not observable by the capture device (i.e. Sensor 1).

In one embodiment, a maximum number or percentage of error expressions are permitted in an expression string, otherwise a line is rejected for contribution, instead it is deleted or the decision concluded is it does not match this individual.

Figure 33:
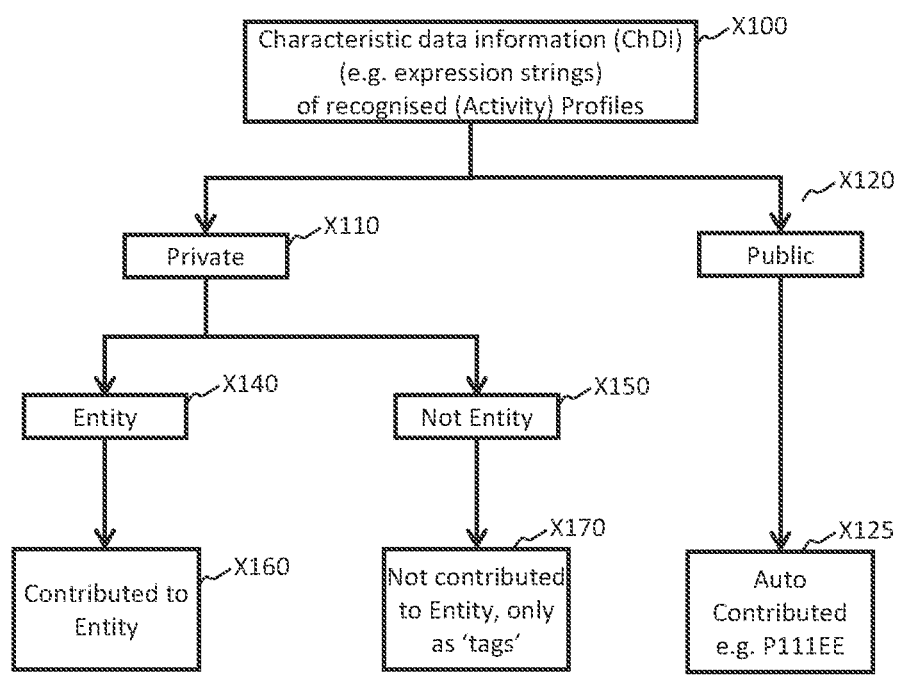
FIGS. 33 to 35 are example process flows in accordance with an embodiment of the invention.

FIG. 33 is a flowchart depicting typical divisions of ChDI (e.g. X100).

In one embodiment, ChDI is divided into Private X110 and Public X120 ChDI.

Private may further be divided into Entity X140 and Not Entity X150. Entity X140 means ChDI which is of or about the account owner, i.e. they were the capture subject or source. Not Entity X150 is the opposite to X140, e.g. ChDI of another entity.

Entity X140 ChDI is contributed X160 to a 'rightfully claiming' account owner. However, Not Entity X150 is not contributed as being of the account owner, although, may be contributed as 'tags' (or associations).

Pubic ChDI X120 may be automatically contributed X125, e.g. as 'memories' to a 'Past Experience' Module or 'Recognition Feedback' Module (e.g. P111 EE and P027 in FIG. 27).

Figure 34:
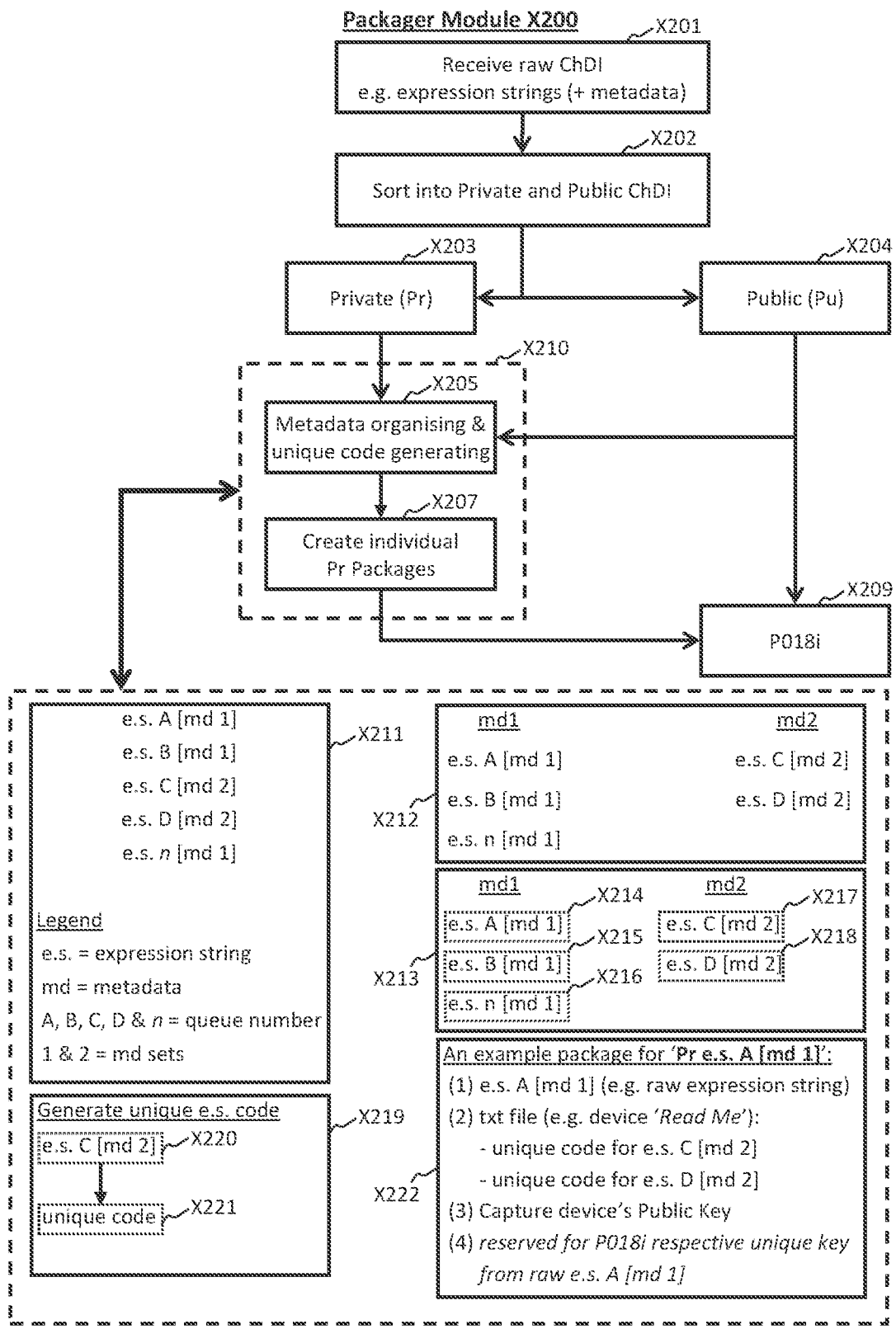

FIG. 34 provides description on one embodiment of a Packager Module X200.

At X201 the Packager Module X200 receives the 'raw' ChDI (e.g. expression strings and metadata).

At X202 the ChDI is sorted into their Private (Pr) X203 and Public (Pu) X204 designations, in one embodiment, according to data information within the expression string metadata.

Pu X204 may undergo three embodied paths, e.g. be directed straight to the next process of being encrypted at P018i in FIG. 26, skipping that aforementioned step and instead being digitally signed at P018ii in FIG. 26, or Pu ChDI may be organised according to its metadata X205.

Pr X203 undergoes metadata organising and code generating at X205. Description on these processes are illustrated in X210, e.g. X211, X212, X213 and X219.

At X211 the expression strings are listed sequentially as received by the Packaging Module X200, for example.

At X212 the expression strings (e.s.) are organised according to their respective metadata, e.g. [md 1] and [md 2].

At X207 the organised e.s. are then individually packaged. An example package for 'Pr e.s. A [md 1]' is described at X222. In one embodiment, the contents of the package comprise four (4) items, as follows:
(1) e.s. A [md 1](e.g. raw expression string);
(2) a text file (e.g. device 'Read Me'), which contains the unique codes for e.s. C [md 2](e.g. X217) and e.s. D [md 2](e.g. X218);
(3) the capture device's Public Key; and
(4) a reserved location for the principal expression string's unique key. One reason unique codes of the [md 2] expression strings were included in the text file was to later convey a message to a contributing device, to state that these expression string are likely not the entity according to recognition add-on software, however since they were captured in the same scene, at the same time they are relevant to ChID which was of the entity. The [md 2] expression strings will later be contributed to an account owner's device as tags (or associations).

In another package embodiment, Pr e.s. C [md 2](e.g. X217) is the principal e.s. Its package contents would comprise:
(1) itself, e.g. raw e.s.;
(2) the unique codes for e.s. A [md 1](e.g. X214), e.s. B [md 1](e.g. X215) and e.s. n [md 1](e.g. X216);
(3) the capture device's Public Key; and
(4) a reserved spot for the unique key generated by P016 and P017 in FIG. 26 for e.s. C [md 2](e.g. X217).

X219 depicts the generation of a unique code for individual expression strings.

After packaging the data information is sent to X209, e.g. P018i in FIG. 26.

Figure 35:
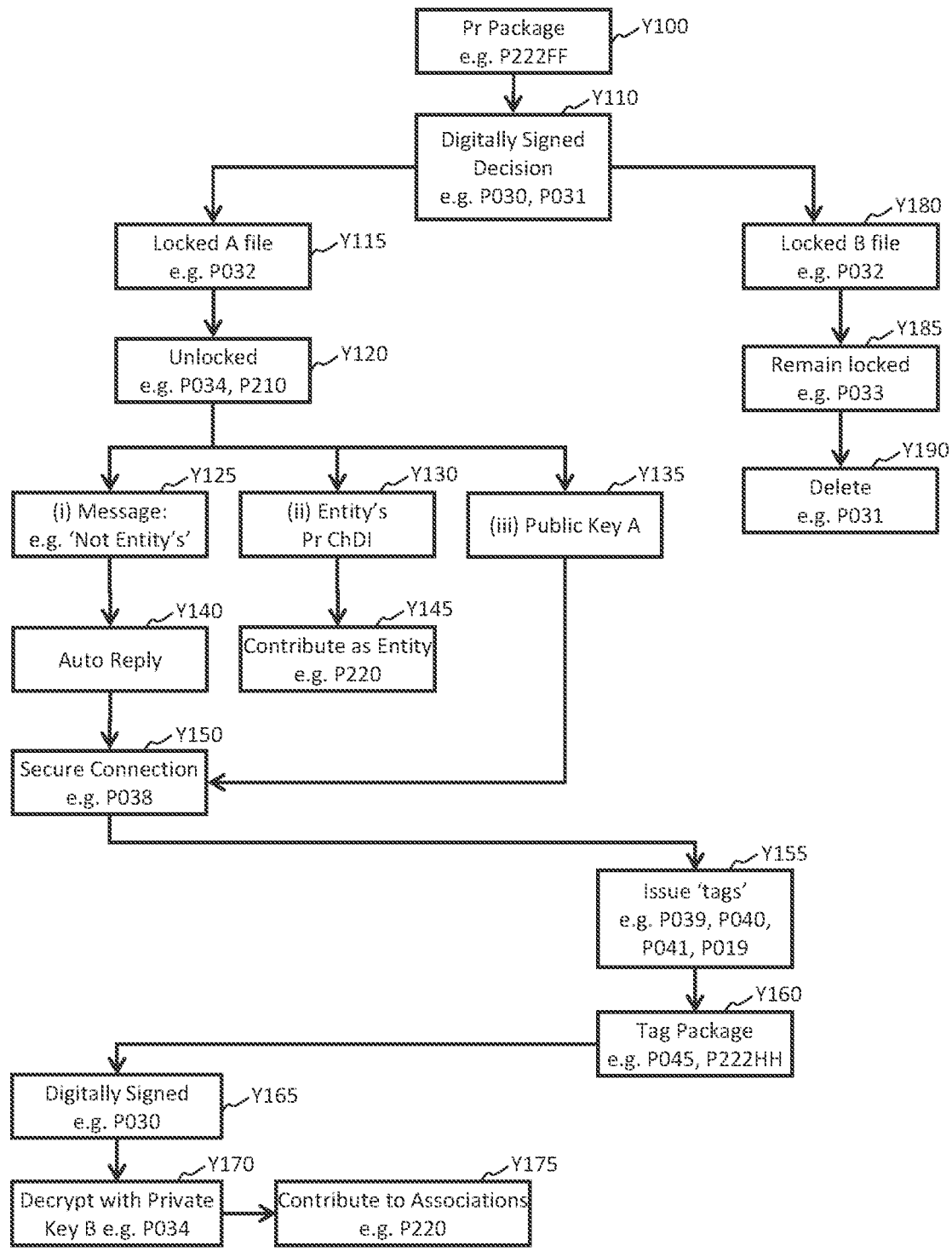

FIG. 35 is flowchart describing one embodiment of a Private Package Y100 being managed (e.g. received and processed) by recipient devices, e.g. at P222FF in FIG. 27.

Throughout FIG. 35 the flowchart cells provide examples of potentially corresponding steps in other figures.

The embodiment described for FIG. 35 is different to that described for FIG. 34, in that this Pr Package Y100 contains sub-packages. For example, this Pr Package Y100 may contain all the individual packages which were created at X207 in FIG. 34, rather than Pr Package Y100 representing one of those individual X207 packages. However, for this example only two are illustrated, i.e. Locked A file Y115 (which may represent e.s. A [md 1]) and Locked B file Y180 (which may represent e.s. C [md 2]).

At Y110 in FIG. 35 the receiving device, e.g. contributing device P200, checks the digitally signed status of the incoming package.

At Y115 and Y180 the contributing device unpacks the Pr Package after being satisfied with the digital signature from the capture device.

At Y120 the contributing device sources the corresponding key to decrypt the Locked A file, however is not able to with the Locked B file Y185.

The Locked B file is deleted Y190 at this point. However, the unlocked A file Y120 has its contents revealed. The contents are similarly described as for X222 in FIG. 34; although, item (4) is not shown in FIG. 35. The package comprised:
(i) a text file message Y125;
(ii) the entity's raw Pr ChDI or expression string Y130; and
(iii) the capture device's Public Key A Y135.

The message Y125 may colloquially be as follows:
"Recipient device, you were only able to unlock the Locked A file in the Pr Package. Therefore, since you were not able to unlock the Locked B file the other Pr ChID is not of you, so send me a reply and I will send you the other Pr ChID as tags, instead".

An auto-reply message may be generated at this point Y140. Concurrently, the entity's ChDI may be contributed Y145, provided it met or exceeded contribution threshold values.

At Y150 the contributing device initiates a secure connection process with the capture device, colloquially explained as follows:

"Okay, let's establish a secure connection. Here are my connection details and my Public Key B. I have digitally signed with my Private Key B and have encrypted this reply package with your Public Key A".

At Y155 the capture device receives the contributing device's transmission and colloquially acknowledges as follows:

"Okay, I have received. I decrypted with my Private Key A, and noticed your digital signature. I've read your message, and will send those Pr ChDI which were not of you to you for contribution as 'tags' (i.e. Associations) via our secure connection. Before I transmit, I will first encrypt the transmission with your Public Key B and digitally sign with my Private Key A. I will use the connection details you supplied".

At X160 the capture device transmits the new tag packages to the contributing device via the secure connection.

At Y165 the contributing device receives the new package, and checks for a trusted digital signature.

At Y170 the contributing device decrypts with its Private Key B.

After decryption it contributes (e.g. P220) the new package contents, i.e. tags, to Associations, a folding within the Category directory.

Figure 36:
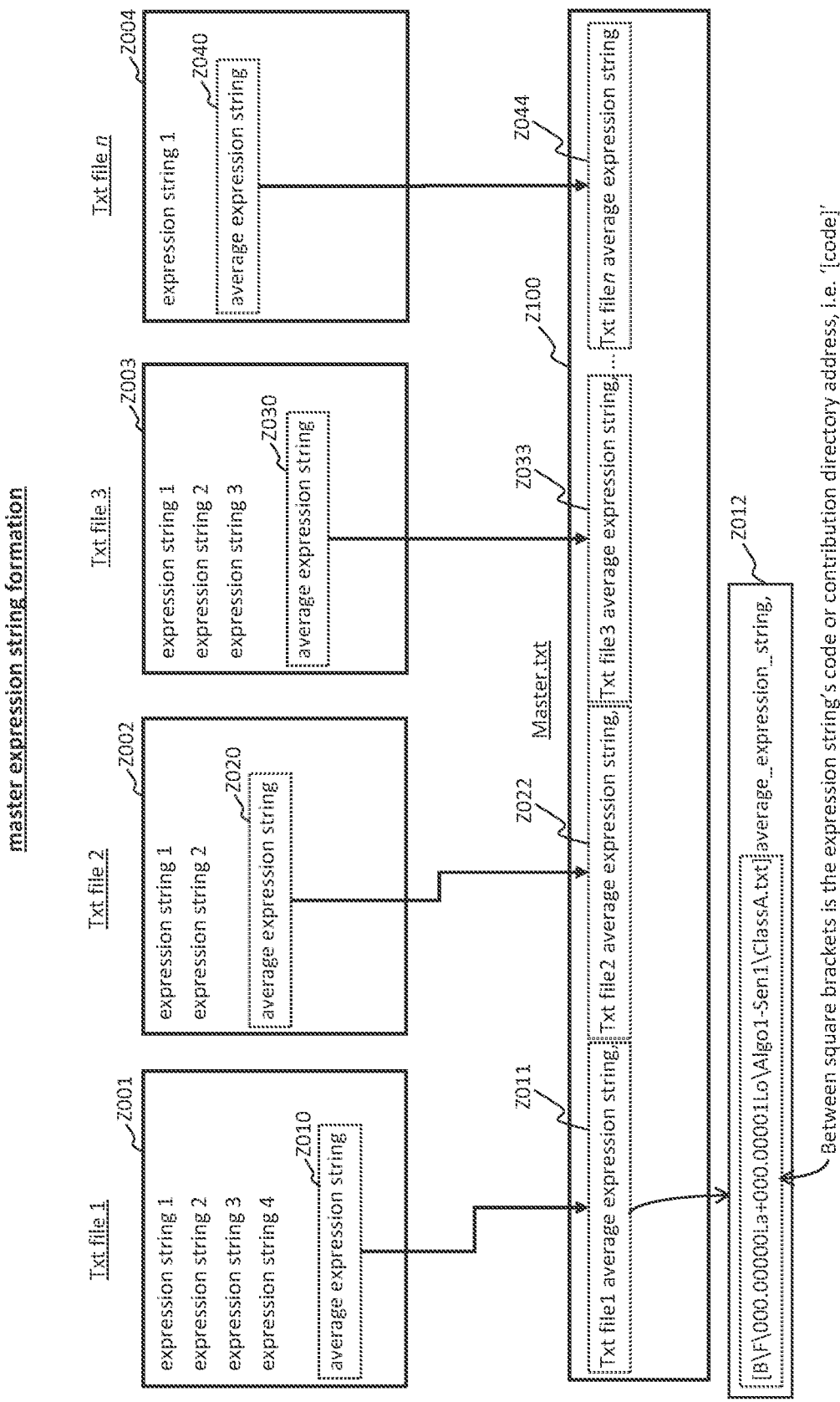
FIGS. 36 to 38 are example string formations and querying in accordance with an embodiment of the invention.

FIG. 36 depicts one embodiment of the formation of a master expression string.

For example, from time to time, the most recent average expression string (e.g. Z010, Z020, Z030 and Z040) from every template text file (e.g. Z001, Z002, Z003 and Z004) within the root directory (or any of its folders or sub-folders, etc) are copied into a master recognizer text file or master expression string text file (e.g. Z100 or W12 in FIG. 28).

In one embodiment, this master recognizer combines (e.g. serially) all the average expression strings, for example, into a master expression string. In another embodiment, the PAA orders each text file's expression string in a particular order on the master string. This order may be determined based on one or more or combination of the following: the most reliable recognition source; capture device (e.g. sensor type/model); algorithm; sensor class (e.g. owner/operator credibility); etc.

In one scenario, should an individual not have any values contributed within a particular text file in any particular Sub-Set then the expression string for this text file within the master expression string may be represented with values recognised as a 'skip' or 'null' function. In other words, the master recognizer reader or Module (not shown) would interpret these functions as 'not yet contributed'.

In one embodiment, a Recognition Value (RV) for a text file is derived from the quantity of multi-samples, i.e. the number of contributed expression strings to a text file. Each text file has a Recognition Value Threshold, or Recognition Threshold (RT). If a text file has not yet been contributed to, then it would generally return a zero percentage RV, and, therefore, not meet any RT set for it.

In another embodiment, a master RV is generated from all the individual text file RVs and compared against a master RT. The greatest weighting would generally be placed on expression strings which are positioned first in the ordered master expression string.

In one format embodiment for an expression string in the master expression string the first component of the string may be that represented within square brackets or parentheses Z012. Comprised within these brackets are the expression string's code or directory address, i.e. where the average expression string came from in the structured contribution database.

Figure 37:
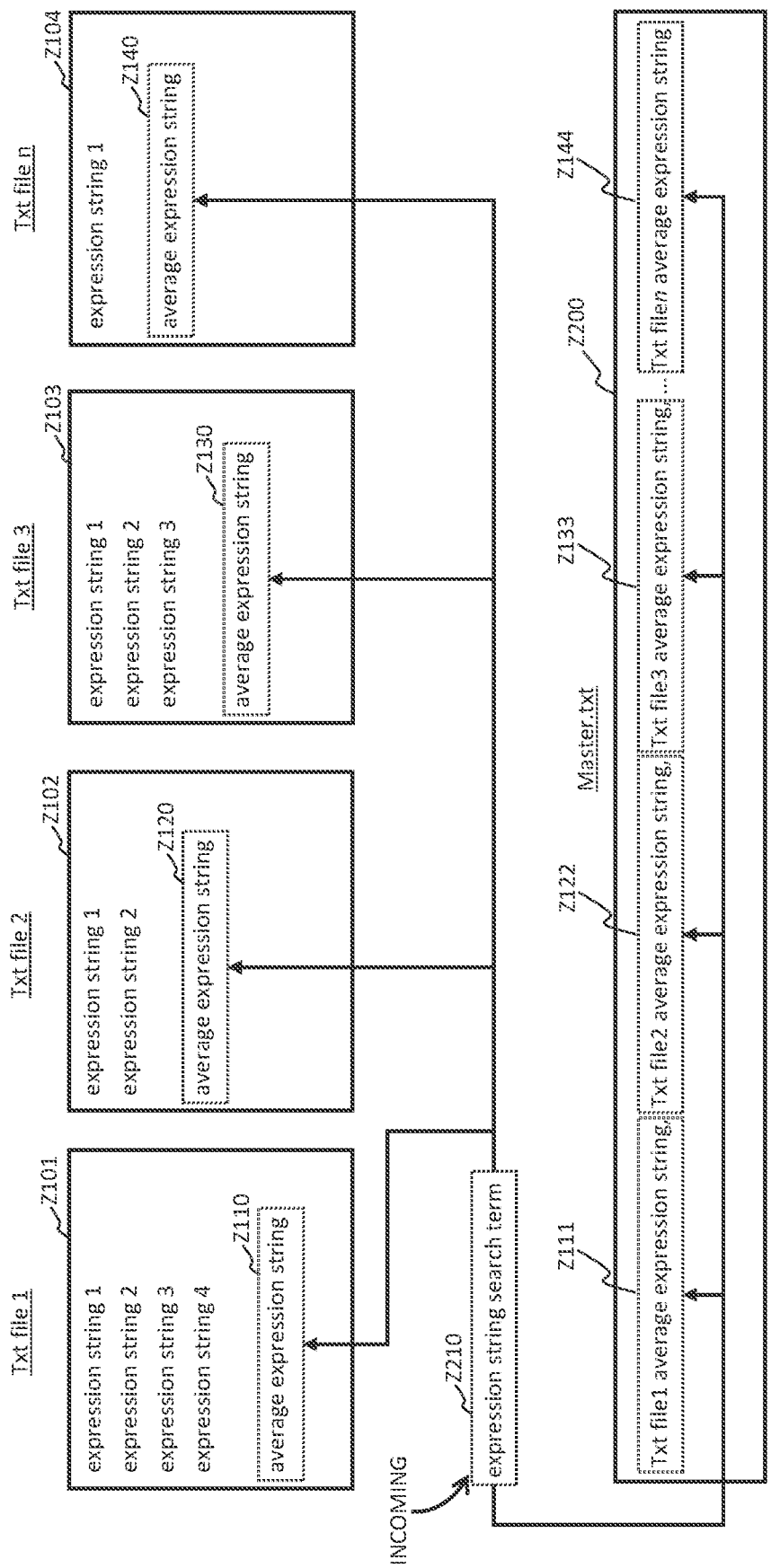

FIG. 37 depicts a diagram for the 1:1 or 1:n matching of a text file's average expression string with an incoming expression string search term Z210.

In one embodiment, the incoming string Z210 is correlated against each text file average expression string (e.g. Z110, Z120, Z130 and Z140).

In another embodiment, the incoming string Z210 is correlated against just the one txt file, i.e. the master template file or master expression string txt file Z200 (or W12 in FIG. 28). The search term string Z210 is queried against each average expression string in the master expression string (e.g. Z111, Z122, Z133 and Z144).

Figure 38:
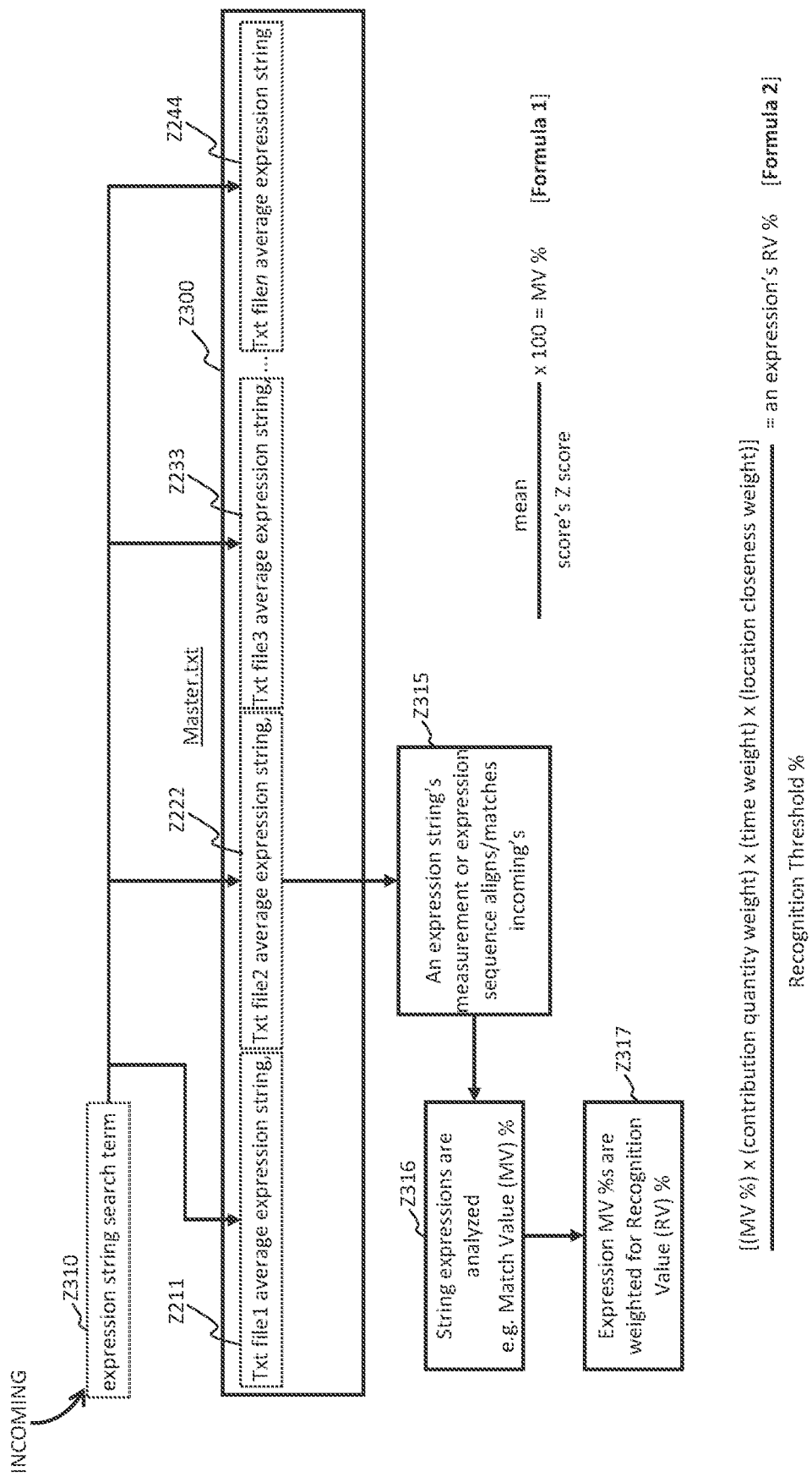

FIG. 38 describes one embodiment of how recognition accuracy values are fundamentally generated for a recognition account. In this Figure a 1:n query is illustrated, where an incoming expression string search term Z310 is correlated against a master expression string Z300.

When an incoming string (i.e. its ChDI measurement or expression sequence) matches Z315 with an average expression string in the master expression string the Correlate/Process Module (e.g. P210 in FIG. 27) then checks tolerance against the contribution threshold (CT). Should the incoming string met or exceed a CT it may be contributed. However, it is also at this point processed for recognition value (RV) against recognition thresholds (RT). In one embodiment, incoming strings may not pass CTs but RVs may still be generated.

In one embodiment, after an incoming string is matched with its master expression string counterpart a Match Value (MV) % is calculated for it (e.g. Formula 1 in FIG. 38).

For example, the Mean=Reference Term value (e.g. an expression's average value), and the Score=Search Term value (e.g. an expression's value in an incoming expression string).

In one embodiment, if an expression (e.g. a particular biometric measurement) is valued more significantly or critically (e.g. for the purpose of accurate recognition) a smaller standard deviation (SD) would generally be assigned to that expression.

The smaller the SD the taller and steeper a bell curve would be. Therefore, any change in value different to the mean would result in a higher z score (plus or minus) change. This corresponds to less tolerance for difference for a particular score (or expression measurement value) relative to the mean value (e.g. the average value for an expression).

A score on the mean is assigned a 100% Match Value (MV). If a score is not on the mean it will result in a MV percentage change. This change is influenced by the score's z score. The greater the absolute value of the score's z score the greater the MV percentage reduction.

In one embodiment, if the z score is zero or the score equals the mean then the 100% MV value is established. If the z score is not zero then Formula 1 may be used to calculate the MV %.

In another embodiment, to calculate a Recognition Value (RV), for example, for an expression in an expression string Formula 2 is used.

In one embodiment, to achieve a 'pass' result an RV % must be greater than or equal to 100% (or 1.0).

For example, the maximum 'contribution quantity weight', 'time weight' and 'location closeness weight' possible is 1.0 (i.e. MV %×1.0×1.0×1.0=MV %). For example, 1.0 equals the x-axis limit on an exponential curve. The minimum weight possible is 0.0, or the smallest y value on the exponential curve. In one embodiment, a positive movement along the x-axis equals an increase in expression strings contributed, a decrease in time (i.e. recency) since an expression (or expression string) was last contributed, or a decrease in location distance between the most recent contribution and another contribution (e.g. the second most recent). The more contributions, the more recent a contribution, the closer the distance between one contribution and another, the closer these weights exponentially approach the limit of 1.0, and the more 'trust' is subsequently placed on an originally calculated MV % (and every other calculation derived from this %).

Figure 39:
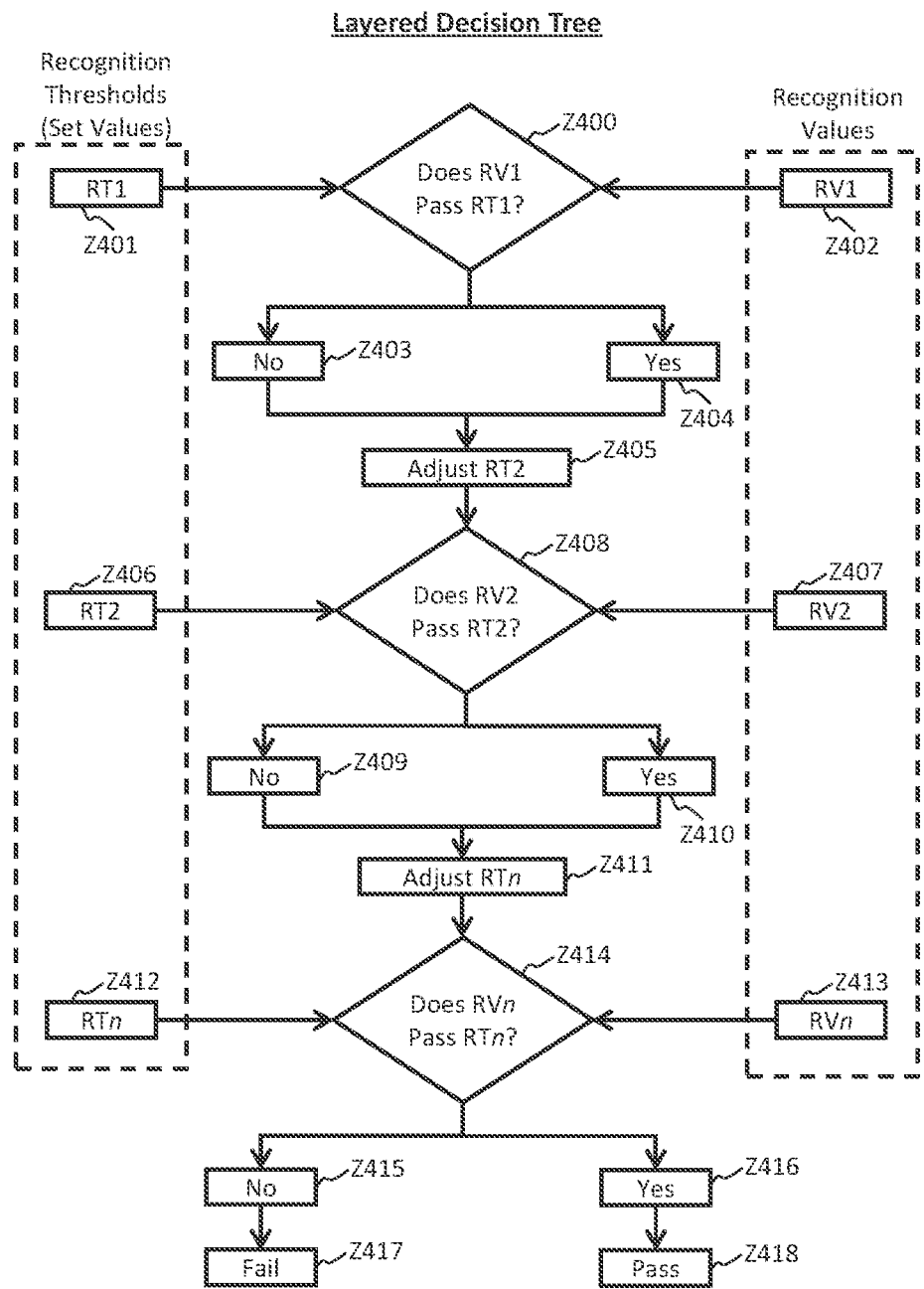
FIG. 39 is a recognition process flow in accordance with an embodiment of the invention.

FIG. 39 describes one embodiment method of generating overarching Recognition Values (RVs), i.e. factoring in all data information contributed and correlating for recognition purposes against incoming data Information, for example.

In one embodiment, a Layered Decision Tree is employed, as depicted in FIG. 39. However, a Cascaded Decision Tree (not shown) has merit as well.

As described for FIG. 38 an RV may be generated for each expression.

Figure 58B:
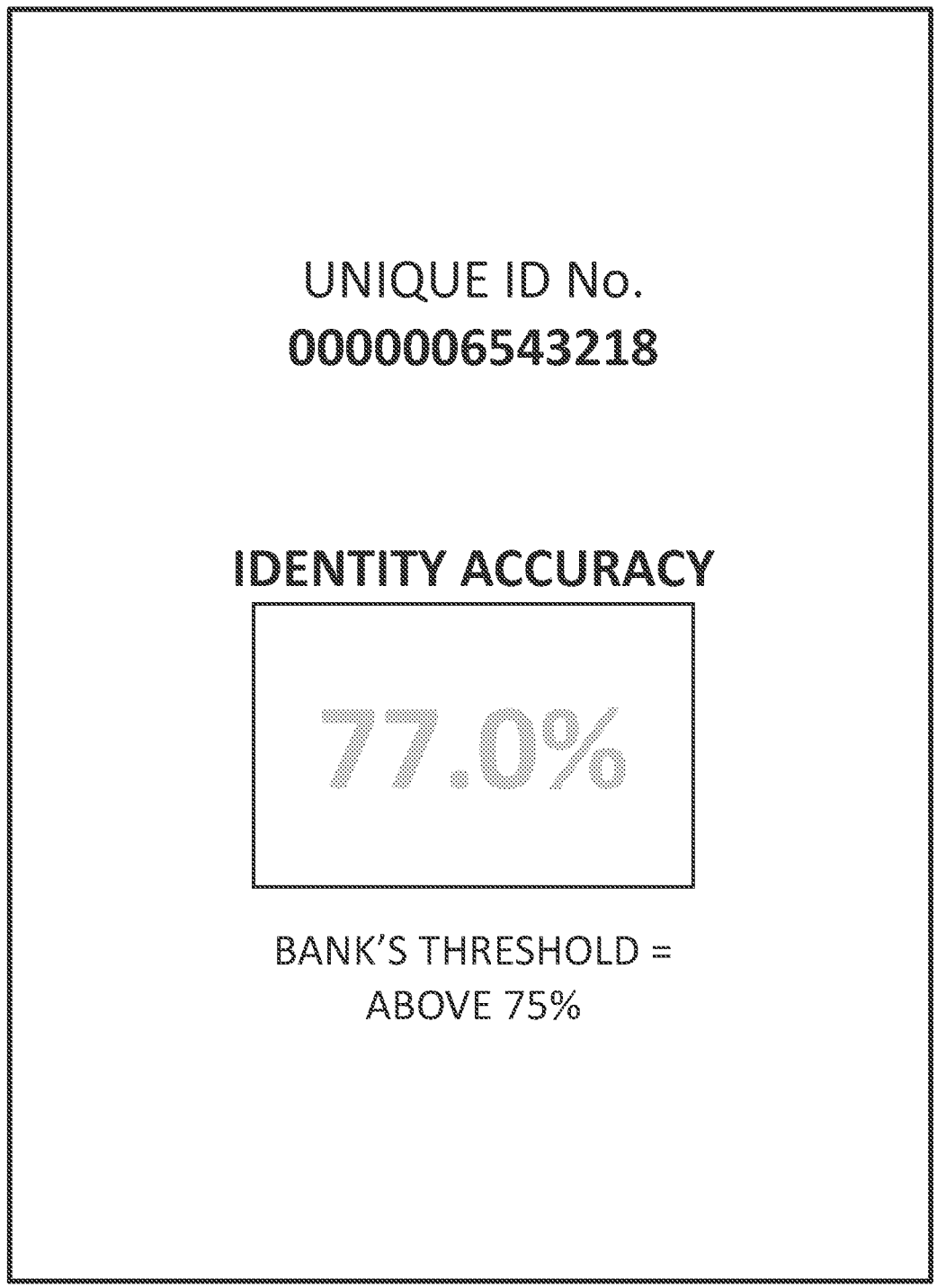

In one embodiment, all expression Recognition Values (RVs) in an expression string may then be averaged to arrive at a Sub-Set Recognition Value (SSRV). All Sub-Set RVs in a particular Set may also be averaged to arrive at a Set RV (SRV). All Set RVs in a particular Sub-Category may be averaged to arrive at a Sub-Category RV (SCRV). All Sub-Category RVs in a particular Category may also be averaged to arrive at a Category RV (CRV). And, lastly, all Category RVs may be averaged to arrive at a Class RV. It is this Class RV which may represent the percentage % described as the end product in FIG. 58b and more generally described in FIG. 58.

In another embodiment, and they are numerous, the Category RVs are not averaged, rather they are inputted into a Decision Tree. For example, RT1 an RV1 may represent the threshold and value for facial biometric, RT2 and RV2 ear biometric, RTn and RVn iris biometric, etc. Whichever biometric Category has the highest recognition value or priority ranking would typically be represented first, i.e. as RT1 and RV1, and the least valued would be last. In sum, if a RV does not meet or exceed its corresponding RT then the next RT in the hierarchy list is adjusted, accordingly. The process repeats as necessary. At the end a pass Z418 or fail X417 result is produced.

In one embodiment, the account service provider sets the RTs, or the party pursuing the verification of an individual (i.e. an account holder) sets their own RTs as desired. The higher the RTs the more accurately recognized an individual needs to be with their recognition account.

Figure 59:
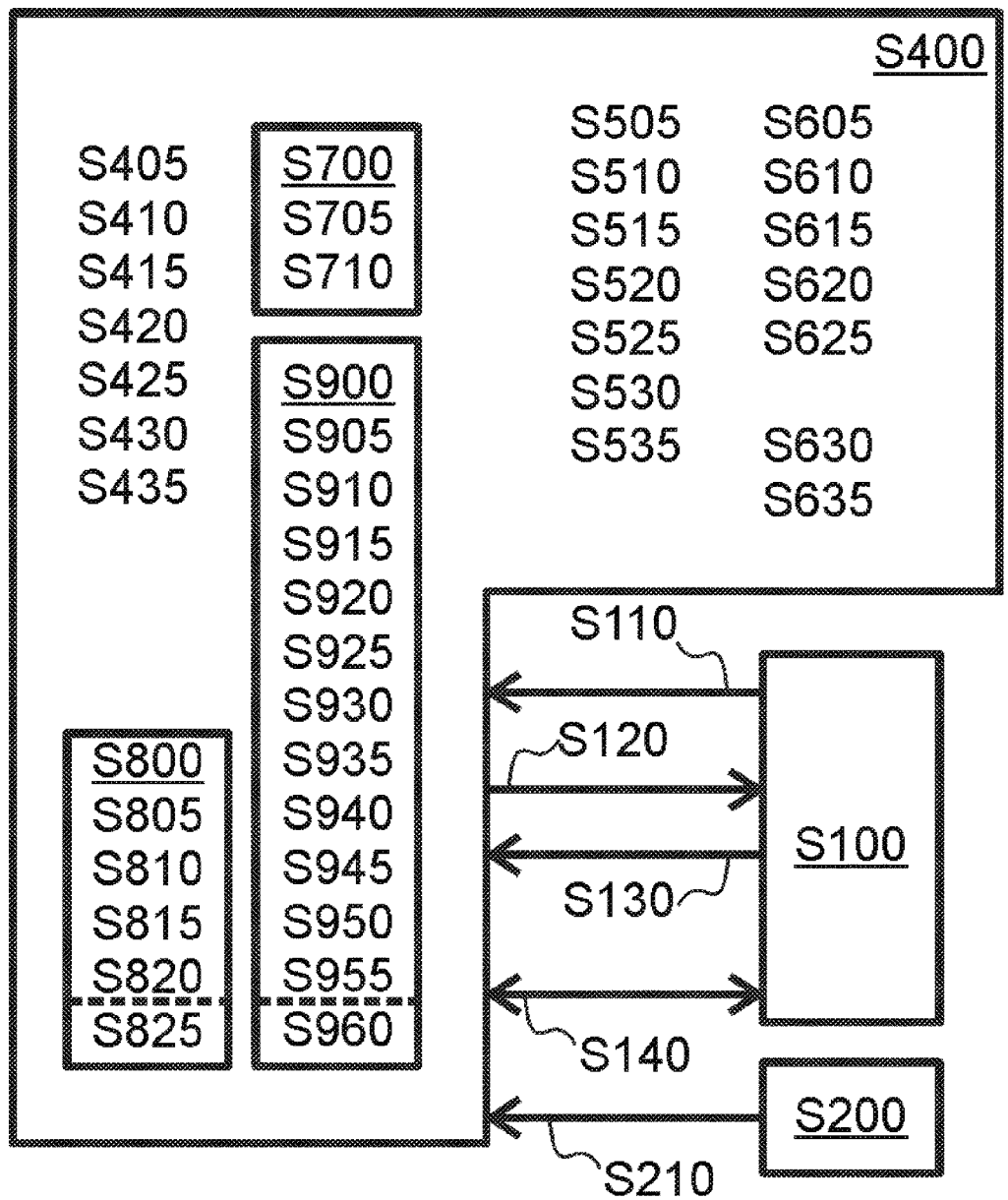
FIG. 59 is an example of a use case in accordance with an embodiment of the invention.

Referring now to FIG. 59, the described hardware and software components are generic or typical examples and are not limited to any specific RVM. Further, the RVM's components (ware), its design, may change as technologies improve, e.g. to have integrated improved and/or new computational engines, navigation systems, propulsion devices, sensors, etc.

The RVM system S001 described may comprise of one or more ground station S100 and/or one or more RVMs S400.

A ground station S100 may communicate with the RVM (e.g. commands S110, telemetry S120, power 8130, data 8140, etc) and a transmitter such as an RC transmitter S200 (e.g. data information transmission S210).

The RVM S400 may comprise of the following components: ground gear/undercarriage S405, vibration isolated carrier board S410, attitude and heading reference system 8415, pressure sensor S420 (e.g. barometric), positioning system receiver S425 (e.g. GPS), modem S430 (e.g. wireless), cooperative surveillance technologies S435 (e.g. ADS-B), etc.

The RVM 8400 may consists of a Guidance, Navigation and Control (GNC) system with the following hardware/software (ware): navigation computer 8800, sensor payload S700, travel computer S900, etc.

The navigation computer 8800 may comprise the following software: state estimation 8805, obstacle and terrain detection 8810, travel computer communication 8815, data logging S820, application specific software 8825, etc The sensor payload S700 may comprise computer vision sensors S705 (e.g.

cameras), LiDAR S710, etc.

The travel computer 8900 may comprise the following software: guidance and control S905, obstacle avoidance 8910, terrain following S915, propulsion control S920 (e.g. engine/motor), service functions 8925, system monitoring S930, RC system communication 8935, navigation computer communication 8940, ground station communication 8945, simulation 8950, data logging 8955, sensor or application specific software 8960, etc.

The RVM S400 may further comprise: frame/body/fuselage/hull 8505, mechanics 8510 (e.g. actuators), propulsion unit(s) 8515 (e.g. engine/motor), servos 8520, RC receiver 8525, speed and/or height adjuster 8530 (e.g. swashplate mixer), steering adjuster/attitude stabiliser S535, servo switch/controller 8605, system monitor 8610, travel/movement termination system 8615, component sensors/transducers/nerves' 8620 (which may be systemically within or on all parts of a RVM, especially propulsion unit and body), signal system 8625, electric power system 8630, energy/fuel system 8635, etc.

Disclaimers

Throughout this specification, unless the context requires otherwise, the word "comprise" or variations such as "comprises" or "comprising", will be understood to imply the inclusion of a stated integer or group of integers but not the exclusion of any other integer or group of integers.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Definitions for selected terms used herein may be found within the detailed description of the specification and apply throughout. Unless otherwise defined, all other scientific and technical terms used herein have the same meaning as commonly understood to one of ordinary skill in the art to which the invention belongs.

Although not required, the embodiments described with reference to the method, computer program, data signal and aspects of the system can be implemented via an application programming interface (API), an application development kit (ADK) or as a series of program libraries, for use by a developer, for the creation of software applications which are to be used on any one or more computing platforms or devices, such as a terminal or personal computer operating system or a portable computing device, such as a smartphone or a tablet computing system operating system, or within a larger server structure, such as a 'data farm' or within a larger transaction processing system.

Generally, as program modules include routines, programs, objects, components and data files that perform or assist in the performance of particular functions, it will be understood that the functionality of the software application may be distributed across a number of routines, programs, objects or components to achieve the same functionality as the embodiment and the broader invention claimed herein. Such variations and modifications are within the purview of those skilled in the art.

It will also be appreciated that where methods and systems of the present invention and/or embodiments are implemented by computing systems or partly implemented by computing systems then any appropriate computing system architecture may be utilised. This includes standalone computers, network computers and dedicated computing devices (such as field-programmable gate arrays).

Where the terms "computer", "computing system" and "computing device" are used in the specification, these terms are intended to cover any appropriate arrangement of computer hardware for implementing the inventive concept and/or embodiments described herein.

Where the terms "robotic device", "autonomous device" and "smart device" are used in the specification, these terms are intended to cover any appropriate device which is capable of receiving a command and utilising the command to perform a function, which may be either a "physical" function (i.e. movement) or a "virtual" function (e.g. interact with another device via electronic commands).

Where reference is made to cloud computing, the term refers to Internet-based computing, wherein shared resources, software, and/or information are provided to one or more computing devices on-demand via the Internet (or other communications network).

Where reference is made to communication standards, methods and/or systems robots or devices may transmit and receive data via a variety of forms: 3G, 4G (CDMA/GSM), Wi-Fi, Bluetooth, other radio frequency, optical, acoustic, magnetic, GPS/GPRS, or any other form or method of communication that may become available from time to time.

The invention claimed is:

1. A robotic device package delivery system for identifying a claiming entity as a correct entity, the robotic device package delivery system having at least one identity or biometric information computing device, and for delivering a robotic device package to the correct entity, comprising:
at least one identifying authority computing device communicatively connected to the at least one identity or biometric information computing device;
at least one delivery destination computing device communicatively connected to the at least one identifying authority computing device;
at least one identification and authentication computing device communicatively connected to the at least one identifying authority computing device; and
at least one delivery robotic device communicatively connected to the at least one delivery destination computing device;
wherein the at least one identity or biometric information computing device comprises at least one data storage device configured to store at least one database arranged to provide at least one item of identity or biometric information to the at least one identifying authority computing device,
wherein the at least one identifying authority computing device comprises at least one processor operatively coupled with at least one data storage device,
the at least one processor being configured to:
collect identity or biometric information from an entity utilizing the at least one identity or biometric information computing device, and
form a profile of information relevant to identification of the entity by utilizing the at least one item of identity or biometric information;
the at least one data storage device being configured to store the profile of information relevant to the identification of the entity;
wherein the at least one delivery destination computing device comprises at least one processor configured to:
receive information relevant to an entity nominated to receive a robotic device package from the at least one identifying authority computing device,
the received information comprising a proposed delivery route and destination;
test whether the proposed delivery route or destination is within an exclusion zone by querying information stored on the at least one data storage device with the proposed delivery route or destination,
accept the proposed delivery route or destination, if the query returns a result informing that the proposed delivery route or destination was not within an exclusion zone, and
dispatch the at least one robotic device along the accepted delivery route, and towards and nearby the accepted destination;
wherein the at least one delivery robotic device comprises:
at least one communication unit configured to receive at least one command from the at least one delivery destination computing device, including a mission to move along the accepted delivery route, and towards and nearby the accepted destination, and
at least one controller configured to guide, navigate or control the at least one delivery robotic device along the accepted delivery route, and towards and nearby the accepted destination,
a body and at least one associated propulsion unit,
the at least one propulsion unit being configured to move the at least one delivery robotic device based on an instruction received from the at least one controller;
wherein the at least one identification and authentication computing device comprises:
at least one communication unit configured to receive, from at least one identifying authority computing device, the profile of information relevant to the entity nominated to receive the robotic device package;
the profile of information including
the at least one item of stored identity information; or
the at least one item of stored biometric information, and,
at least one processor configured to
receive identity or biometric information collected from the claiming entity via an identity or biometric information device,
compare the received identity or biometric information collected from the claiming entity to the at least one item of stored identity or biometric information,
wherein, if a match threshold is achieved, the claiming entity is identified as the correct entity; and causes that match to be communicated to the at least one delivery robotic device; and wherein the at least one propulsion unit of the at least one delivery robotic device is further configured to move, as instructed, the at least one delivery robotic device in order to facilitate delivery of the robotic device package to the entity only if the claiming entity was the correct entity.

\* \* \* \* \*